US012568158B2

(12) United States Patent
Liu et al.

(10) Patent No.: US 12,568,158 B2
(45) Date of Patent: Mar. 3, 2026

(54) COMMUNICATION METHOD AND APPARATUS

(71) Applicant: Huawei Technologies Co., Ltd., Shenzhen (CN)

(72) Inventors: Shuo Liu, Shenzhen (CN); Qiaoling Wang, Shenzhen (CN); Jianfei He, Shenzhen (CN); Junyi Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 759 days.

(21) Appl. No.: 17/865,845

(22) Filed: Jul. 15, 2022

(65) Prior Publication Data

US 2022/0353207 A1      Nov. 3, 2022

Related U.S. Application Data

(63) Continuation of application No. PCT/CN2021/072543, filed on Jan. 18, 2021.

(30) Foreign Application Priority Data

Jan. 17, 2020      (CN) .......................... 202010054022.1

(51) Int. Cl.
  *H04L 69/22*              (2022.01)
  *H04L 49/9057*            (2022.01)
(52) U.S. Cl.
  CPC .......... *H04L 69/22* (2013.01); *H04L 49/9057* (2013.01)
(58) Field of Classification Search
  CPC ..... H04L 69/22; H04L 49/9057; G06N 3/045;
          G06N 3/098; G06N 3/08; G06F 18/23
  See application file for complete search history.

(56) References Cited

U.S. PATENT DOCUMENTS 8,244,810 B1 *  8/2012  Haldar ................... H04L 51/04
                                                        709/206
2007/0160042 A1 *  7/2007  Dollo ..................... H04L 69/18
                                                        370/389

(Continued)

FOREIGN PATENT DOCUMENTS

CN        109819524 A      5/2019
CN        110033078 A      7/2019
CN        110119760 A      8/2019

OTHER PUBLICATIONS

Amedeo Sapio et al "Scaling Distributed Machine Learning with In-Network Aggregation," Feb. 22, 2019, XP081154038, 16 pages.

(Continued)

*Primary Examiner* — Edan Orgad

*Assistant Examiner* — Malick A Sohrab

(74) *Attorney, Agent, or Firm* — Conley Rose, P.C.

(57)      ABSTRACT

A communication method and apparatus relating to the field of communication technologies. The method includes a network device receives at least two packets, and aggregates the at least two packets to obtain aggregated packets. Messages to which the at least two packets separately belong have a same message index. The message index is used to index the messages to which the at least two packets separately belong. In the communication method provided in this application, the network device is used to implement aggregation processing, to reduce a communication delay and data redundancy in a communication network.

9 Claims, 23 Drawing Sheets

(56) References Cited

U.S. PATENT DOCUMENTS

| | | | |
|---|---|---|---|
| 2009/0201898 A1 | 8/2009 | Gong et al. | |
| 2013/0028270 A1* | 1/2013 | Wu | H04L 69/324 |
| | | | 370/474 |
| 2013/0195424 A1* | 8/2013 | Ohashi | H04N 21/4332 |
| | | | 386/E9.011 |
| 2019/0313169 A1* | 10/2019 | Geng | H04Q 11/00 |
| 2020/0120459 A1* | 4/2020 | Nguyen | H04W 4/40 |
| 2020/0220953 A1 | 7/2020 | Wu et al. | |
| 2020/0342297 A1 | 10/2020 | Dai | |
| 2021/0014893 A1* | 1/2021 | Park | H04L 5/0092 |

OTHER PUBLICATIONS

Youjie Ii et al "Accelerating Distributed Reinforcement Learning with In-Switch Computing," Jun. 22, 2019, XP058436347, 13 pages.
Vishakh, H., "Parallel and distributed deep learning," In Technical Report, Stanford University: Stanford, CA, USA, 2016, 8 pages.
Simonyan, K., et al, "Very Deep Convolutional Networks for Large-Scale Image Recognition," Computer Vision and Pattern Recognition, Sep. 4, 2014, 14 pages.

* cited by examiner

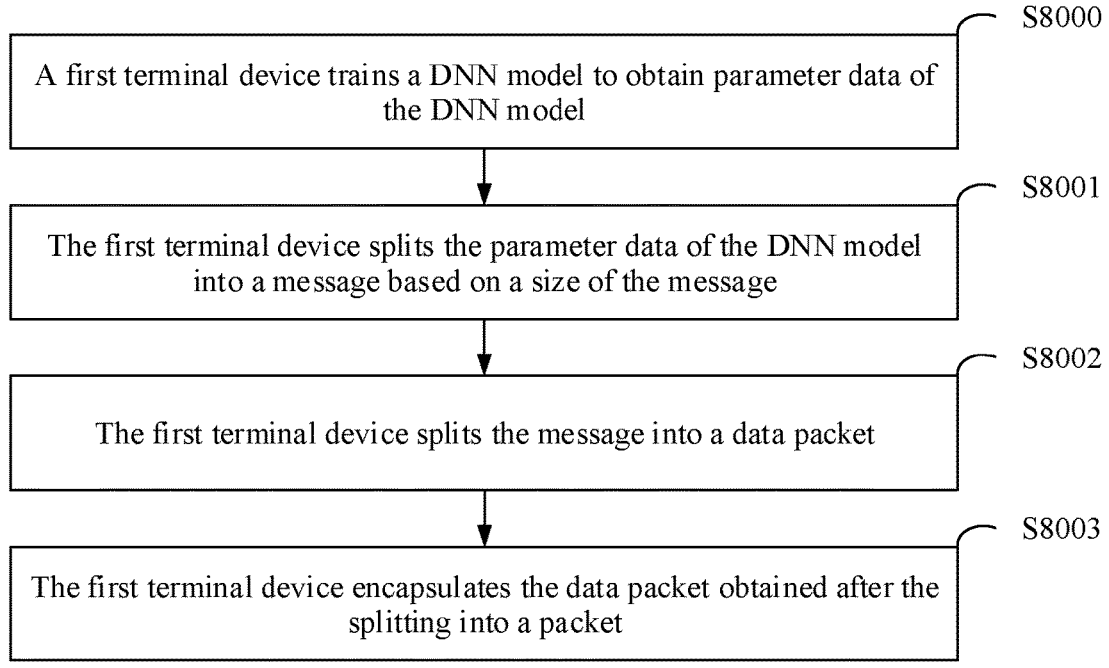

S8000

A first terminal device trains a DNN model to obtain parameter data of the DNN model

S8001

The first terminal device splits the parameter data of the DNN model into a message based on a size of the message

S8002

The first terminal device splits the message into a data packet

S8003

The first terminal device encapsulates the data packet obtained after the splitting into a packet

FIG. 9

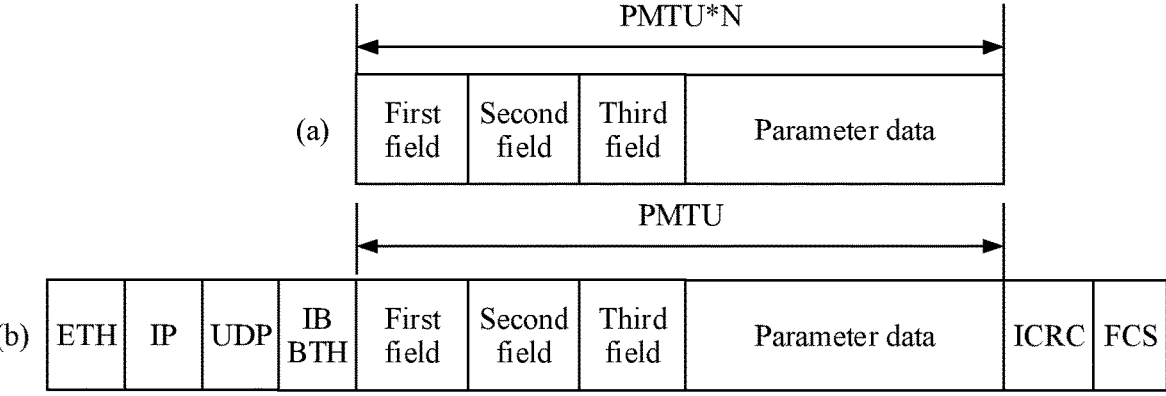

FIG. 10

Fourth network device

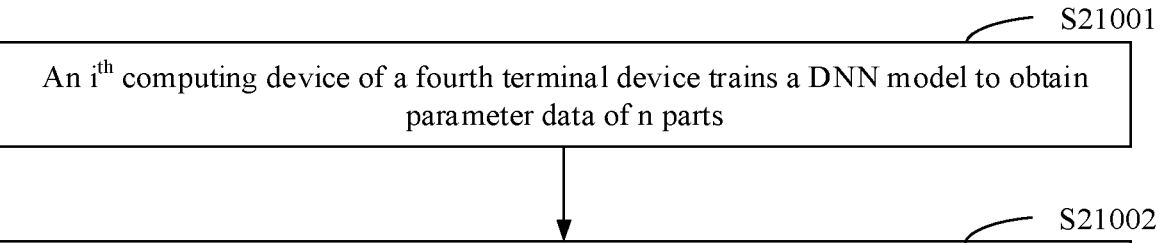

S21001

An $i^{th}$ computing device of a fourth terminal device trains a DNN model to obtain parameter data of n parts

S21002

In a $j^{th}$ iteration of the fourth terminal device, the $i^{th}$ computing device sends, to an $(i+1)^{th}$ computing device, an aggregation processing result that is of parameter data of an $(x+i-j+1)^{th}$ part and that is obtained after $(j-1)$ iterations; and the $i^{th}$ computing device receives, from an $(i-1)^{th}$ computing device, an aggregation result that is of parameter data of an $(x+i-j)^{th}$ part and that is obtained after $(j-1)$ iterations, and aggregates the aggregation result and data of the $(x+i-j)^{th}$ part in the $i^{th}$ computing device to obtain an aggregation processing result that is of parameter data of the $(x+i-j)^{th}$ part and that is obtained after j iterations, so that in a $(j+1)^{th}$ iteration, the $i^{th}$ computing device sends, to the $(i+1)^{th}$ computing device, the aggregation processing result that is of the parameter data of the $(x+i-j)^{th}$ part and that is obtained after j iterations, until traversal is performed for j from 1 to $(n-1)$ and a first aggregation result of an $(x+i+1)^{th}$ part is obtained

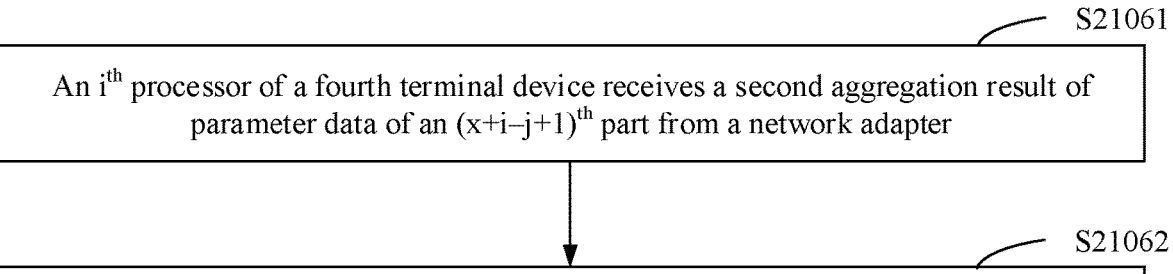

An $i^{th}$ processor of a fourth terminal device receives a second aggregation result of parameter data of an $(x+i-j+1)^{th}$ part from a network adapter

S21062

In a $j^{th}$ iteration of the fourth terminal device, the $i^{th}$ computing device sends the second aggregation result of the parameter data of the $(x+i-j+1)^{th}$ part to an $(i+1)^{th}$ computing device; and the $i^{th}$ computing device receives a second aggregation result of parameter data of an $(x+i-j)^{th}$ part from an $(i-1)^{th}$ computing device, and replaces data of the $(x+i-j)^{th}$ part in the $i^{th}$ computing device with the second aggregation result of the parameter data of the $(x+i-j)^{th}$ part, so that in a $(j+1)^{th}$ iteration, the $i^{th}$ computing device sends the second aggregation result of the parameter data of the $(x+i-j)^{th}$ part to the $(i+1)^{th}$ computing device, until traversal is performed for j from 1 to (n–1) and a second aggregation result of an $(x+i+1)^{th}$ part is obtained

FIG. 26

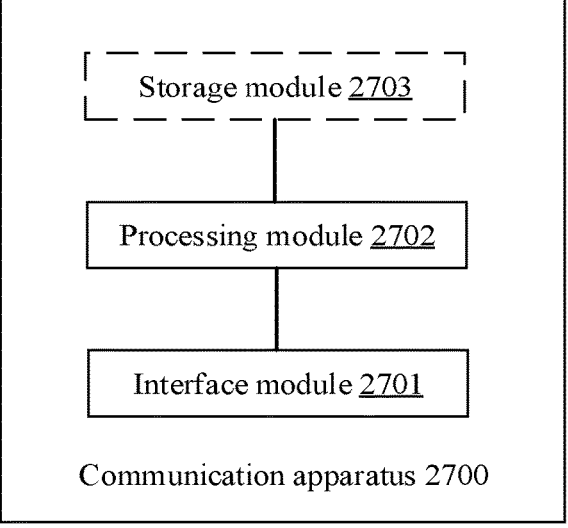

Communication apparatus 2700

FIG. 27

COMMUNICATION METHOD AND APPARATUS

CROSS-REFERENCE TO RELATED APPLICATIONS

This application is a continuation of International Patent Application No. PCT/CN2021/072543, filed on Jan. 18, 2021, which claims priority to Chinese Patent Application No. 202010054022.1, filed on Jan. 17, 2020. The disclosures of the aforementioned applications are hereby incorporated by reference in their entireties.

TECHNICAL FIELD

The present disclosure relates to the field of communication technologies, and in particular, to a communication method and apparatus.

BACKGROUND

Currently, distributed deep neural network (DNN) training methods are usually used to train DNN models. In most of the distributed DNN training methods, aggregation processing is implemented by a server to obtain trained DNN model parameters. In a distributed DNN training method, p workers separately exchange DNN model parameters with a same parameter server by using a communication network, where p is a positive integer greater than 1. In one process in which the p workers exchange the DNN model parameters with the same parameter server, an amount of data that needs to be transmitted by one worker is twice a data amount of the DNN model parameters; and an amount of data that needs to be transmitted by the parameter server is 2p times the data amount of the DNN model parameters, and the data amount is huge. In this case, the parameter server has a communication bottleneck problem. In another distributed DNN training method, p workers exchange DNN model parameters with each other by using a communication network. If the p workers complete one time of ring-all-reduce processing, an amount of data that needs to be transmitted by each of the p workers is $2(p-1)/p$ times a data amount of the DNN model parameters. When there are a huge quantity of workers, if the p workers complete one time of ring-all-reduce processing, an amount of data that needs to be transmitted by each of the p workers is nearly twice the data amount of the DNN model parameters. In other words, the amount of data that needs to be transmitted by the worker is always greater than the data amount of the DNN model parameters. In comparison with the data amount of the DNN model parameters, an extra amount of data is always transmitted in the communication network. Transmission of the DNN model parameters is easily limited by network bandwidth of the communication network, causing a large communication delay.

SUMMARY

Embodiments of the present disclosure provide a communication method and apparatus to reduce a communication delay and data redundancy in a communication network.

To achieve the foregoing objective, the following technical solutions are used in embodiments of the present disclosure.

According to a first aspect, an embodiment of the present disclosure provides a communication method. The method includes receiving at least two packets, and then aggregating the at least two packets to obtain aggregated packets. Messages to which the at least two packets separately belong have a same message index, and the message index is used to index the messages to which the at least two packets separately belong.

In other words, in a process in which a terminal device sends packets to another terminal device by using a network device, the network device performs aggregation processing on the received packets, so that a network bandwidth limitation of a communication network is avoided, thereby reducing a communication delay and data redundancy in the communication network. Because parameter data in packets identified by a same message index is parameter data of a same location of a same DNN model, the network device can accurately identify to-be-aggregated packets, so that accuracy of aggregation processing of the network device can be ensured, thereby improving DNN model training efficiency without affecting a function of forwarding a non-aggregated packet by the network device.

In a possible design, the at least two packets have a same sequence number in the messages with the same message index. Because a sequence number of a packet can also indicate a location, in the DNN model, of parameter data in the packet. When one message is split into a plurality of packets, the network device determines a to-be-aggregated packet based on a message index and a sequence number to ensure accuracy of aggregation processing of the network device.

In a possible design, if a first packet is the initial packet of a message to which the first packet belongs, the first packet further includes a first field. The first field is used to indicate to perform aggregation processing on parameter data in the message to which the first packet belongs. The first packet is any one of the at least two packets. In this way, the network device can quickly and effectively identify, based on the first field, a to-be-aggregated packet and a packet that does not need to be aggregated, so that aggregation processing efficiency can be ensured, and the network device can quickly forward the packet that does not need to be aggregated.

In a possible design, if the first packet is the initial packet of the message to which the first packet belongs, the first packet further includes a second field. The second field is used to carry a message index of the message to which the first packet belongs. The message index of the message to which the first packet belongs is used to index the message to which the first packet belongs. The first packet is any one of the at least two packets. In this way, the network device can determine, based on the second field, the message to which the first packet belongs, so that the network device aggregates packets belonging to messages with a same message index.

In a possible design, if the first packet is the initial packet of the message to which the first packet belongs, the first packet further includes a third field. The third field is used to carry a packet quantity of packets included in the message to which the first packet belongs. The first packet is any one of the at least two packets. In this way, the network device can determine, based on the third field, the quantity of packets included in the message to which the first packet belongs.

In a possible design, the first packet further includes a sequence number. The sequence number is used to indicate a transmission sequence of the first packet in a connection for transmitting the first packet. The communication method in this embodiment of the present disclosure further includes determining the connection for transmitting the first packet; determining, based on the sequence number of the first packet and the packet quantity indicated by the third field in the first packet, a first interval of sequence numbers of packets included in the message to which the first packet belongs; and storing a correspondence between the first interval and the connection for transmitting the first packet. A first end value of the first interval is the sequence number of the first packet, and a second end value of the first interval is a value determined based on the sequence number of the first packet and the packet quantity indicated by the third field in the first packet.

In this way, the network device can determine a connection for transmitting a to-be-aggregated packet and an interval within which a sequence number of a to-be-aggregated packet transmitted through the connection falls.

In a possible design, a first packet further includes a sequence number. The sequence number is used to indicate a transmission sequence of the first packet in a connection for transmitting the first packet. If the first packet is a non-first packet of a message to which the first packet belongs, the communication method in this embodiment of the present disclosure further includes determining the connection for transmitting the first packet; and if the sequence number of the first packet falls within a first interval corresponding to the connection for transmitting the first packet, determining, as the message to which the first packet belongs, a message corresponding to the first interval within which the sequence number of the first packet falls. The first packet is any one of the at least two packets. In other words, for a non-first packet of a message, the network device determines, by using a stored correspondence between a connection and a first interval and a sequence number of the first packet, the message to which the first packet belongs.

In a possible design, the communication method in this embodiment of the present disclosure further includes determining a first quantity value of first packets that belong to messages with a same message index and that have a same sequence number in the messages with the same message index; and if the first quantity value is less than a first preset value, waiting to receive a first packet that belongs to a message with the same message index and that has the same sequence number in the message with the same message index. In other words, when the network device determines that not all first packets that belong to messages with the same message index and that have the same sequence number in the messages with the same message index have arrived, the network device continues to wait to receive a first packet that belongs to a message with the same message index and that has the same sequence number in the message with the same message index.

In a possible design, the communication method in this embodiment of the present disclosure further includes determining a first quantity value of first packets that belong to messages with a same message index and that have a same sequence number in the messages with the same message index. The aggregating the at least two packets to obtain aggregated packets includes if the first quantity value is equal to a first preset value, aggregating the first packets that belong to the messages with the same message index and that have the same sequence number in the messages with the same message index to obtain the aggregated packets. In other words, only when the network device determines that all first packets that belong to messages with the same message index and that have the same sequence number in the messages with the same message index have arrived, the network device performs aggregation processing on the first messages that belong to the messages with the same message index and that have the same sequence number in the messages with the same message index.

In a possible design, the at least two packets correspond to a same channel identifier. The channel identifier is used to identify a channel for transmitting a corresponding packet. In other words, when the network device receives the at least two packets through a channel for which a channel identifier is configured, the network device aggregates packets that have a same message index and that correspond to a same channel identifier, so that accuracy of packet aggregation processing can be ensured and data transmission efficiency can also be improved.

In a possible design, if a first packet is the initial packet of a message to which the first packet belongs, the first packet further includes a fourth field. The fourth field is used to carry a channel identifier corresponding to the first packet. The channel identifier corresponding to the first packet is used to identify a channel for transmitting the first packet. The first packet is any one of the at least two packets. In this way, the network device can determine, based on the fourth field, the channel identifier corresponding to the first packet.

In a possible design, the first packet further includes a sequence number and a third field. The sequence number is used to indicate a transmission sequence of the first packet in a connection for transmitting the first packet. The third field is used to carry a packet quantity of packets included in the message to which the first packet belongs. The communication method in this embodiment of the present disclosure further includes determining the channel identifier corresponding to the first packet; determining, based on the sequence number and the packet quantity indicated by the third field, a second interval of sequence numbers of packets included in the message to which the first packet belongs; and storing a correspondence between the second interval and the channel identifier corresponding to the first packet. A first end value of the second interval is the sequence number of the first packet. A second end value of the second interval is a value determined based on the sequence number of the first packet and the packet quantity indicated by the third field in the first packet.

In a possible design, a first packet further includes a sequence number. The sequence number is used to indicate a transmission sequence of the first packet in a connection for transmitting the first packet. If the first packet is a non-first packet of a message to which the first packet belongs, the communication method in this embodiment of the present disclosure further includes determining a connection for transmitting the first packet; using, as a channel identifier corresponding to the first packet, a channel identifier corresponding to the connection for transmitting the first packet; and if the sequence number of the first packet falls within a second interval corresponding to the channel identifier, determining, as the message to which the first packet belongs, a message corresponding to the second interval within which the sequence number of the first packet falls. The first packet is any one of the at least two packets.

In this way, for a non-first packet of a message, the network device determines a connection of the first packet to restore the message to which the first packet belongs and a corresponding channel identifier.

In a possible design, the communication method in this embodiment of the present disclosure further includes determining a second quantity value of first packets that correspond to a same channel identifier, that belong to messages with a same message index, and that have a same sequence number in the messages with the same message index; and if the second quantity value is less than a second preset value, waiting to receive a first packet that corresponds to the same channel identifier, that belongs to a message with the same message index, and that has the same sequence number in the message with the same message index. In other words, when the network device determines that not all first packets that correspond to the same channel identifier, that belong to messages with the same message index, and that have the same sequence number in the messages with the same message index have arrived, the network device continues to wait to receive a first packet that corresponds to the same channel identifier, that belongs to a message with the same message index, and that has the same sequence number in the message with the same message index.

In a possible design, the communication method in this embodiment of the present disclosure further includes determining a second quantity value of first packets that correspond to a same channel identifier, that belong to messages with a same message index, and that have a same sequence number in the messages with the same message index. The aggregating the at least two packets to obtain aggregated packets includes if the second quantity value is equal to a second preset value, aggregating the first packets that correspond to the same channel identifier that belong to the messages with the same message index and that have the same sequence number in the messages with the same message index to obtain the aggregated packets. In other words, only when the network device determines that all first packets that correspond to the same channel identifier, that belong to messages with the same message index, and that have the same sequence number in the messages with the same message index have arrived, the network device performs aggregation processing on the first packets that correspond to the same channel identifier, that belong to the messages with the same message index, and that have the same sequence number in the messages with the same message index.

In a possible design, first packets are in a one-to-one correspondence with second packets, a packet header of the first packet is the same as a packet header of the second packet, and parameter data in the second packets is obtained by aggregating parameter data in all first packets in the at least two packets. The first packet is any one of the at least two packets. The second packet is an aggregated packet. In other words, the network device may replace parameter data in the first packet with parameter data obtained after aggregation processing to obtain an aggregated packet.

In a possible design, the communication method in this embodiment of the present disclosure further includes sending the aggregated packets to the terminal device or a target network device. In other words, in a process in which the terminal device sends packets to a second terminal device by using the current network device, the current network device may send aggregated packets to the second terminal device after the current network device obtains the aggregated packets, so that the second terminal device obtains the aggregated packets. Alternatively, in a process in which the terminal device sends packets to a second terminal device by using the current network device and the target network device, the current network device may send aggregated packets to the target network device after the current network device obtains the aggregated packets. The target network device can perform further aggregation processing on the aggregated packets coming from the current network device, and then send packets obtained after the further aggregation processing to the second terminal device, so that an aggregation operation amount of the network device is shared, thereby further improving aggregation operation efficiency.

According to a second aspect, an embodiment of the present disclosure provides a communication method. The method includes sending first packets, and then receiving second packets. The second packets are obtained by aggregating packets corresponding to a same message index, and the packets with the same message index separately come from a current network adapter and another network adapter. The message index is used to index messages to which the packets with the same message index separately belong.

In a possible design, the packets with the same message index have a same sequence number in the messages with the same message index.

In a possible design, if the first packet is the initial packet of a message to which the first packet belongs, the first packet further includes a first field. The first field is used to indicate to perform aggregation processing on parameter data in the message to which the first packet belongs.

In a possible design, if the first packet is the initial packet of a message to which the first packet belongs, the first packet further includes a second field. The second field is used to carry a message index of the message to which the first packet belongs. The message index of the message to which the first packet belongs is used to index the message to which the first packet belongs.

In a possible design, if the first packet is the initial packet of a message to which the first packet belongs, the first packet further includes a third field. The third field is used to carry a packet quantity of packets included in the message to which the first packet belongs.

In a possible design, the packets with the same message index correspond to a same channel identifier, and the channel identifier is used to identify a channel for transmitting the packets with the same message index.

In a possible design, if the first packet is the initial packet of the message to which the first packet belongs, the first packet further includes a fourth field, where the fourth field is used to carry a channel identifier corresponding to the first packet. The channel identifier corresponding to the first packet is used to identify a channel for transmitting the first packet.

In a possible design, there are a plurality of first packets. If parameter data in the first packets comes from a same computing device, and there are a plurality of channels for transmitting the first packets, message indexes of messages to which first packets transmitted through different channels separately belong are the same, or message indexes of messages to which first packets transmitted through different channels separately belong are different. In other words, when a plurality of first packets are transmitted through different channels, parameter data in the first packets transmitted through the different channels has different locations in a DNN model. Message indexes of messages to which first packets on different channels belong may be the same or different.

In a possible design, the communication method in this embodiment of the present disclosure further includes obtaining a message coming from a computing device, splitting the message into data packets, and encapsulating the data packets into the first packets. The message coming from the computing device includes a preset field and parameter data, the initial data packet in the data packets obtained after the splitting includes the preset field, and different data packets obtained after the splitting include parameter data of different parts. Correspondingly, the communication method in this embodiment of the present disclosure further includes reassembling second packets corresponding to a same message index into a message corresponding to the same message index, and then sending the message to the computing device. Herein, the preset field includes a first field, a second field, and a third field, or includes a first field, a second field, a third field, and a fourth field.

In other words, when the current network adapter sends first packets, the current network adapter receives a message from the computing device. A preset field in the message coming from the computing device is carried in the initial packet in the plurality of first packets. Parameter data of different parts in the message coming from the computing device is carried in different first packets in the plurality of first packets. When the current network adapter receives second packets, the current network adapter reassembles second packets corresponding to a same message index into a same message, and sends the message to the computing device.

In a possible design, the parameter data in the first packet includes a first aggregation result of parameter data of an xth part in parameter data of n parts. The parameter data of the n parts is obtained by the computing device by training the DNN model, x is a positive integer, $1 \le x \le n$, n is a positive integer, and $n \ge 2$. The computing device and other computing devices constitute a first local logical ring network topology, there are $(n-1)$ other computing devices, and each of the other computing devices trains the DNN model to obtain the parameter data of the n parts. The first aggregation result of the parameter data of the xth part is obtained by aggregating parameter data of the xth part in the computing device and the other computing devices.

Correspondingly, parameter data in the second packet includes a second aggregation result of parameter data of the xth part. The second aggregation result of the parameter data of the xth part is obtained by aggregating the first aggregation result of the parameter data of the xth part in the first local logical ring network topology and a first aggregation result of parameter data of the xth part in another local logical ring network topology. Different local logical ring network topologies include a same quantity of computing devices for training the DNN model.

In other words, when a plurality of computing devices constitutes one local logical ring network topology, parameter data in a first packet sent by the network adapter is a first aggregation result of parameter data of a part, so that a network device aggregates parameter data of different local logical ring network topologies. Parameter data in a second packet received by the network adapter is a second aggregation result of parameter data of a corresponding part, so that parameter data of different local logical ring network topologies is obtained.

In a possible design, if the first packet is a packet sent for the first time, the first packet is any packet in N messages, where N is a positive integer greater than 1. If the first packet is a packet not sent for the first time, a received second packet is obtained by aggregating a packet belonging to a message with a kth message index. The kth message index is used to index a kth message. The first packet is any packet in an (N+k)th message, where k is a positive integer. In other words, the current network adapter sends packets to the network device by using a sliding window mechanism. The network device can always cache parameter data of N messages, so that the network device can continuously perform an aggregation operation, thereby ensuring aggregation operation efficiency.

In a possible design, a packet header of the first packet is the same as a packet header of the second packet. Parameter data in the second packets is obtained by aggregating parameter data in packets belonging to messages with a same message index.

According to a third aspect, an embodiment of the present disclosure provides a communication method. The method includes an ith computing device trains a DNN model to obtain parameter data of n parts. In a jth iteration, the ith computing device sends, to an (i+1)th computing device, an aggregation processing result that is of parameter data of an $(x+i-j+1)$th part and that is obtained after $(j-1)$ iterations, and the ith computing device receives, from an $(i-1)$th computing device, an aggregation processing result that is of parameter data of an $(x+i-j)$th part and that is obtained after $(j-1)$ iterations, and aggregates the aggregation processing result and data of the $(x+i-j)$th part in the ith computing device to obtain an aggregation processing result that is of parameter data of the $(x+i-j)$th part and that is obtained after j iterations. In a $(j+1)$th iteration, the ith computing device sends, to the (i+1)th computing device, the aggregation processing result that is of the parameter data of the $(x+i-j)$th part and that is obtained after j iterations, until traversal is performed for j from 1 to $(n-1)$ and a first aggregation result of an (x+i+1)th part is obtained.

All of i, j, and x are positive integers, $1 \le i \le n$, and $1 \le x \le n$. All of the $(i-1)$th computing device, the ith computing device, and the (i+1)th computing device are distributed in a first local logical ring network topology. N computing devices in the first local logical ring network topology are sequentially connected. The first computing device in the n computing devices is connected to the last computing device in the n computing devices. If $i-1<1$, $(i-1)$ is replaced with $(i-1+n)$; if $i+1>n$, $(i+1)$ is replaced with $(i+1-n)$; if $x+i-j<1$, $(x+i-j)$ is replaced with $(x+i-j+n)$; and if $x+i-j+1>n$, $(x+i-j+1)$ is replaced with $(x+i-j+1-n)$, where n is a positive integer, and $n \ge 2$. Herein, data is transmitted between different computing devices through a bus. Then computing devices constitute the first local logical ring network topology by using the bus.

According to the communication method provided in this embodiment of the present disclosure, data is also transmitted between different computing devices. The different computing devices can perform data transmission processing, so that resources of the different computing devices are fully used, aggregation processing operation efficiency is improved, and a problem in the conventional technology that an operation amount of a computing device is excessively large is avoided.

According to a fourth aspect, an embodiment of the present disclosure provides a communication method. The method includes an ith computing device receives a second aggregation result of parameter data of an $(x+i-j+1)$th part from a network adapter. The second aggregation result of the parameter data of the $(x+i-j+1)$th part is obtained by aggregating a first aggregation result of parameter data of the $(x+i-j+1)$th part in a first local logical ring network topology and a first aggregation result of parameter data of the $(x+i-j+1)$th part in another local logical ring network topology. The first aggregation result of the parameter data of the $(x+i-j+1)$th part is obtained by aggregating parameter data of the $(x+i-j+1)$th part in n computing devices in the first local logical ring network topology.

In a jth iteration, the ith computing device sends the second aggregation result of the parameter data of the $(x+i-j+1)$th part to an (i+1)th computing device. The ith computing device receives a second aggregation result of parameter data of an $(x+i-j)$th part from an $(i-1)$th computing device, and replaces data of the $(x+i-j)$th part in the ith computing device with the second aggregation result of the parameter data of the $(x+i-j)$th part, so that in a $(j+1)$th iteration, the ith computing device sends the second aggregation result of the parameter data of the $(x+i-j)$th part to the $(i+1)$th computing device, until traversal is performed for j from 1 to $(n-1)$ and a second aggregation result of an $(x+i+1)$th part is obtained. All of i, j, and x are positive integers, $1 \leq i \leq n$, and $1 \leq x \leq n$. All of the $(i-1)$th computing device, the ith computing device, and the $(i+1)$th computing device are distributed in the first local logical ring network topology. The n computing devices in the first local logical ring network topology are sequentially connected. The first computing device in the n computing devices is connected to the last computing device in the n computing devices. If $i-1<1$, $(i-1)$ is replaced with $(i-1+n)$; if $i+1>n$, $(i+1)$ is replaced with $(i+1-n)$; if $x+i-j<1$, $(x+i-j)$ is replaced with $(x+i-j+n)$; and if $x+i-j+1>n$, $(x+i-j+1)$ is replaced with $(x+i-j+1-n)$, where n is a positive integer, and $n \geq 2$.

According to the communication method provided in this embodiment of the present disclosure, data is also transmitted between different computing devices, and the different computing devices can perform data replacement processing, so that resources of the different computing devices are fully used, aggregation processing operation efficiency is improved, and a problem in the conventional technology that an operation amount of a computing device is excessively large is avoided.

According to a fifth aspect, an embodiment of the present disclosure provides a terminal device. The terminal device includes a network adapter and n computing devices. The network adapter is configured to perform the communication method according to any one of the second aspect and the possible designs of the second aspect. The n computing devices are sequentially connected. The first computing device in the n computing devices is connected to the last computing device in the n computing devices to constitute a local logical ring network topology. The second computing device in any three adjacent computing devices in the n computing devices is configured to perform the communication method according to the third aspect or the fourth aspect, where n is a positive integer and $n \geq 2$.

According to a sixth aspect, an embodiment of the present disclosure provides a communication apparatus. The communication apparatus includes units configured to perform steps in any one of the foregoing aspects. The communication apparatus may be the network device in the first aspect or an apparatus including the network device; or the communication apparatus may be the network adapter in the second aspect or an apparatus including the network adapter; or the communication apparatus may be the computing device in the third aspect or an apparatus including the computing device; or the communication apparatus may be the computing device in the fourth aspect or an apparatus including the computing device; or the communication apparatus may be the terminal device in the fifth aspect or an apparatus including the terminal device.

According to a seventh aspect, an embodiment of the present disclosure provides a communication apparatus that includes that includes a processor and an interface circuit. The processor is configured to communicate with another apparatus by using the interface circuit, and perform the communication method provided in any one of the foregoing aspects. There are one or more processors. The communication apparatus may be the network device in the first aspect or an apparatus including the network device; or the communication apparatus may be the network adapter in the second aspect or an apparatus including the network adapter; or the communication apparatus may be the computing device in the third aspect or an apparatus including the computing device; or the communication apparatus may be the computing device in the fourth aspect or an apparatus including the computing device; or the communication apparatus may be the terminal device in the fifth aspect or an apparatus including the terminal device.

According to an eighth aspect, an embodiment of the present disclosure provides a communication apparatus that includes a processor configured to connect to a memory, and invoke a program stored in the memory to perform the communication method provided in any one of the foregoing aspects. The memory may be located in the communication apparatus or outside the communication apparatus. In addition, there are one or more processors. The communication apparatus may be the network device in the first aspect or an apparatus including the network device; or the communication apparatus may be the network adapter in the second aspect or an apparatus including the network adapter; or the communication apparatus may be the computing device in the third aspect or an apparatus including the computing device; or the communication apparatus may be the computing device in the fourth aspect or an apparatus including the computing device; or the communication apparatus may be the terminal device in the fifth aspect or an apparatus including the terminal device.

According to a ninth aspect, an embodiment of the present disclosure provides a communication apparatus that includes at least one processor and at least one memory. The at least one processor is configured to perform the communication method provided in any one of the foregoing aspects. The communication apparatus may be the network device in the first aspect or an apparatus including the network device; or the communication apparatus may be the network adapter in the second aspect or an apparatus including the network adapter; or the communication apparatus may be the computing device in the third aspect or an apparatus including the computing device; or the communication apparatus may be the computing device in the fourth aspect or an apparatus including the computing device; or the communication apparatus may be the terminal device in the fifth aspect or an apparatus including the terminal device.

According to a tenth aspect, an embodiment of the present disclosure provides a computer readable storage medium. The computer readable storage medium stores instructions, and when the instructions run on a computer, the computer can perform the communication method according to any possible design of any one of the foregoing aspects.

According to an eleventh aspect, an embodiment of the present disclosure provides a computer program product including instructions. When the computer program product runs on a computer, the computer can perform the communication method according to any possible design of any one of the foregoing aspects.

According to a twelfth aspect, an embodiment of the present disclosure provides a circuit system. The circuit system includes a processing circuit. The processing circuit is configured to perform the communication method according to any possible design of any one of the foregoing aspects.

According to a thirteenth aspect, an embodiment of the present disclosure provides a chip. The chip includes a processor. The processor is coupled to a memory. The memory stores program instructions, and when the program instructions stored in the memory are executed by the processor, the communication method in any possible design of any one of the foregoing aspects is implemented.

According to a fourteenth aspect, an embodiment of the present disclosure provides a communication system. The communication system includes the network device in any one of the foregoing aspects and the terminal device in any one of the foregoing aspects; or the communication system includes the network device in any one of the foregoing aspects and a network adapter; or the communication system includes the network device in any one of the foregoing aspects, a network adapter, and the computing device in any one of the foregoing aspects.

For technical effects brought by any design manner of the second aspect to the fourteenth aspects, refer to technical effects brought by different design manners of the first aspect.

BRIEF DESCRIPTION OF DRAWINGS

FIG. 9 is a schematic flowchart of another communication method according to an embodiment of the present disclosure;

FIG. 10 is a schematic diagram of a structure of packets obtained after a message is split according to an embodiment of the present disclosure;

FIG. 22 is a schematic flowchart of another communication method according to an embodiment of the present disclosure;

FIG. 26 is a schematic flowchart of another communication method according to an embodiment of the present disclosure;

FIG. 27 is a schematic diagram of composition of a communication apparatus according to an embodiment of the present disclosure.

DESCRIPTION OF EMBODIMENTS

Terms such as "first" and "second" in the specification and the accompanying drawings of the present disclosure are used to distinguish between different objects, or are used to distinguish between different processing performed on a same object, and are not used to describe a specific sequence of objects. In addition, the terms "including", "having", or any other variant thereof mentioned in descriptions of the present disclosure are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in embodiments of the present disclosure, the word "example" or "for example" or the like is used to represent giving an example, an illustration, or a description. Any embodiment or design scheme described as an "example" or "for example" in embodiments of the present disclosure should not be interpreted as being more preferred or having more advantages than another embodiment or design scheme. Use of the word "example" or "for example" or the like is intended to present a relative concept in a specific manner.

To make the present disclosure clearer, some concepts and processing procedures mentioned in the present disclosure are first briefly described.

(1) Neural Network

A neural network (NN) may include virtual neurons. One virtual neuron may be one operation unit. Input of an operation unit may be $x_s+b$, and output of the operation unit may be $h_{W,b}(x)=f(W^Tx)=f(\Sigma_{s=1}^{k}W_sx_s+b)$. $s=1, 2, \ldots k$, and k is a positive integer greater than 1. $W_s$ is a weight of $x_s$. b is an offset of the virtual neuron. $f$ is an activation function of the virtual neuron, and is used to introduce a nonlinear characteristic into the neural network, so that an input signal in the virtual neuron is converted into an output signal. For example, the activation function may be a sigmoid function. The output signal of the activation function may be used as input of a next layer.

The neural network is a network formed by connecting a plurality of single virtual neurons together, in other words, output of one virtual neuron may be input of another virtual neuron.

2. DNN

Figure 1:
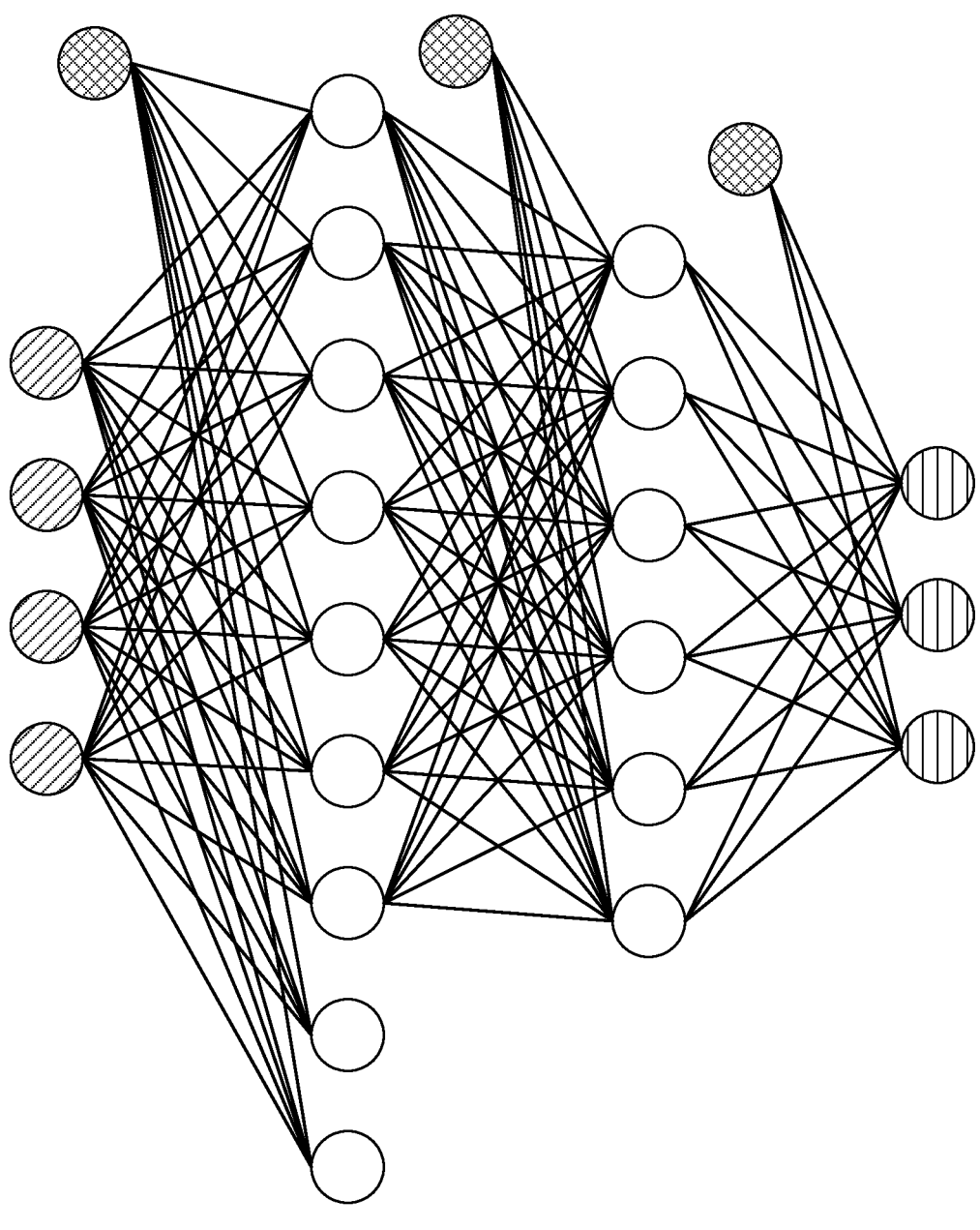
FIG. 1 is a schematic diagram of a deep neural network according to a related technology.

A deep neural network, also referred to as a multi-layer neural network, may be understood as a neural network including a plurality of hidden layers. A DNN model is divided based on locations of different layers. A neural network inside the DNN model may be divided into an input layer, a hidden layer, and an output layer. Generally, the first layer is the input layer, the last layer is the output layer, and the middle layer is the hidden layer. There is a connection between virtual neurons of different layers. A random value or "a weight (weights)" is allocated to the connection between virtual neurons. For example, FIG. 1 shows a DNN model. In the DNN model shown in FIG. 1, layers are fully connected. In FIG. 1, one circle indicates one virtual neuron. A circle filled by slashes indicates a virtual neuron of an input layer, a circle without filling indicates a virtual neuron of a hidden layer, a circle filled by vertical lines indicates a virtual neuron of an output layer, and a circle filled by grid lines indicates an offset node. Any virtual neuron of an $x^{th}$ layer is certainly connected to all virtual neurons of an $(x+1)^{th}$ layer.

Parameter data in the DNN model is defined as follows: A coefficient of a $k^{th}$ virtual neuron of an $(L-1)^{th}$ layer to a jth virtual neuron of an $L^{th}$ layer is defined as $W_{jk}^{L}$. For example, in a three-layer DNN model, a linear coefficient of the fourth virtual neuron of the second layer to the second virtual neuron of the third layer is defined as $W_{24}^{3}$. The superscript 3 represents a layer at which the coefficient W is located, and the subscript corresponds to an output third-layer index 2 and an input second-layer index 4.

It should be noted that the input layer has no parameter data W. In the deep neural network, more hidden layers make the deep neural network more capable of describing a complex case in the real world. Theoretically, a DNN model with more parameter data indicates higher complexity, a larger "capacity", and a more complex learning task that can be completed by the DNN model. A process of training the DNN model is a process of learning a weight matrix, and an ultimate purpose of the process is to obtain a weight matrix of all layers of an optimal deep neural network. Weights are parameter data of the DNN model.

Generally, it takes quite long time to train a DNN model, and reasons thereof include but are not limited to the following three reasons:

First, an amount of parameter data of a typical DNN model is large (for example, nearly 200 million pieces of parameter data are included, and an amount of the parameter data exceeds 500 MB). It may take several days to train a DNN model.

Second, to improve accuracy of the DNN model, training data is also huge. For example, a common ImageNet training set is used as training data, and a batch size (batch size) is equal to 32. Because the ImageNet training set includes 14,197,122 images, 443,661 training iterations need to be performed in one training epoch (epoch).

Third, when the DNN model is applied to an application (for example, automated driving) with a relatively high requirement for real-time performance, parameter data of the DNN model needs to be periodically retrained.

Because it takes long time to train parameter data of the DNN model, it is quite important to shorten training time by using an efficient parallel distributed DNN training method. Currently, there are two common distributed DNN training methods.

The first method is a distributed DNN training method based on a parameter server (PS)-worker architecture.

Figures 2, 3:
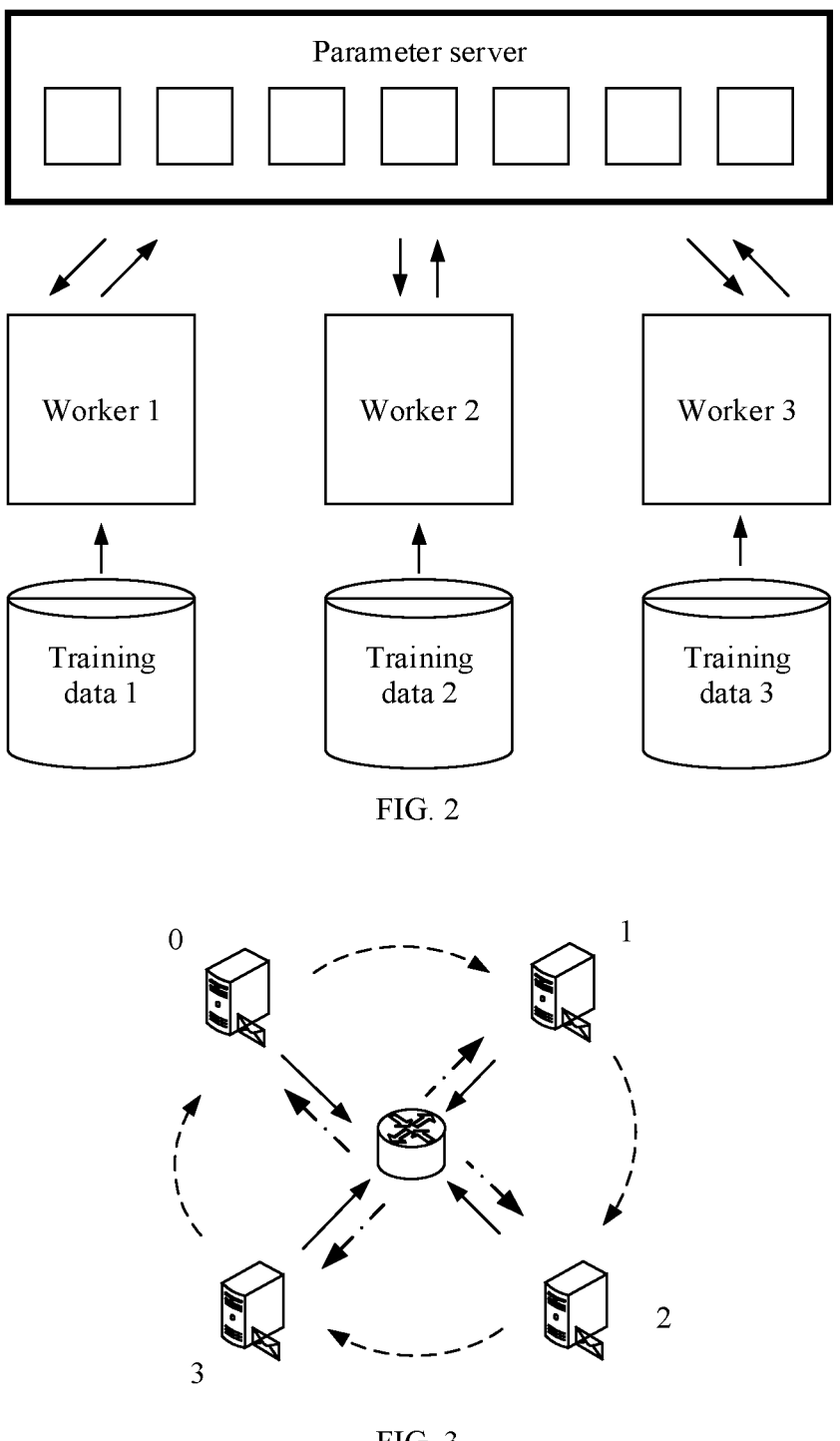
FIG. 2 is a schematic flowchart of a distributed DNN training method according to a related technology.
FIG. 3 is a schematic diagram of a system architecture of another type of distributed DNN training according to a related technology.

Refer to FIG. 2. In FIG. 2, one thick-line box indicates one parameter server. One square in the thick-line box indicates one data block. The distributed DNN training method based on the PS-worker architecture includes the following processing process: First, p workers (only three workers are shown in FIG. 2: a worker 1, a worker 2, and a worker 3) separately upload parameter gradients $\Delta w$ obtained through local training to the PS, where p is a positive integer greater than 1. For example, in FIG. 2, the worker 1 obtains $\Delta w_1$ based on training data 1, and the worker 1 returns $\Delta w_1$ to the PS. The worker 2 obtains $\Delta w_2$ based on training data 2, and the worker 2 returns $\Delta w_2$ to the PS. The worker 3 obtains $\Delta w_3$ based on training data 3, and the worker 3 returns $\Delta w_3$ to the PS. Then parameter aggregation is performed at a PS end to obtain new parameter data w'. In actual application, w', $\Delta w$, and w may meet the following relationship: $w'=w-\mu\cdot\Delta w=w-\mu\cdot(\Delta w_1+\Delta w_2+\Delta w_3)$. w' is updated parameter data, w is parameter data existing before the update, and y is a coefficient. In this way, one iteration is completed. If a new iteration is to be performed, the PS delivers the newly obtained parameter w' to each of the p workers to perform the new iteration. The foregoing entire communication process may mainly include two steps. Step 1: Perform convergence upward. To be specific, all workers transmit parameter data gradients such as $\Delta w_1$, $\Delta w_2$, or $\Delta w_3$ to the PS, so that parameter data aggregation is performed at the PS end. Step 2: Perform distribution downward. The PS distributes updated parameter data such as w' to all the workers.

It can be learned that in one process in which p workers separately exchange parameter data of a DNN model with a same parameter server, an amount of data that needs to be transmitted by one worker is twice a data amount of DNN model parameters, and an amount of data that needs to be transmitted by the parameter server is 2p times the data amount of the DNN model parameters. Further, to resolve a communication bottleneck problem of a single parameter server, a plurality of parameter servers are used to implement functions of the single parameter server. In this case, it is difficult to determine a proportion of a quantity of parameter servers to a quantity of workers. Further, if the configured proportion of the quantity of parameter servers to the quantity of workers is improper, idle resources occur, causing a waste of resources.

The second method is ring-all-reduce processing.

An all-reduce operation is to reduce cross-process data and write a same result into each process. An all-reduce operation implemented in a global logical ring network topology may be described as ring-all-reduce processing. Refer to FIG. 3. In a specific implementation process, a process of a worker sends a data block to a process of a next adjacent worker in a global logical ring network topology, and in addition, the worker receives another data block sent by a process of a previous adjacent worker in the global logical ring network topology. In FIG. 3, a worker 0, a worker 1, a worker 2, and a worker 3 constitute the global logical ring network topology. In FIG. 3, a dashed line with an arrow indicates a transmission direction of a data block in a logical procedure. For example, a dashed line with an arrow between the worker 0 and the worker 1 indicates that the worker 0 transmits a data block to the worker 1. The data block is transmitted by the worker 0 to a network device (as indicated by a solid line with an arrow between the worker 0 and the network device), and then is transmitted by the network device to the worker 1 (as indicated by a dash-dotted line with an arrow between the network device and the worker 1). A transmission status between other workers may be similar. Herein, a plurality of workers transmit data by using the network device, and the plurality of workers constitute a global logical ring network topology by using the network device.

Figure 4:
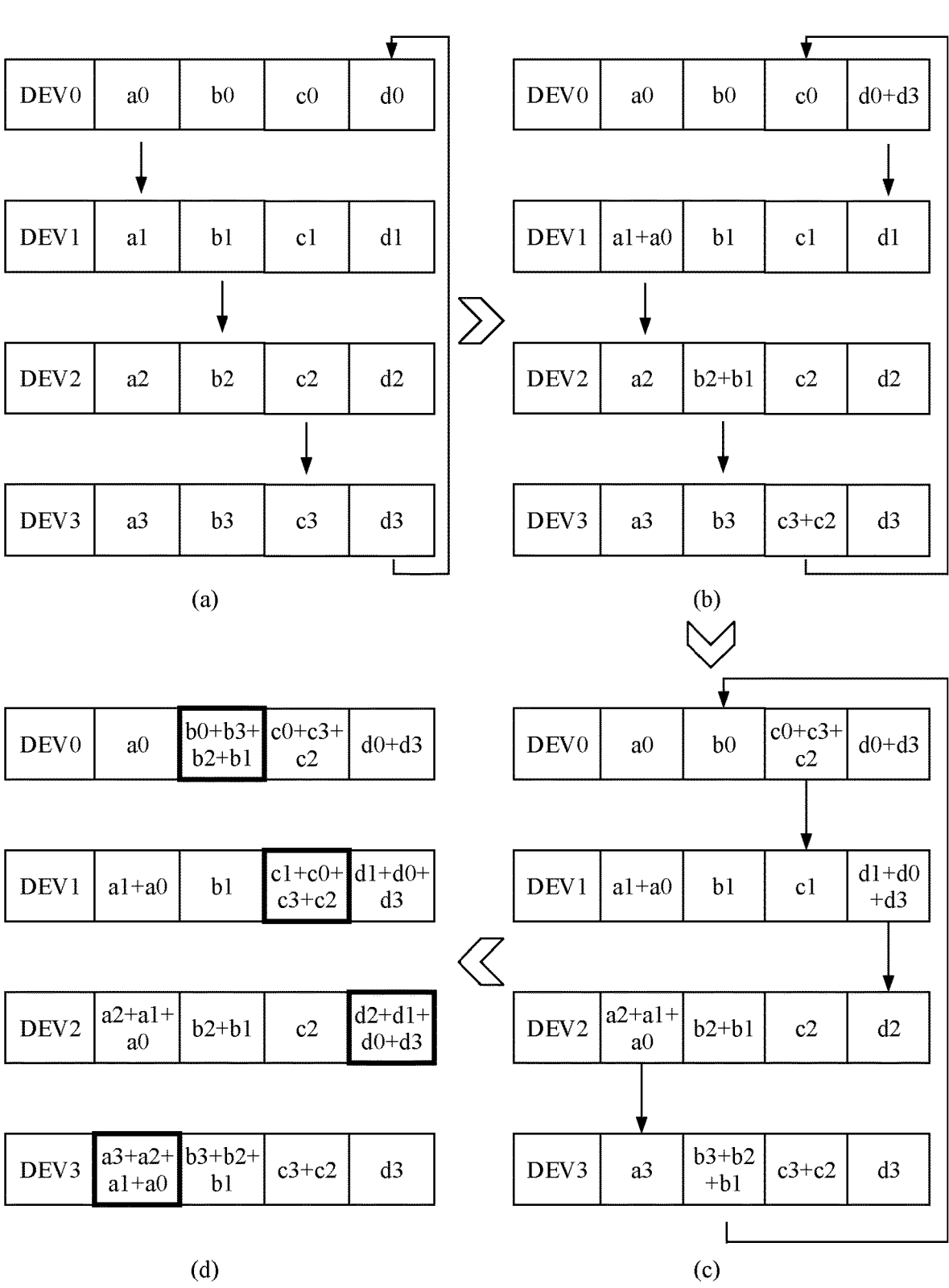
FIG. 4 is a schematic flowchart of a first stage of ring-all-reduce processing according to a related technology.

Refer to (a) in FIG. 4. One worker includes one computing device (DEV). The computing device may be a graphics processing unit (GPU).

A computing device of a worker 0 is denoted as a DEV 0, a computing device of a worker 1 is denoted as a DEV 1, a computing device of a worker 2 is denoted as a DEV 2, and a computing device of a worker 3 is denoted as a DEV 3. Different workers separately perform one time of training based on different training data to separately obtain parameter data of a DNN model. In part (a) in FIG. 4, parameter data of a same part (for example, a same layer) of the DNN model may be identified by using a same letter. For example, the parameter data of the DNN model includes weight vectors of different layers. Parameter data in a data block a may be weight vectors of the fourth layer, parameter data in a data block b may be weight vectors of the third layer, parameter data in a data block c may be weight vectors of the second layer, and parameter data in a data block d may be weight vectors of the first layer. In this way, parameter data that is of the DNN model and that is obtained by the DEV 0 may be divided into four data blocks, and parameter data in the four data blocks is respectively denoted as a0, b0, c0, and d0. Parameter data that is of the DNN model and that is obtained by the DEV 1 may be divided into four data blocks, and parameter data in the four data blocks is respectively denoted as a1, b1, c1, and d1. Parameter data that is of the DNN model and that is obtained by the DEV 2 may be divided into four data blocks, and parameter data in the four data blocks is respectively denoted as a2, b2, c2, and d2. Parameter data that is of the DNN model and that is obtained by the DEV 3 may be divided into four data blocks, and parameter data in the four data blocks is respectively denoted as a3, b3, c3, and d3. Parameter data in a data block transmitted by the DEV 0 to the DEV 1 is a0. Parameter data in a data block transmitted by the DEV 1 to the DEV 2 is b1. Parameter data in a data block transmitted by the DEV 2 to the DEV 3 is c2. Parameter data in a data block transmitted by the DEV 3 to the DEV 0 is d3.

An all-reduce implementation process includes two stages: scatter-reduce and all-gather. It is assumed that there are a total of p workers, each worker has one computing device DEV, and one DEV performs one process.

In the scatter-reduce stage, each DEV finally has partial aggregated data after (p−1) steps. When one worker performs DNN model training by using one DEV, p also indicates a quantity of computing devices.

For example, in the first step, as shown in part (a) in FIG. 4, the parameter data in the data block transmitted by the DEV 0 to the DEV 1 is a0. The parameter data in the data block transmitted by the DEV 1 to the DEV 2 is b1. The parameter data in the data block transmitted by the DEV 2 to the DEV 3 is c2. The parameter data in the data block transmitted by the DEV 3 to the DEV 0 is d3. In this case, as shown in part (b) in FIG. 4, parameter data in four data blocks obtained by the DEV 0 is respectively denoted as a0, b0, c0, and (d0+d3), where (d0+d3) indicates parameter data in one data block, and the parameter data in the data block is obtained by aggregating the parameter data "d0" and the parameter data "d3". Parameter data in four data blocks obtained by the DEV 1 is respectively denoted as (a1+a0), b1, c1, and d1, where (a1+a0) indicates parameter data in one data block, and the parameter data in the data block is obtained by aggregating the parameter data "a1" and the parameter data "a0". Parameter data in four data blocks obtained by the DEV 2 is respectively denoted as a2, (b2+b1), c2, and d2, where (b2+b1) indicates parameter data in one data block, and the parameter data in the data block is obtained by aggregating the parameter data "b2" and the parameter data "b1". Parameter data in four data blocks obtained by the DEV 3 is respectively denoted as a3, b3, (c3+c2), and d3, where (c3+c2) indicates parameter data in one data block, and the parameter data in the data block is obtained by aggregating the parameter data "c3" and the parameter data "c2".

In the second step, as shown in part (b) in FIG. 4, parameter data in a data block transmitted by the DEV 0 to the DEV 1 is (d0+d3). Parameter data in a data block transmitted by the DEV 1 to the DEV 2 is (a1+a0). Parameter data in a data block transmitted by the DEV 2 to the DEV 3 is (b2+b1). Parameter data in a data block transmitted by the DEV 3 to the DEV 0 is (c3+c2). In this case, as shown in part (c) in FIG. 4, parameter data in four data blocks obtained by the DEV 0 is respectively denoted as a0, b0, (c0+c3+c2), and (d0+d3). Parameter data in four data blocks obtained by the DEV 1 is respectively denoted as (a1+a0), b1, c1, and (d1+d0+d3). Parameter data in four data blocks obtained by the DEV 2 is respectively denoted as (a2+a1+a0), (b2+b1), c2, and d2. Parameter data in four data blocks obtained by the DEV 3 is respectively denoted as a3, (b3+b2+b1), (c3+c2), and d3.

In the third step, as shown in part (c) in FIG. 4, parameter data in a data block transmitted by the DEV 0 to the DEV 1 is (c0+c3+c2). Parameter data in a data block transmitted by the DEV 1 to the DEV 2 is (d1+d0+d3). Parameter data in a data block transmitted by the DEV 2 to the DEV 3 is (a2+a1+a0). Parameter data in a data block transmitted by the DEV 3 to the DEV 0 is (b3+b2+b1). In this case, as shown in part (d) in FIG. 4, parameter data in four data blocks obtained by the DEV 0 is respectively denoted as a0, (b0+b3+b2+b1), (c0+c3+c2), and (d0+d3). Parameter data in four data blocks obtained by the DEV 1 is respectively denoted as (a1+a0), b1, (c1+c0+c3+c2), and (d1+d0+d3). Parameter data in four data blocks obtained by the DEV 2 is respectively denoted as (a2+a1+a0), (b2+b1), c2, and (d2+d1+d0+d3). Parameter data in four data blocks obtained by the DEV 3 is respectively denoted as (a3+a2+a1+a0), (b3+b2+b1), (c3+c2), and d3.

In other words, after three steps, each DEV finally has partial aggregated data, namely, a result of partial aggregation corresponding to one of the four data blocks. In part (d) in FIG. 4, a data block with a result of partial aggregation may be indicated by a thick-line box.

In the all-gather stage, after $(p-1)$ iterations, each DEV includes all aggregated data, to end with complete aggregated data.

Figure 5:
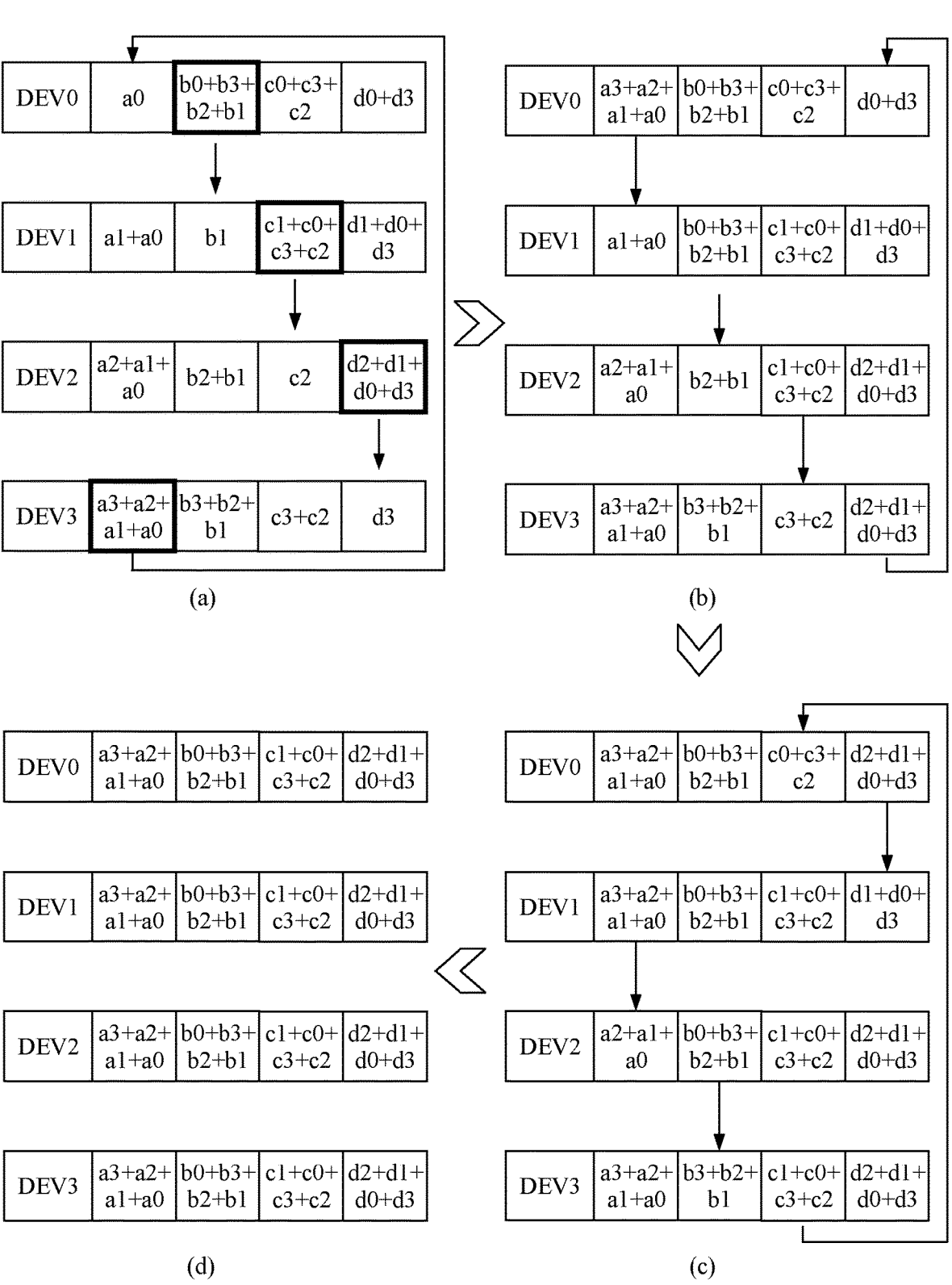
FIG. 5 is a schematic flowchart of a second stage of ring-all-reduce processing according to a related technology.

For example, in the first step, as shown in part (a) in FIG. 5, parameter data in a data block transmitted by the DEV 0 to the DEV 1 is (b0+b3+b2+b1). Parameter data in a data block transmitted by the DEV 1 to the DEV 2 is (c1+c0+c3+c2). Parameter data in a data block transmitted by the DEV 2 to the DEV 3 is (d2+d1+d0+d3). Parameter data in a data block transmitted by the DEV 3 to the DEV 0 is (a3+a2+a1+a0). In this case, as shown in part (b) in FIG. 5, parameter data in four data blocks obtained by the DEV 0 is respectively denoted as (a3+a2+a1+a0), (b0+b3+b2+b1), (c0+c3+c2), and (d0+d3). Parameter data in four data blocks obtained by the DEV 1 is respectively denoted as (a1+a0), (b0+b3+b2+b1), (c1+c0+c3+c2), and (d1+d0+d3). Parameter data in four data blocks obtained by the DEV 2 is respectively denoted as (a2+a1+a0), (b2+b1), (c1+c0+c3+c2), and (d2+d1+d0+d3). Parameter data in four data blocks obtained by the DEV 3 is respectively denoted as (a3+a2+a1+a0), (b3+b2+b1), (c3+c2), and (d2+d1+d0+d3).

In the second step, as shown in part (b) in FIG. 5, parameter data in a data block transmitted by the DEV 0 to the DEV 1 is (a3+a2+a1+a0). Parameter data in a data block transmitted by the DEV 1 to the DEV 2 is (b0+b3+b2+b1). Parameter data in a data block transmitted by the DEV 2 to the DEV 3 is (c1+c0+c3+c2). Parameter data in a data block transmitted by the DEV 3 to the DEV 0 is (d2+d1+d0+d3). In this case, as shown in part (c) in FIG. 5, parameter data in four data blocks obtained by the DEV 0 is respectively denoted as (a3+a2+a1+a0), (b0+b3+b2+b1), (c0+c3+c2), and (d2+d1+d0+d3). Parameter data in four data blocks obtained by the DEV 1 is respectively denoted as (a3+a2+a1+a0), (b0+b3+b2+b1), (c1+c0+c3+c2), and (d1+d0+d3). Parameter data in four data blocks obtained by the DEV 2 is respectively denoted as (a2+a1+a0), (b0+b3+b2+b1), (c1+c0+c3+c2), and (d2+d1+d0+d3). Parameter data in four data blocks obtained by the DEV 3 is respectively denoted as (a3+a2+a1+a0), (b3+b2+b1), (c1+c0+c3+c2), and (d2+d1+d0+d3).

In the third step, as shown in part (c) in FIG. 5, parameter data in a data block transmitted by the DEV 0 to the DEV 1 is (d2+d1+d0+d3). Parameter data in a data block transmitted by the DEV 1 to the DEV 2 is (a3+a2+a1+a0). Parameter data in a data block transmitted by the DEV 2 to the DEV 3 is (b0+b3+b2+b1). Parameter data in a data block transmitted by the DEV 3 to the DEV 0 is (c1+c0+c3+c2). In this case, as shown in part (d) in FIG. 5, parameter data in four data blocks obtained by each of the DEV 0, the DEV 1, the DEV 2, and the DEV 3 is respectively denoted as (a3+a2+a1+a0), (b0+b3+b2+b1), (c1+c0+c3+c2), and (d2+d1+d0+d3).

In other words, after three steps, each DEV finally has all aggregated data, namely, results of partial aggregation corresponding to different data blocks in the four data blocks, as specifically shown in part (d) in FIG. 5.

It can be learned that assuming that a data amount of parameter data of the DNN model is M, an amount of data that needs to be transmitted by each of p DEVs to complete one step is M/p. If the p DEVs complete one time of ring-all-reduce processing, an amount of data that needs to be transmitted by each of the p DEVs is $2(p-1)M/p$, in other words, is $2(p-1)/p$ times the amount of the parameter data of the DNN model. When there are a huge quantity of DEVs, if the p DEVs complete one time of ring-all-reduce processing, an amount of data that needs to be transmitted by each of the p DEVs is nearly twice the amount of the parameter data of the DNN model.

In conclusion, an amount of data that needs to be transmitted by the DEV is always greater than the amount of the parameter data of the DNN model. In comparison with the amount of the parameter data of the DNN model, an extra amount of data is always transmitted in a communication network. Because the amount of the parameter data of the DNN model is huge, and is often up to hundreds of megabytes, transmission of the parameter data of the DNN model is easily limited by network bandwidth of the communication network, causing a large communication delay.

Figure 6:
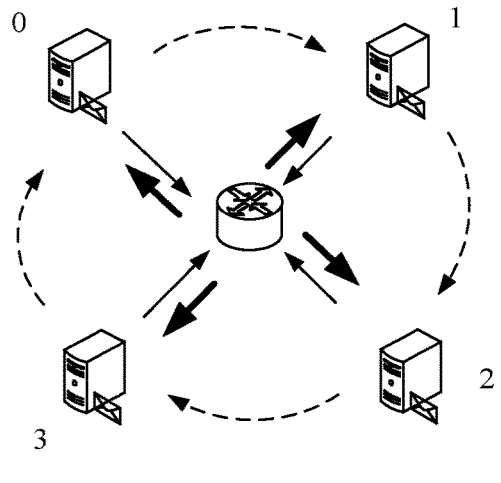
FIG. 6 is a diagram of an architecture of a communication system according to an embodiment of the present disclosure.

In view of this, embodiments of the present disclosure provide a communication method. A communication system to which the communication method in embodiments of the present disclosure is applicable is first described. Refer to FIG. 6. The communication system includes a network device and a plurality of terminal devices (only four terminal devices are shown in FIG. 6). Each terminal device is wired or wirelessly connected to the network device, and each terminal device can communicate with the network device. The plurality of terminal devices constitute one global logical ring network topology by using the network device. In the global logical ring network topology formed by the plurality of terminal devices, parameter data may be transmitted clockwise or counterclockwise.

It should be noted that for each terminal device in one global logical ring network topology, one upstream adjacent terminal device and one downstream adjacent terminal device exist in any transmission direction. For example, in the global logical ring network topology shown in FIG. 6, in a clockwise direction, an upstream adjacent terminal device of a terminal device 0 is a terminal device 3, and a downstream adjacent terminal device of the terminal device 0 is a terminal device 1.

The network device may be a network node, for example, a switch or a router, that has functions of forwarding a packet, caching a resource, performing writing, reading, deletion, and addition on stored data, and the like. Herein, when the communication method in embodiments of the present disclosure is applied to a data center network, the switch may be a top on rack (TOR) switch, or may be a spine switch.

The terminal device may be a terminal device in a distributed DNN training network. The terminal device can perform a DNN model training process based on allocated training data.

Figure 7:
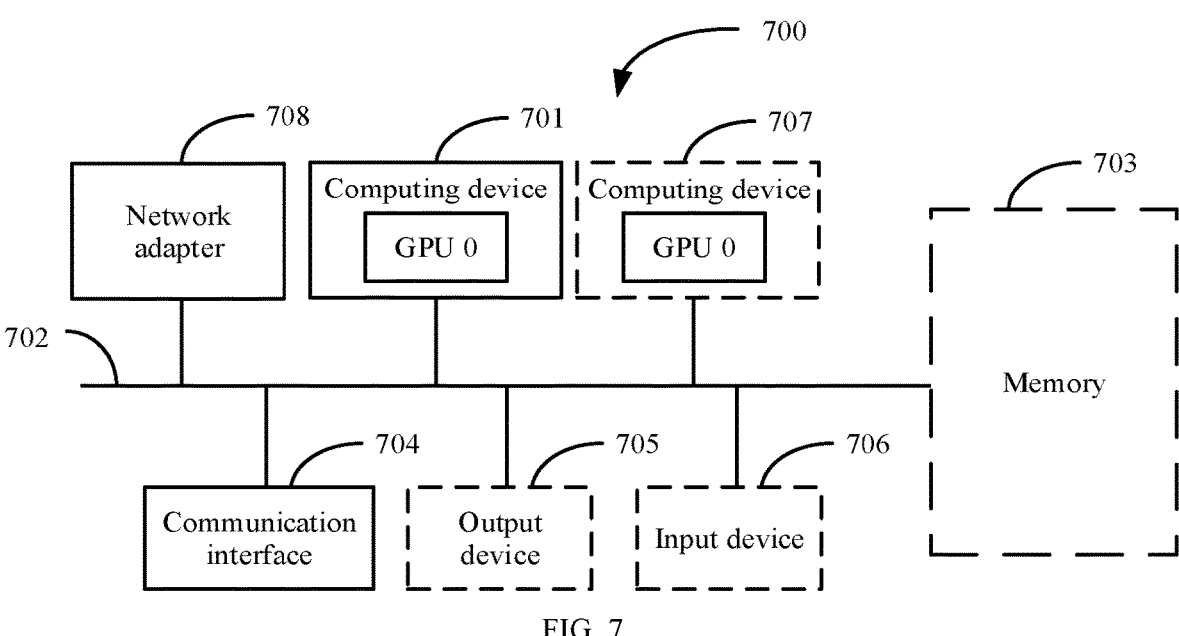
FIG. 7 is a schematic diagram of a structure of a terminal device according to an embodiment of the present disclosure.

A terminal device 700 shown in FIG. 7 is used as an example to describe in detail a terminal device applicable to embodiments of the present disclosure.

As shown in FIG. 7, the terminal device 700 includes one or more computing devices such as a computing device 701 and/or a computing device 707, at least one communication interface such as a communication interface 704, a network adapter 708, and a bus 702. Optionally, the terminal device 700 may further include a memory 703. The following uses the computing device 701 as an example for description.

The computing device 701 may be a central processing unit (CPU), a GPU, a neural network processing unit (NPU), a microprocessor, an application-specific integrated circuit (ASIC), a field-programmable gate array (FPGA), or one or more integrated circuits that integrate a plurality of processing circuit functions (for example, a CPU and an ASIC).

The bus 702 is configured to connect different components.

The communication interface 704 may be a transceiver circuit and is configured to communicate with another device or a communication network such as a cloud computing network, the Ethernet, a radio access network (RAN), or a wireless local area network (WLAN). For example, the transceiver circuit may be an apparatus such as a transceiver. Optionally, the communication interface 704 may be an input/output (I/O) circuit of the computing device 701 to implement signal input and signal output of the computing device 701.

The memory 703 may be an apparatus with a storage function. For example, the memory 703 may be a read-only memory (ROM) or another type of static storage device capable of storing static information and instructions, a random-access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer. However, the memory 703 is not limited thereto. The memory 703 may exist independently and is connected to the computing device 701 by using the bus 702. The memory 703 may be alternatively integrated with the computing device 701.

The memory 703 is configured to store computer-executable instructions for executing the solutions of the present disclosure, and the computing device 701 controls the execution. The computing device 701 is configured to read and execute computer instructions (for example, using a CPU) or a configuration file (for example, using an FPGA) stored in the memory 703 to implement the communication method provided in embodiments of the present disclosure.

The network adapter 708 is also referred to as a network interface card (NIC) and is configured to convert to-be-transmitted data into a format that can be identified by another device in the network to implement a network connection function of the terminal device.

Optionally, in this embodiment of the present disclosure, the computing device 701 may perform a related processing function in a communication method provided in the following embodiments of the present disclosure. The communication interface 704 is responsible for communicating with another device or a communication network. This is not specifically limited in this embodiment of the present disclosure.

Optionally, the computer-executable instructions in this embodiment of the present disclosure may also be referred to as application program code. This is not specifically limited in this embodiment of the present disclosure.

During specific implementation, in an embodiment, the terminal device 700 may alternatively include a plurality of computing devices such as the computing device 701 and the computing device 707 in FIG. 7. Each of the computing devices may be a single-core processor or may be a multi-core processor.

During specific implementation, in an embodiment, the terminal device 700 may further include an output device 705 and an input device 706. The output device 705 communicates with the computing device 701, and may output information in a plurality of manners. For example, the output device 705 may be a touchscreen, a liquid-crystal display (LCD), a light-emitting diode (LED) display device, a cathode-ray tube (CRT) display device, a projector, or a printer. The input device 706 communicates with the computing device 701, and may receive input from a user in a plurality of manners. For example, the input device 706 may be a mouse, a keyboard, a touchscreen device, or a sensing device.

The terminal device 700 may be a desktop computer, a network server, a wireless terminal device, an embedded device, or a single device with a structure similar to that in FIG. 7. Certainly, the terminal device 700 may be a software entity and/or a hardware entity disposed inside each of the foregoing single devices, for example, a chip or a chip system configured to perform the communication method provided in embodiments of the present disclosure. A type of the terminal device 700 is not limited in this embodiment of the present disclosure.

It should be understood that FIG. 7 is only a simplified schematic diagram of an example for ease of understanding, and the terminal device may further include other components, circuits, or apparatus not shown in FIG. 7.

It should be noted that one terminal device serves as one worker. One terminal device may include one computing device or a plurality of computing devices.

The communication system and the service scenario described in embodiments of the present disclosure are intended to more clearly describe the technical solutions in embodiments of the present disclosure, and do not constitute a limitation on the technical solutions provided in embodiments of the present disclosure.

The following specifically describes the communication method provided in embodiments of the present disclosure.

Figure 8:
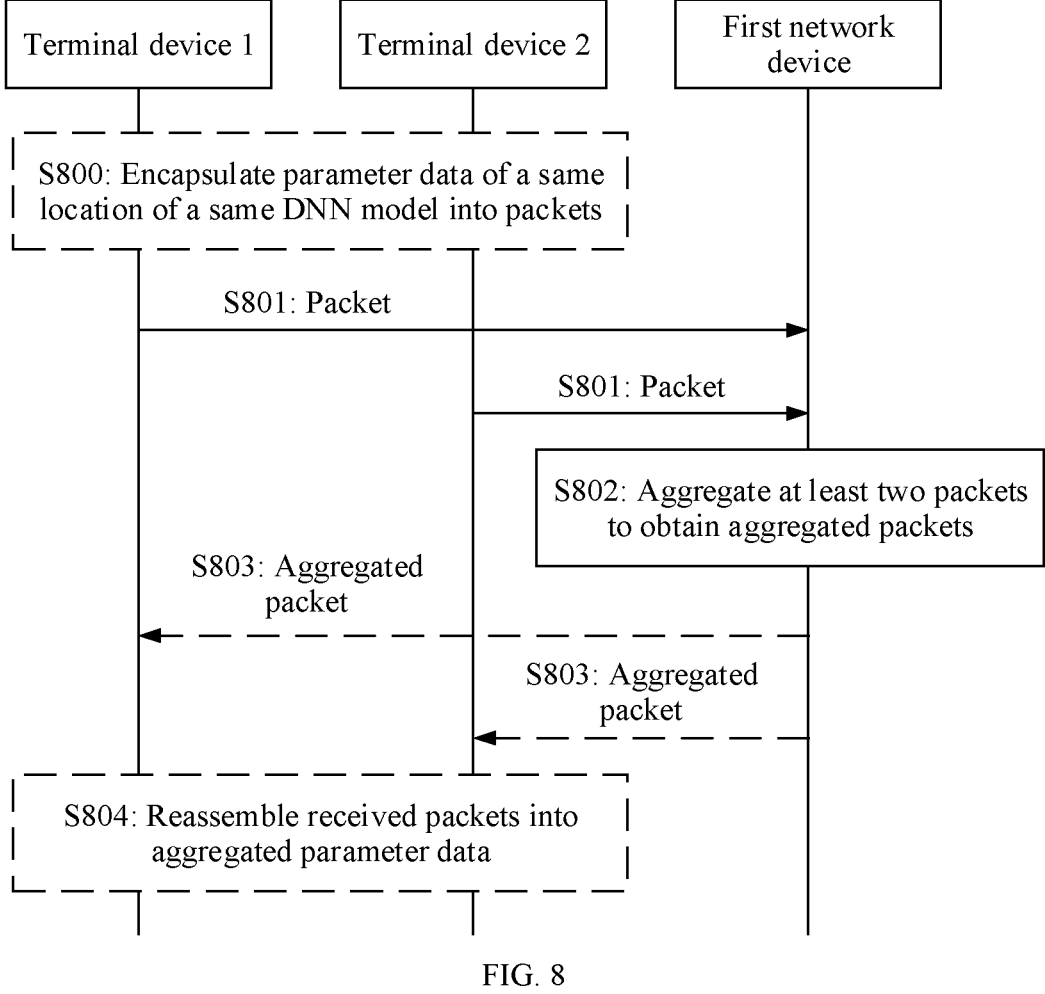
FIG. 8 is a schematic flowchart of a communication method according to an embodiment of the present disclosure.

An embodiment of the present disclosure provides a communication method. The communication method is applied to a distributed DNN training process. Refer to FIG. 8. The communication method includes the following steps.

S800: All of at least two terminal devices encapsulate parameter data of a same location of a same DNN model into packets.

For example, in FIG. 8, two terminal devices are used as an example for description, and the two terminal devices are denoted as a terminal device 1 and a terminal device 2.

Detailed descriptions of "parameter data of a same location of a same DNN model" are as follows.

In the DNN training process, a DEV of the terminal device obtains a current predicted value of the DNN model based on allocated training data and parameter data of the DNN model. Because it is expected that the predicted value of the DNN model is as close as possible to an actually desired target value, the DEV of the terminal device compares the current predicted value of the DNN model and the actually desired target value, and then updates weight vectors of each layer based on a difference between the current predicted value of the DNN model and the actually desired target value. For example, if the current predicted value of the DNN model is relatively high, the weight vectors of each layer are adjusted, so that an adjusted predicted value of the DNN model is reduced. In this way, the weight vectors of each layer of the DNN model are constantly adjusted until the DNN model can predict the desired target value or a value that is quite close to the desired target value.

Further, in the distributed DNN training process, to shorten training time, different training data is allocated to different terminal devices in the at least two terminal devices. For each of the at least two terminal devices, a DEV of the terminal device obtains parameter data of the DNN model through one time of training based on allocated training data. Different terminal devices may obtain different parameter data of the DNN model based on different training data. Aggregation processing is performed on the different parameter data of the DNN model, and then results obtained after the aggregation processing are allocated to the different terminal devices in the at least two terminal devices, so that a DEV of each terminal device performs next training.

Herein, "parameter data of a same location of a same DNN model" is specifically parameter data that is of the DNN model and that is obtained by DEVs of different terminal devices by performing a same quantity of training processes (for example, one process) based on different training data. In addition, because each piece of data in the parameter data of the DNN model is one weight, a weight $W_{jk}^{L}$ is a weight of a kth neuron of an $(L-1)^{th}$ layer to a $j^{th}$ neuron of an $L^{th}$ layer. The parameter data of the same location of the same DNN model refers to weights determined based on same values of L, k, and j in different parameter data that is of the DNN model and that is obtained by different DEVs. In this case, the parameter data of the same location of the same DNN model may refer to some values of weight vectors of one layer or weight vectors of a plurality of layers.

Each of the at least two terminal devices encapsulates parameter data of the DNN model into a packet. The following uses any one of the at least two terminal devices as an example to describe a specific implementation process of "encapsulating parameter data of the DNN model into a packet". For ease of description, any one of the at least two terminal devices is described as "a first terminal device". Refer to FIG. 9. The specific implementation process of "encapsulating parameter data of the DNN model into a packet" includes the following steps.

S8000: The first terminal device trains the DNN model to obtain parameter data of the DNN model.

Specifically, the first terminal device performs one time of training based on allocated training data to obtain parameter data of the DNN model.

S8001: The first terminal device splits the parameter data of the DNN model into a message based on a size of the message.

The message is a message transmitted between two or more terminal devices. One message includes one or more packets, and the packet carries parameter data of the DNN model. For example, the message may be a message transmitted in a remote direct memory access (RDMA) connection. The message may be alternatively a data slice (slice), for example, a data slice implemented at an application layer in an NVIDIA collective communication library (NCCL).

There is at least one message obtained after the splitting. One message includes a preset field and parameter data. The parameter data is parameter data of the DNN model. The preset field includes a first field, a second field, and a third field, as shown in part (a) in FIG. 10. Alternatively, the preset field includes a first field, a second field, a third field, and a fourth field, as shown in part (a) in FIG. 11. Descriptions of the four fields are as follows:

The first field is used to indicate to perform aggregation processing on the parameter data in the message. For example, when a value of the first field is a default value, the first field indicates a first network device to perform aggregation processing on the parameter data in the message; and when the value of the first field is not the default value, the first field indicates that the first network device does not need to perform aggregation processing on the parameter data in the message. For another example, when the first field exists, the first field indicates a first network device to perform aggregation processing on the parameter data in the message; and when the first field does not exist, the first field indicates that the first network device does not need to perform aggregation processing on the parameter data in the message. In this way, the first network device can quickly and effectively identify a to-be-aggregated packet and a packet that does not need to be aggregated, so that aggregation processing efficiency can be ensured, and the first network device can quickly forward the packet that does not need to be aggregated. For example, the first field may be denoted as InetTag.

The second field is used to carry a message index of the message. For example, the second field may be denoted as MsgID. Herein, when the first terminal device performs data transmission with another terminal device through one channel, message indexes corresponding to different messages are different in the first terminal device. In the at least two terminal devices, messages with a same message index are distributed in all of the at least two terminal devices. When the first terminal device performs data transmission with another terminal device through z channels, in the first terminal device, different messages transmitted through a same channel correspond to different message indexes and a same channel identifier, different messages transmitted through different channels correspond to different channel identifiers, and different messages transmitted through different channels may correspond to a same message index or different message indexes, where z is a positive integer, and z>1. In the at least two terminal devices, messages corresponding to a same channel identifier are distributed in all of the at least two terminal devices. For the channel identifier, refer to descriptions of the fourth field.

The third field is used to carry a packet quantity of packets included in the message. For example, the third field may be denoted as MsgLen.

The fourth field is used to carry a channel identifier. The channel identifier is used to identify a channel for transmitting a packet in which the fourth field is located. When the first network device performs aggregation processing, the first network device may determine, by using a channel identifier, a channel corresponding to a packet. When to-be-aggregated packets correspond to a same channel identifier, the first network device performs aggregation processing, to ensure accuracy of aggregation processing and avoid aggregating packets corresponding to different channel identifiers. Herein, a channel is described as follows: In one global logical ring network topology formed by a plurality of terminal devices by using a network device, packets are transmitted between adjacent terminal devices through a channel. There may be one channel between two terminal devices. Each of channels corresponds to one channel identifier, and channel identifiers are the same. Further, to improve data transmission efficiency between two terminal devices, there may be a plurality of channels between the two terminal devices. For the channels between two terminal devices, different channels correspond to different channel identifiers. Transmission identified by a same channel identifier can form one ring. One channel is implemented by using one connection. Channels are distributed in the global ring network topology. In this embodiment of the present disclosure, the connection may be but is not limited to an RDMA connection.

The size of the message may be set to a value that is an integer multiple of a path maximum transmission unit (PMTU). For example, if a value of the PMTU is 1024 bytes, the size of the message may be 1024 bytes, 2048 bytes, 3072 bytes, 4096 bytes, 5120 bytes, or the like. Herein, one piece of parameter data of the DNN model is transmitted in a form of one or more tensors. For example, when a size of a tensor is 10240 bytes, assuming that a size of each message is 5120 bytes, the tensor is split into two messages. For another example, when a size of a tensor is 11264 bytes, because the size cannot be exactly divided by 5120, the tensor is split into three messages, and each of the first two messages is 5120 bytes, but the last message is 1024 bytes.

S8002: The first terminal device splits the message into a data packet.

When the message is split into one data packet, the data packet includes the foregoing preset field and parameter data. When the message is split into a plurality of data packets, the initial data packet in the data packets obtained after the splitting includes the foregoing preset field, and the data packets obtained after the splitting include parameter data of different parts.

For example, one message is (PMTU*N) bytes. The first terminal device splits the message into different data packets based on a PMTU. For example, it is assumed that a size of the PMTU is 1024 bytes, and one message is 5120 bytes, as shown in part (a) in FIG. 10 or part (a) in FIG. 11. Herein, a value of N is 5. The message is split into five data packets, as shown in part (b) in FIG. 10, or as shown in part (b) in FIG. 11 or part (c) in FIG. 11, and a payload length of one data packet is the PMTU. For another example, if a preset field and parameter data of one message are 1024 bytes, the message is split into one data packet.

S8003: The first terminal device encapsulates the data packet obtained after the splitting into a packet.

Different data packets are carried in different packets.

For example, when one message is split into five data packets, there are five encapsulated packets. In this case, a quantity, of packets included in the message, that is indicated by a third field in the message is 5. For another example, when one message is split into one data packet, there is one encapsulated packet, and a quantity, of packets included in the message, indicated by a third field in the message is 1.

Herein, the encapsulated packet has two packet structures. Detailed descriptions are as follows.

Figure 11:
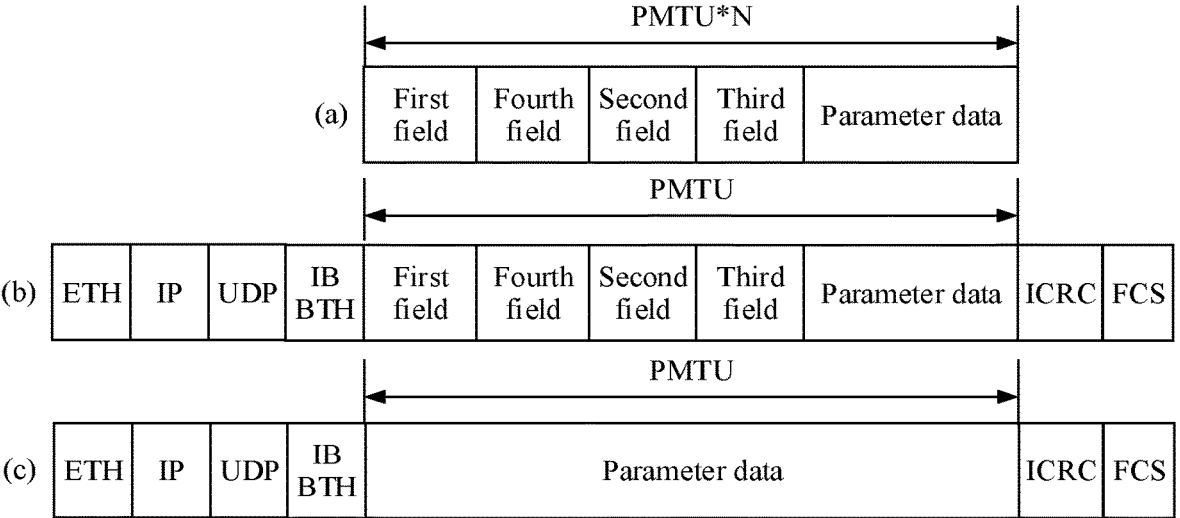
FIG. 11 is a schematic diagram of another structure of packets obtained after a message is split according to an embodiment of the present disclosure.

In the first structure, the packet includes a first field, a second field, a third field, and parameter data, as specifically shown in part (b) in FIG. 10, or the packet includes a first field, a second field, a third field, a fourth field, and parameter data, as specifically shown in part (b) in FIG. 11. When one message includes one packet, a packet structure of the packet is shown in part (b) in FIG. 10 or part (b) in FIG. 11. Parameter data of the packet is parameter data of the message. When one message includes a plurality of packets, a specific packet structure of the initial packet of the message is shown in part (b) in FIG. 10 or part (b) in FIG. 11.

In the second structure, the packet includes parameter data, and does not include a first field, a second field, a third field, or a fourth field, as specifically shown in part (c) in FIG. 11. When one message includes a plurality of packets, a non-first packet of the message does not include a preset field in the message except parameter data.

It should be noted that each packet in a message further includes other fields. For example, using a network protocol of a RDMA over converged Ethernet (RoCE) version 2 as an example, as shown in part (b) in FIG. 10 and part (b) in FIG. 11, the other fields include an Ethernet header (ETH), an Internet Protocol (IP) packet header, a user datagram protocol (UDP) packet header, an InfiniBand (IB) base transport header (BTH), invariant cyclic redundancy check (ICRC), a frame check sequence (FCS), and the like. The ETH includes a related field of a link layer protocol in an open system interconnection (OSI) reference model. IP includes related fields, for example, field information such as a source IP address and a destination IP address, of a network layer protocol in the OSI model. UDP includes related fields, for example, field information such as a source port and a destination port, of a transport layer protocol in the OSI model. The IB BTH includes field information such as a packet sequence number (PSN). The ICRC is used to protect integrity of a packet. This is a mechanism for protecting integrity of a packet through cyclic redundancy check (CRC). If a CRC error is found at a receive end (for example, a destination terminal device or a destination computing device), the packet may be discarded. The FCS is used to determine whether to retransmit a packet. If an FCS error is found at a receive end (for example, a destination terminal device or a destination computing device), the data packet may be discarded.

In addition, when the first terminal device includes a DEV and a network adapter, S8000 may be performed by the DEV of the first terminal device, S8001 may be performed by the DEV of the first terminal device, the network adapter of the first terminal device, or another component of the first terminal device, and S8002 and S8003 may be performed by the network adapter of the first terminal device.

In this way, the first terminal device splits parameter data of the DNN model into a message, and then splits the message into a packet. Because the message includes a preset field and parameter data, when one message is encapsulated into one packet, the packet is the initial packet of the message, and carries a preset field and parameter data. When one message is encapsulated into a plurality of packets, the initial packet in the plurality of packets carries a preset field, and a non-first packet in the plurality of packets does not carry the preset field.

In one global logical ring network topology, to enable each terminal device to obtain an aggregation result obtained after parameter data of the DNN model in all of the at least two terminal devices is aggregated, each of the at least two terminal devices sends a packet to a next adjacent terminal device. A packet sent by a terminal device is sent, by using the first network device, to a next terminal device adjacent to the terminal device. In addition, parameter data in packets sent by different terminal devices is parameter data at a same location of a same DNN model. In other words, each of the at least two terminal devices performs S801.

S801: Each of the at least two terminal devices sends a packet to the first network device. Correspondingly, the first network device receives the packet from each of the at least two terminal devices.

Herein, when one of two adjacent terminal devices transmits a packet to the other terminal device, the terminal device first transmits the packet to the first network device, and after the first network device performs aggregation processing on the packet, the first network device transmits a packet to the other terminal device. In other words, the first network device performs S802 after receiving the packet.

S802: The first network device aggregates at least two packets to obtain aggregated packets.

The aggregation may be performing an arithmetic operation such as addition, subtraction, multiplication, or division, or may be performing a logical operation such as AND, OR, or NOT. Parameter data of each of the at least two packets is to-be-aggregated data. The first network device aggregates parameter data of different packets in the at least two packets to obtain an aggregation result of the parameter data, and uses the aggregation result as parameter data of the aggregated packets.

Herein, the first network device receives packets of one terminal device through one channel or through z channels, where z is a positive integer, and z>1. The following describes aggregation processing in the two scenarios in detail.

Scenario 1: The first network device receives packets from one terminal device through one channel, and no channel identifier is configured for the channel. In this scenario, the at least two to-be-aggregated packets meet either of the following two conditions:

Condition 1: Messages to which all of the at least two packets separately belong have a same message index.

Condition 2: All of the at least two packets have a same sequence number in messages with a same message index.

The message is a message transmitted between two or more terminal devices, one message includes one or more packets, and the packet carries parameter data of the DNN model. For example, the message may be a message transmitted in an RDMA connection. The message may be alternatively a data slice, for example, a data slice implemented at an application layer in an NCCL.

A sequence number of a packet is used to indicate a transmission sequence of the packet in a connection (for example, an RDMA connection) for transmitting the packet.

It should be noted that if each of the messages to which all of the at least two packets separately belong includes only one packet, the at least two to-be-aggregated packets need to meet only Condition 1. In this case, for different packets belonging to messages with a same message index, message indexes of the messages to which the packets belong are the same, and parameter data of the different packets is parameter data of a same location (for example, a same part of a same layer or a same layer) of the same DNN model. If each of the messages to which all of the at least two packets separately belong includes a plurality of packets, the first network device performs aggregation processing only when the at least two to-be-aggregated packets meet Condition 2. In this case, messages to which different packets belong have a same message index, and the packets have a same sequence number in the messages with the same message index. Therefore, parameter data of the different packets is parameter data of a same location (for example, a same part of a same layer or a same layer) of the same DNN model.

In this way, it can be ensured that the first network device aggregates parameter data of a same location of the same DNN model to avoid a data aggregation error, so that accuracy of DNN model training is improved.

Herein, the initial packet of each of the messages to which all of the at least two packets separately belong includes a first field. The first field is used to indicate to perform aggregation processing on parameter data in the message. In this way, the first network device can quickly and effectively identify a to-be-aggregated packet and a packet that does not need to be aggregated, so that aggregation processing efficiency can be ensured, and the first network device can quickly forward the packet that does not need to be aggregated.

Figure 12:
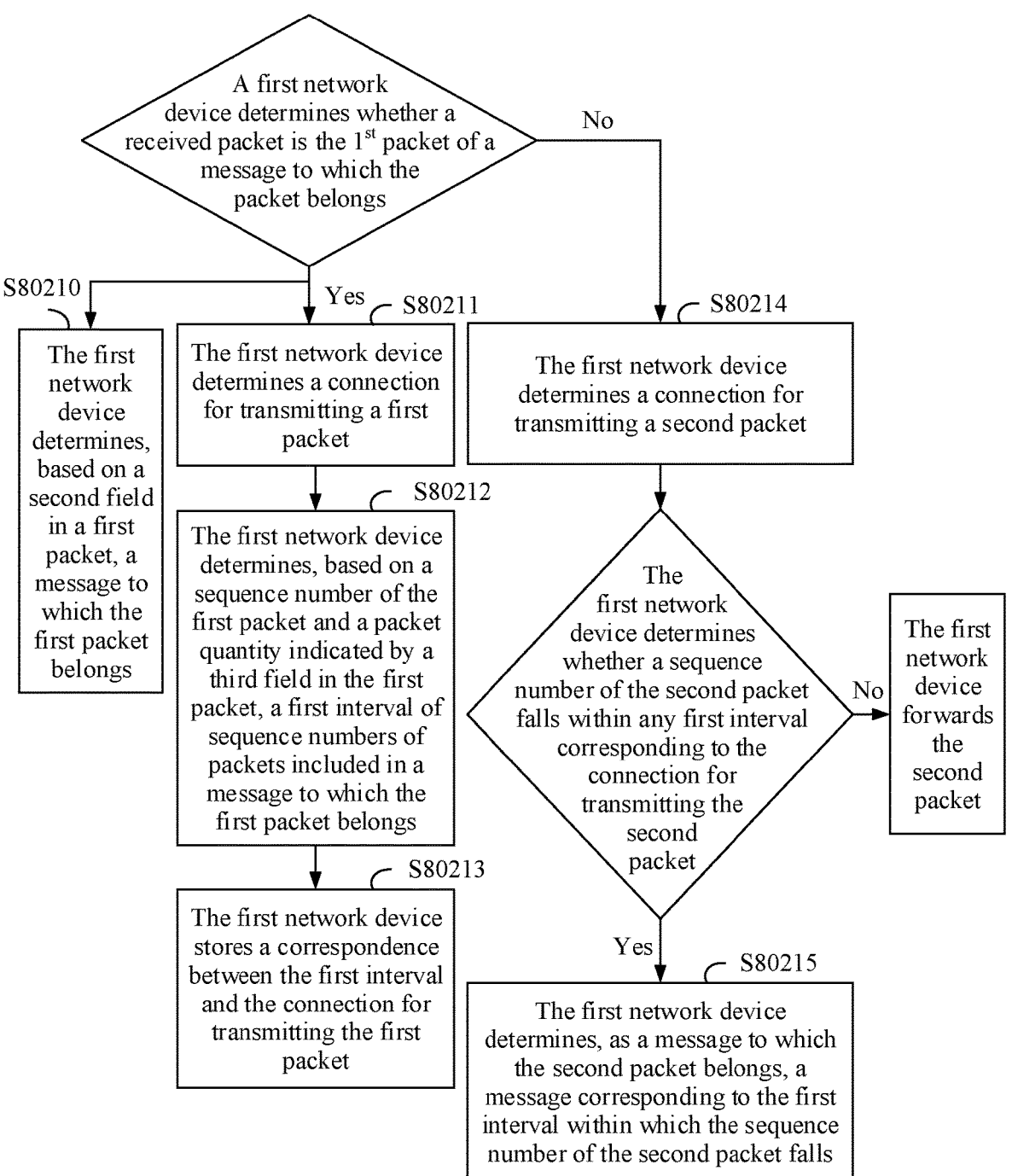
FIG. 12 is a schematic flowchart of another communication method according to an embodiment of the present disclosure.

Further, a preset field in the initial packet of each message further includes a second field and a third field, as shown in part (b) in FIG. 10. The second field is used to carry a message index of the message. The message index is used to index the message to which the initial packet belongs. The third field is used to carry a packet quantity of packets included in the message. A non-first packet of each message does not include the first field, the second field, or the third field, as shown in part (c) in FIG. 11. In this case, to effectively determine a message to which each packet belongs, in the communication method in this embodiment of the present disclosure, "a message to which a packet belongs" may be determined in different manners. The manners may be but are not limited to the following two manners:

Manner 1: When the first network device determines that a received packet is the initial packet of a message to which the packet belongs, for ease of description, in this embodiment of the present disclosure, the initial packet of any message is described as "a first packet". Refer to FIG. 12. A specific implementation process in which the first network device determines "a message to which the first packet belongs" includes S80210.

S80210: The first network device determines, based on a second field in the first packet, the message to which the first packet belongs. Herein, because the second field carries a message index of the message to which the first packet belongs, the first network device may index, based on the message index in the second field, the message to which the first packet belongs. In this way, the terminal device can determine the message to which the first packet belongs. Because the initial packet of each message includes a second field, the first network device may index, based on second fields in the initial packets of different messages, a message to which a corresponding packet belongs.

In addition, because the first packet further includes a third field, and the third field indicates a packet quantity of packets included in the message to which the first packet belongs, the first network device may determine the quantity of packets included in the message to which the first packet belongs. When the third field indicates that the quantity of packets included in the message to which the first packet belongs is equal to 1, the first network device may aggregate different first packets that meet Condition 1 to obtain aggregated packets. When the third field indicates that the quantity of packets included in the message to which the first packet belongs is greater than 1, as shown in FIG. 12, the first network device further performs the following steps based on a first packet (namely, the initial packet) in a message.

S80211: The first network device determines a connection for transmitting the first packet.

The first network device determines the "connection for transmitting the first packet" in a plurality of manners. The manners may be but are not limited to the following manner:

The first network device determines, based on a packet header of an existing protocol in the first packet, the connection for transmitting the first packet. For example, when the connection is implemented as an RDMA connection, the existing protocol in the first packet includes an IP and an IB protocol. An IP protocol packet header includes a source internet protocol (SrcIP) address and a destination internet protocol (DstIP) address. A SrcIP address of a packet is used to indicate an IP address of a terminal device sending the packet, and a DstIP address of a packet is used to indicate an IP address of a terminal device receiving the packet. An IB BTH includes a destination queue pair (DstQP) and a packet sequence number (PSN). A DstQP of a packet is used to indicate a queue pair (QP) in a terminal device receiving the packet. Herein, the QP in the terminal device receiving the packet includes a send queue and a receive queue. APSN of a packet is used to indicate a transmission sequence of the packet in an RDMA connection for transmitting the packet. The first network device may determine, based on a SrcIP address, a DstIP address, and a DstQP in the first packet, the RDMA connection for transmitting the first packet. The connection for transmitting the first packet is determined accordingly.

S80212: The first network device determines, based on a sequence number of the first packet and the packet quantity indicated by the third field in the first packet, a first interval of sequence numbers of packets included in the message to which the first packet belongs.

A first end value of the first interval is the sequence number of the first packet, and a second end value of the first interval is a value determined based on the sequence number of the first packet and the packet quantity indicated by the third field in the first packet. A value of the sequence number of the first packet may be equal to a value of a PSN of the first packet, or may be a value determined based on another reference standard. This is not limited in this embodiment of the present disclosure.

For example, if the value of the sequence number of the first packet is 99, and a value of the packet quantity indicated by the third field in the first packet is 100, the first interval determined by the first network device is (99,198].

S80213: The first network device stores a correspondence between the first interval and the connection for transmitting the first packet.

It should be noted that one connection can transmit first packets of one or more messages. Therefore, if one connection transmits one message, the connection corresponds to one first interval. When the connection transmits a plurality of messages, the first network device repeatedly performs S80211 to S80213. In this case, the connection corresponds to a plurality of first intervals, and a quantity of first intervals is consistent with a quantity of messages. For different connections, the first network device repeatedly performs S80211 to S80213, so that first intervals corresponding to the different connections are obtained accordingly.

Because the first network device stores a correspondence between a first interval and a connection, if the first network device further receives a packet of a stored connection, and the received packet is a non-first packet of a message to which the packet belongs, the first network device can determine, based on the stored correspondence between a first interval and a connection, the message to which the received packet belongs, to determine whether to perform aggregation processing on the received packet. Specifically, as shown in FIG. 12, for a non-first packet of a message, the first network device can also determine "a message to which the packet belongs". For ease of description, in this embodiment of the present disclosure, a non-first packet of any message is described as "a second packet". Refer to FIG. 12. The following describes a process in which the first network device determines "a message to which the second packet belongs".

S80214: The first network device determines a connection for transmitting the second packet.

The first network device may also determine, based on SrcIP, DstIP, and a DstQP in the second packet, an RDMA connection for transmitting the second packet. For a specific implementation process, refer to related descriptions of S80211. In addition, the first network device may also determine, in another manner, the connection for transmitting the second packet. This is not limited in this embodiment of the present disclosure.

S80215: If the first network device determines that a sequence number of the second packet falls within a first interval corresponding to the connection for transmitting the second packet, the first network device determines, as the message to which the second packet belongs, a message corresponding to the first interval within which the sequence number of the second packet falls. If the first network device determines that the second packet falls beyond any first interval corresponding to the connection for transmitting the second packet, the first network device does not need to perform aggregation processing on the second packet before forwarding the second packet.

For example, the connection for transmitting the second packet corresponds to one or more first intervals, and the first network device has stored a correspondence between the connection for transmitting the second packet and the first interval. The first network device determines a first interval that is in the one or more first intervals and within which a PSN of the second packet falls. If the PSN of the second packet falls within a first interval, the second packet belongs to a message corresponding to the first interval. In this way, the first network device determines the message to which the second packet belongs.

In this way, the first network device can determine, based on the sequence number of the second packet and the pre-stored correspondence between a first interval and a connection for transmitting the second packet, the message to which the second packet belongs. In other words, the first network device can determine a message to which a non-first packet of a message belongs. In addition, the first network device can identify, through a process of determining the first interval within which the sequence number of the second packet falls, whether to perform aggregation processing on the second packet. When no aggregation processing needs to be performed, the first network device directly forwards the second packet, so that packet processing efficiency of the first network device is improved.

In conclusion, based on S80210 to S80215, the first network device can determine a message to which each packet of any message belongs, so that a message index corresponding to each packet of any message can be determined. In this way, the first network device can also determine to-be-aggregated packets.

Manner 2: When the first network device determines that a received packet is a non-first packet of a message to which the packet belongs, a non-first packet of any message is still described as "a second packet". The first network device determines "a message to which the second packet belongs" by using a sequence number offset between the second packet and a first packet. A specific implementation process is as follows:

Related descriptions of storing "a correspondence between a message index, a sequence number, a message length, and a connection" by the first network device are first described.

When the first network device determines that a received packet is the initial packet of a message to which the packet belongs, the received packet is described as "a first packet", and the first network device still performs S80210 and S80211. Then the first network device stores a correspondence between a message index of the first packet, a sequence number of the first packet, a message length of the message to which the first packet belongs, and a connection for transmitting the first packet. When the connection also transmits another message, the first network device also performs the foregoing process. In this way, the first network device can store a plurality of correspondences. When another connection transmits one or more messages, the first network device also performs a similar process. In this way, the first network device can store correspondences of a plurality of connections.

When a non-first packet of a message is received, the received packet is described as "a second packet", and the first network device still performs S80214. If the first network device determines that a connection for transmitting the second packet is recorded, in other words, "a correspondence between a message index, a sequence number, a message length, and the connection" is stored, the first network device determines a sequence number offset between a first packet and the second packet that are transmitted through the same connection. If the sequence number offset between the first packet and the second packet that are transmitted through the same connection is less than or equal to a message length corresponding to the first packet, the first network device determines, as a message index of the second packet, a message index corresponding to the first packet. In other words, the first packet and the second packet belong to a same message.

Figure 13:
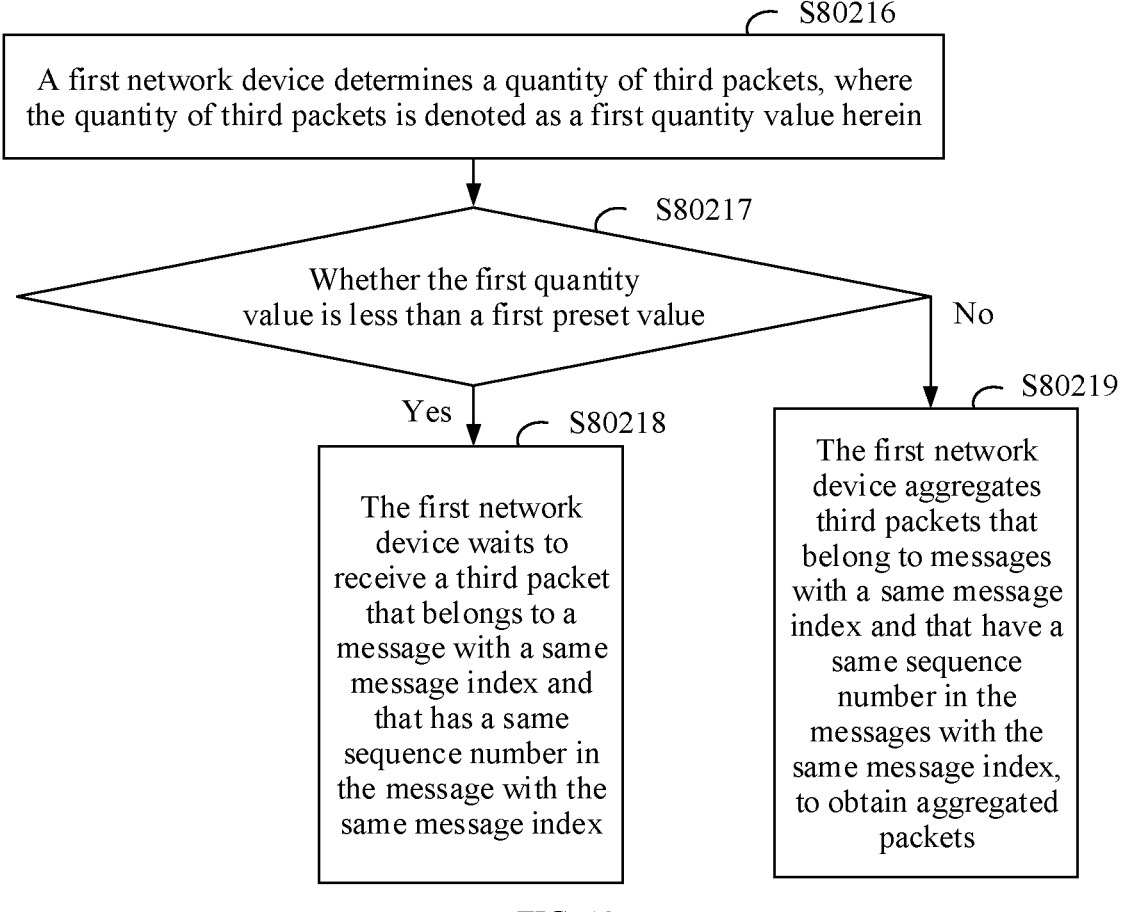
FIG. 13 is a schematic flowchart of another communication method according to an embodiment of the present disclosure.

To ensure accuracy of aggregation processing, during aggregation, the first network device determines, based on a preset value obtained in advance, whether all to-be-aggregated packets have arrived, and when all the to-be-aggregated packets have arrived, the first network device performs aggregation processing on the to-be-aggregated packets. For ease of description, in this embodiment of the present disclosure, packets that belong to messages with a same message index and that have a same sequence number in the messages with the same message index are described as "third packets". The third packet may be any packet of any message. Refer to FIG. 13. The following describes a process in which the first network device performs aggregation processing on the third packets.

S80216: The first network device determines a quantity of third packets.

Herein, the quantity of third packets is denoted as a first quantity value.

The first network device determines a first quantity value of third packets that belong to messages with a same message index and that have a same sequence number in the messages with the same message index.

Herein, because the first network device can determine a message to which each to-be-aggregated packet belongs, the first network device can count a quantity of packets belonging to messages with a same message index. Further, because each to-be-aggregated packet carries one PSN, the first network device can count a quantity of packets that belong to messages with a same message index and that have a same sequence number in the messages with the same message index.

For example, packets of terminal devices are different in terms of a packet characteristic (for example, an identifier of the packet or any one of SrcIP, DstIP, and a DstQP of the packet). After receiving a packet, the first network device determines, based on a message index and a sequence number of the packet, that the packet is a third packet, and then counts a quantity of third packets based on a packet characteristic.

S80217: The first network device determines whether the first quantity value is less than a first preset value. If the first quantity value is less than the first preset value, the first network device performs S80218; or if the first quantity value is equal to the first preset value, the first network device performs S80219.

The first preset value is a quantity value of terminal devices providing parameter data of a same location of the same DNN model to the first network device. For example, using FIG. 6 as an example, when one terminal device has one DEV, for parameter data of a same location of a same DNN model, four terminal devices send packets to the first network device, and correspondingly, the first network device receives the packets from the four terminal devices. In this case, the first preset value is 4.

Detailed descriptions of S80218 and S80219 are as follows:

S80218: The first network device waits to receive a third packet that belongs to a message with the same message index and that has the same sequence number in the message with the same message index.

S80219: The first network device aggregates third packets that belong to messages with the same message index and that have the same sequence number in the messages with the same message index to obtain aggregated packets.

In other words, the first network device counts a quantity of third packets, and performs aggregation after all the third packets arrive, to obtain the aggregated packets, to avoid missing parameter data of a terminal device during aggregation processing, so that aggregation operation accuracy is ensured.

It should be noted that the first network device may alternatively determine "whether all to-be-aggregated third packets have arrived" through the following process. In other words, before performing S80218 or S80219, the first network device performs the following process instead of S80216 and S80217:

Packets of terminal devices are different in terms of a packet characteristic (for example, an identifier of the packet or any one of SrcIP, DstIP, and a DstQP of the packet). The first network device sets a corresponding status bit based on the first preset value. Each status bit corresponds to one terminal device. After the first network device receives a packet, the first network device determines, based on a packet characteristic of the packet, a terminal device providing the packet, and updates a value of a status bit corresponding to the terminal device providing the packet. For example, after receiving a packet from a terminal device 0, the first network device sets a value of a status bit corresponding to the terminal device 0 to 1 (or 0). If not all values of status bits are equal to 1 (or 0), it indicates that not all to-be-aggregated third packets have arrived, aggregation processing cannot be performed, and the first network device performs S80218. If all values of status bits are equal to 1 (or 0), it indicates that all to-be-aggregated third packets have arrived, and the first network device performs S80219.

Scenario 2: The first network device receives packets from one terminal device through one or more channels, and no channel identifiers are configured for the channels. In this scenario, the at least two to-be-aggregated packets meet either of the following two conditions:

Condition 3: All of the at least two packets correspond to a same channel identifier, and messages to which all the packets separately belong have a same message index.

Condition 4: All of the at least two packets correspond to a same channel identifier, and all of the at least two packets have a same sequence number in messages with a same message index.

It should be noted that if each of the messages to which all of the at least two packets separately belong includes only one packet, the at least two to-be-aggregated packets need to meet only Condition 3. In this case, parameter data of different packets that correspond to a same channel identifier and that belong to messages with a same message index is parameter data of a same location (for example, a same part of a same layer or a same layer) of the same DNN model. If each of the messages to which all of the at least two packets separately belong includes a plurality of packets, the first network device performs aggregation processing only when the at least two to-be-aggregated packets meet Condition 4. In this case, different packets correspond to a same channel identifier, messages to which the different packets belong have a same message index, and the packets have a same sequence number in the messages with the same message index. Therefore, parameter data of the different packets is parameter data of a same location (for example, a same part of a same layer or a same layer) of the same DNN model.

In this way, it can be ensured that the first network device aggregates parameter data of a same location of the same DNN model to avoid a data aggregation error, so that accuracy of DNN model training is ensured.

Herein, the initial packet of each of the messages to which all of the at least two packets separately belong includes a first field, so that the first network device can quickly and effectively identify a to-be-aggregated packet and a packet that does not need to be aggregated, thereby ensuring aggregation processing efficiency and further enabling the first network device to quickly forward the packet that does not need to be aggregated.

Further, a preset field in the initial packet of each message further includes a second field, a third field, and a fourth field, as shown in part (b) in FIG. 11. A non-first packet of each message does not include the first field, the second field, the third field, or the fourth field, as shown in part (c) in FIG. 11. When the first terminal device transmits packets through z channels, message indexes of messages to which packets transmitted through different channels belong may be the same or different.

The first network device determines a to-be-aggregated packet based on a channel identifier corresponding to a packet and a message index of a message to which the packet belongs. To effectively determine a channel identifier corresponding to each packet and a message to which the packet belongs, in the communication method in this embodiment of the present disclosure, "a channel identifier corresponding to a packet" and "a message to which the packet belongs" may be determined in different manners. The manners may be but are not limited to Manner 3 and Manner 4.

Figure 14:
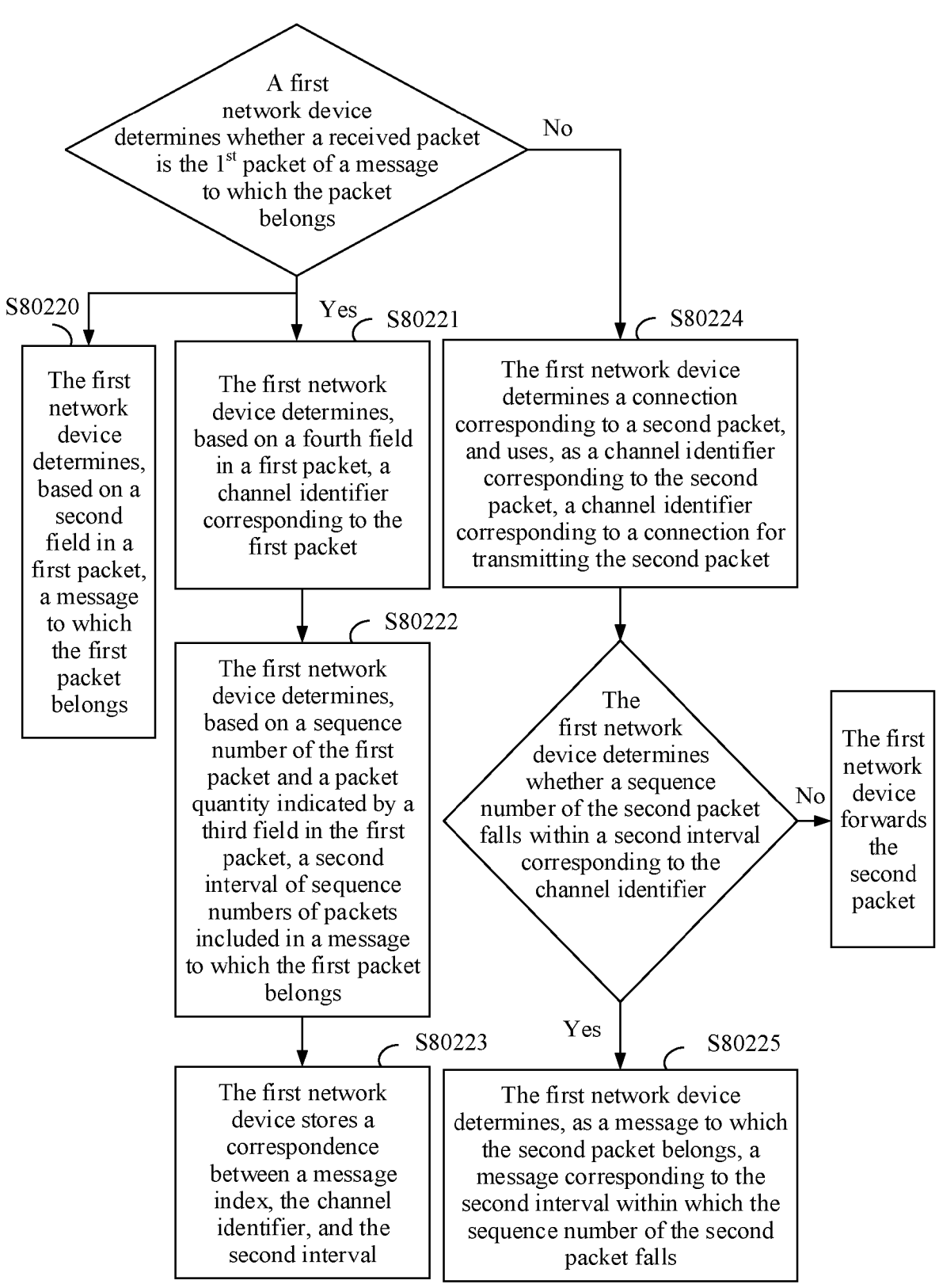
FIG. 14 is a schematic flowchart of another communication method according to an embodiment of the present disclosure.

Manner 3: For ease of description, in this embodiment of the present disclosure, the initial packet of any message is described as "a first packet". When the first network device determines that a received packet is the initial packet of a message to which the packet belongs, as shown in FIG. 14, a specific implementation process in which the first network device determines "a channel identifier corresponding to the first packet and a message to which the first packet belongs" includes S80220.

S80220: The first network device determines, based on a second field in the first packet, the message to which the first packet belongs.

Herein, because the second field carries a message index of the message to which the first packet belongs, the first network device may index, based on the message index in the second field, the message to which the first packet belongs. Because the initial packet of each message includes a second field, the first network device may index, based on second fields in the initial packets of different messages, a message to which a corresponding packet belongs.

S80221: The first network device determines, based on a fourth field in the first packet, the channel identifier corresponding to the first packet.

Herein, because the fourth field carries a channel identifier, the first network device may use, as the channel identifier corresponding to the first packet, the channel identifier carried in the fourth field. Because the initial packet of each message includes a fourth field, the first network device determines, based on fourth fields in the initial packets of different messages, a channel identifier corresponding to a corresponding packet.

In addition, because the first packet further includes a third field, and the third field indicates a packet quantity of packets included in the message to which the first packet belongs, the first network device may determine the quantity of packets included in the message to which the first packet belongs. When the third field indicates that the quantity of packets included in the message to which the first packet belongs is equal to 1, the first network device may aggregate different first packets that meet Condition 3 to obtain aggregated packets. When the third field indicates that the quantity of packets included in the message to which the first packet belongs is greater than 1, as shown in FIG. 14, the first network device further performs the following steps based on a first packet (namely, the initial packet) in a message.

S80222: The first network device determines, based on a sequence number of the first packet and the packet quantity indicated by the third field in the first packet, a second interval of sequence numbers of packets included in the message to which the first packet belongs.

Herein, for a specific implementation process of S80222, refer to related descriptions of S80212.

S80223: The first network device stores a correspondence between the message index, the channel identifier, and the second interval.

Because the first network device stores a correspondence between a message index, a channel identifier, and a second interval, if the first network device further receives a packet through a channel identified by the stored channel identifier, and the received packet is a non-first packet of a message to which the packet belongs, the first network device can determine, based on the stored correspondence between a message index, a channel identifier, and a second interval, a channel identifier corresponding to the received packet and a message to which the received packet belongs. Specifically, as shown in FIG. 14, for a non-first packet of a message, the first network device can also determine "a channel identifier corresponding to the packet and a message to which the packet belongs". For ease of description, in this embodiment of the present disclosure, a non-first packet of any message is described as "a second packet". Refer to FIG. 14. The following describes a process in which the first network device determines "a channel identifier corresponding to the second packet and a message to which the second packet belongs". The process in which the first network device determines "the channel identifier corresponding to the second packet and the message to which the second packet belongs" includes the following steps.

S80224: The first network device determines a connection corresponding to the second packet, and uses, as the channel identifier corresponding to the second packet, a channel identifier corresponding to the connection for transmitting the second packet.

For a process in which the first network device "determines the connection for transmitting the second packet", refer to related descriptions of S80211. Because a channel is implemented by using a connection, and a channel identifier is configured for the channel, the first network device uses, as the channel identifier corresponding to the second packet, the channel identifier corresponding to the connection for transmitting the second packet.

S80225: If the first network device determines that a sequence number of the second packet falls within a second interval corresponding to the channel identifier, the first network device determines, as the message to which the second packet belongs, a message corresponding to the second interval within which the sequence number of the second packet falls. If the first network device determines that the second packet falls beyond any second interval corresponding to the channel identifier, the first network device does not need to perform aggregation processing on the second packet before forwarding the second packet.

For example, the connection for transmitting the second packet corresponds to one or more second intervals, one connection corresponds to one channel identifier, and the first network device has stored a correspondence between a channel identifier and a second interval. The first network device determines a second interval that is in the one or more second intervals and within which a PSN of the second packet falls. If the PSN of the second packet falls within a second interval, the second packet belongs to a message corresponding to the second interval. In this way, the first network device determines the message to which the second packet belongs and the channel identifier corresponding to the second packet.

In this way, the first network device can determine, based on the sequence number of the second packet and the pre-stored correspondence between a channel identifier and a second interval, the message to which the second packet belongs and the channel identifier corresponding to the second packet. In other words, the first network device can determine a message to which a non-first packet of a message belongs and a channel identifier corresponding to the non-first packet. In addition, the first network device can identify, through a process of determining the second interval within which the sequence number of the second packet falls, whether to perform aggregation processing on the second packet. For a second packet that does not need to be aggregated, the first network device does not need to perform aggregation processing on the second packet before forwarding the second packet.

In conclusion, based on S80220 to S80225, the first network device can determine a message to which each packet of any message belongs and a channel identifier corresponding to the packet, so that a message index corresponding to each packet of any message can be determined. In this way, the first network device can also determine to-be-aggregated packets.

Manner 4: When the first network device determines that a received packet is a non-first packet of a message to which the packet belongs, a non-first packet of any message is still described as "a second packet". The first network device determines "a message to which the second packet belongs" and "a channel identifier corresponding to the second packet" by using a sequence number offset between the second packet and a first packet. A specific implementation process is as follows:

Related descriptions of storing "a correspondence between a message index, a sequence number, a message length, and a channel identifier" by the first network device are first described.

When the first network device determines that a received packet is the initial packet of a message to which the packet belongs, the received packet is described as "a first packet", and the first network device still performs S80220 and S80221. Then the first network device stores a correspondence between a channel identifier corresponding to the first packet, a message index of the first packet, a sequence number of the first packet, and a message length of the first packet. When the connection also transmits another message, the first network device also performs the foregoing process. In this way, the first network device can store a plurality of correspondences. When another connection transmits one or more messages, the first network device also performs a similar process. Because one channel is implemented by using one connection, and a channel identifier is configured for the channel, the first network device can store correspondences of a plurality of channel identifiers.

When a non-first packet of a message is received, the received packet is described as "a second packet", and the first network device still performs S80224. If the first network device determines that a channel identifier corresponding to the second packet is recorded, in other words, "a correspondence between a channel identifier, a message index, a sequence number, and a message length" is stored, the first network device determines a sequence number offset between a first packet and the second packet that correspond to the same channel identifier. If the sequence number offset between the first packet and the second packet that correspond to the same channel identifier is less than or equal to a message length corresponding to the first packet, the first network device determines, as a message index of the second packet, a message index corresponding to the first packet. In other words, the first packet and the second packet belong to a same message.

Figure 15:
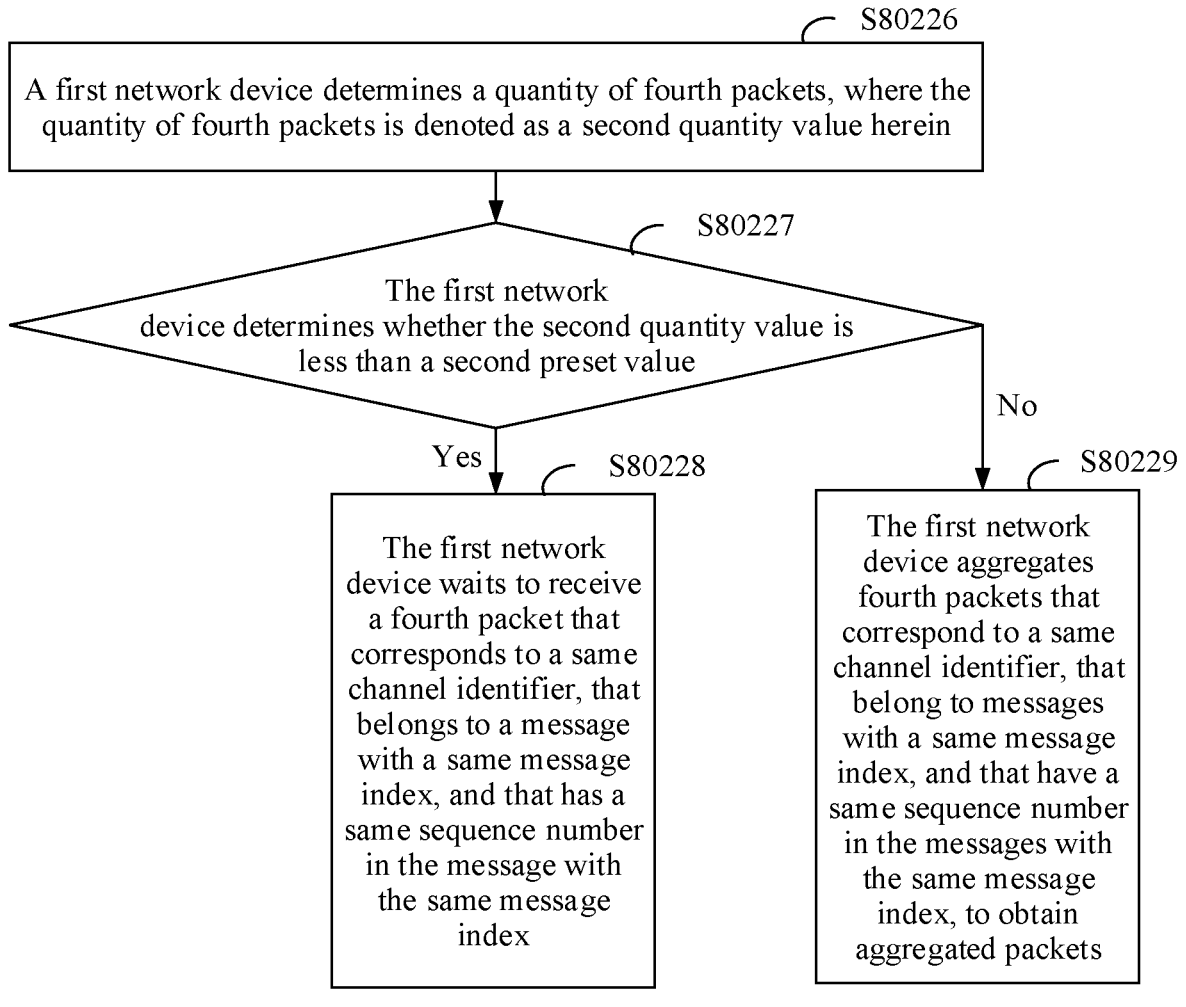
FIG. 15 is a schematic flowchart of another communication method according to an embodiment of the present disclosure.

To improve accuracy of aggregation processing, during aggregation, the first network device determines, based on a preset value obtained in advance, whether all to-be-aggregated packets have arrived, and when all the to-be-aggregated packets have arrived, the first network device performs aggregation processing on the to-be-aggregated packets. For ease of description, in this embodiment of the present disclosure, packets that correspond to a same channel identifier, that belong to messages with a same message index, and that have a same sequence number in the messages with the same message index are described as "fourth packets". The fourth packet may be any packet of any message. Refer to FIG. 15. The following describes a process in which the first network device performs aggregation processing on the fourth packets.

S80226: The first network device determines a quantity of fourth packets.

Herein, the quantity of fourth packets is denoted as a second quantity value.

Herein, because the first network device can determine a message to which each to-be-aggregated packet belongs and a channel identifier corresponding to the packet, the first network device can count a quantity of packets that belong to a same channel identifier and that belong to messages with a same message index. Further, because each to-be-aggregated packet carries one PSN, the first network device can count the quantity of fourth packets.

S80227: The first network device determines whether the second quantity value is less than a second preset value. If the second quantity value is less than the second preset value, the first network device performs S80228; or if the second quantity value is equal to the second preset value, the first network device performs S80229.

The second preset value is a quantity value of terminal devices providing parameter data of a same location of the same DNN model to the first network device. Herein, in a same global logical ring network topology, the second preset value is the same as the first preset value.

Detailed descriptions of S80228 and S80229 are as follows:

S80228: The first network device waits to receive a fourth packet that corresponds to the same channel identifier, that belongs to a message with the same message index, and that has a same sequence number in the message with the same message index.

S80229: The first network device aggregates fourth packets that correspond to the same channel identifier, that belong to messages with the same message index, and that have the same sequence number in the messages with the same message index, to obtain aggregated packets.

In other words, the first network device counts a quantity of fourth packets, and performs aggregation after all the fourth packets arrive to obtain the aggregated packets, and to avoid missing parameter data of a terminal device during aggregation processing, so that aggregation operation accuracy is ensured.

It should be noted that the first network device may alternatively determine "whether all to-be-aggregated fourth packets have arrived" through the following process. In other words, before performing S80228 or S80229, the first network device performs the following process instead of S80226 and S80227:

Packets of terminal devices are different in terms of a packet characteristic (for example, SrcIP, DstIP, and a DstQP of the packet). The first network device sets a corresponding status bit based on the second preset value. Each status bit corresponds to one terminal device. After the first network device receives a packet, the first network device determines, based on a packet characteristic of the packet, a terminal device providing the packet, and updates a value of a status bit corresponding to the terminal device providing the packet. For example, after receiving a packet from a terminal device 0, the first network device sets a value of a status bit corresponding to the terminal device 0 to 1 (or 0). If not all values of status bits are equal to 1 (or 0), it indicates that the first network device has not obtained packets of terminal devices corresponding to the second preset value, not all fourth packets have arrived, aggregation processing cannot be performed, and the first network device performs S80228. If all values of status bits are equal to 1 (or 0), it indicates that all to-be-aggregated fourth packets have arrived, and the first network device performs S80229.

It should be noted that in one global logical ring network topology, when there is one channel between every two adjacent terminal devices, channels in the global logical ring network topology correspond to a same channel identifier. In other words, to-be-aggregated fourth packets correspond to a same channel identifier. When the initial packets of all messages include fourth fields, channel identifiers carried in the fourth fields are the same. In one global logical ring network topology, when there are a plurality of channels between every two adjacent terminal devices, different channels between every two adjacent terminal devices correspond to different channel identifiers. In addition, a same channel identifier corresponds to one channel between every two adjacent terminal devices.

S803: The first network device separately sends the aggregated packets to the at least two terminal devices. Correspondingly, each of the at least two terminal devices receives the aggregated packets from the first network device.

Herein, the first network device replaces parameter data in the to-be-aggregated packet with aggregated data. In this case, there is the following association relationship between "a packet existing before aggregation" and "an aggregated packet":

First, a quantity of "packets existing before aggregation" is consistent with a quantity of "aggregated packets".

For example, the quantity of "packets existing before aggregation" is a first preset value, and the quantity of "aggregated packets" is also the first preset value.

Second, a packet header of "the packet existing before aggregation" is the same as a packet header of "the aggregated packet". In addition, parameter data of "the packet existing before aggregation" and parameter data of "the aggregated packet" may be the same or different, depending on a specific operation used for aggregation and a value of the parameter data existing before the aggregation. Specific examples thereof are as follows.

Example 1: A specific aggregation operation is "addition", and there are n "packets existing before aggregation". The first network device aggregates parameter data of the n packets to obtain aggregated packets. There are also n aggregated packets. The following case exists for parameter data of the n packets before and after the aggregation:

In x packets, aggregated parameter data of each packet is different from parameter data that is of the packet and that exists before the aggregation, and in (n–x) packets, aggregated parameter data of each packet is the same as parameter data that is of the packet and that exists before the aggregation, where x is a positive integer, and $0 \leq x \leq n$.

For example, before the aggregation, values of parameter data of two or more of the n packets are not zero. Aggregated parameter data of all of the n packets is the same. Aggregated parameter data of each packet is different from parameter data that is of the packet and that exists before the aggregation.

For another example, before the aggregation, a value of parameter data of only one of the n packets is not zero, and a value of parameter data of another packet is zero. Aggregated parameter data of one of the n packets is the same as parameter data that is of the packet and that exists before the aggregation. Aggregated parameter data of each of (n–1) packets whose parameter data has a value of zero before the aggregation is different from parameter data that is of the packet and that exists before the aggregation.

For still another example, before the aggregation, parameter data of the n packets is zero. Aggregated parameter data of the n packets is still zero. In other words, aggregated parameter data of each packet is the same as parameter data that is of the packet and that exists before the aggregation.

Example 2: A specific aggregation operation is "calculating a maximum value", and there are n "packets existing before aggregation". The first network device aggregates parameter data of the n packets to obtain aggregated packets. There are also n aggregated packets. In the n aggregated packets, aggregated parameter data of at least one packet is consistent with parameter data that is of the packet and that exists before the aggregation, and aggregated parameter data of another packet is different from parameter data that is of the corresponding packet and that exists before the aggregation.

Therefore, the first network device separately sends different packets to all of the at least two terminal devices. Parameter data of all of the different packets is the same, and is parameter data obtained by aggregating parameter data that comes from a preset quantity of terminal devices and that is of a same location of the same DNN model. Therefore, each of the at least two terminal devices may obtain aggregated parameter data, to perform next DNN model training. Packet headers of all of the different packets are different. Therefore, the first network device may determine, based on DstIP in the packet header, a terminal device to which the packet is to be sent. Correspondingly, the terminal device may also determine, based on the DstIP in the received packet header, whether the packet is a packet that needs to be received by the terminal device. When one terminal device has a plurality of DEVs, the terminal device may also determine, based on the DstQP in the packet header, a DEV to which the packet belongs. Because packet headers of packets are different, it is convenient for the first network device and the terminal device to perform corresponding processing on the packets.

For example, as shown in FIG. 6, a thick solid line with an arrow indicates that the first network device sends aggregated packets to terminal devices, and parameter data of aggregated packets delivered at a same time is the same.

S804: Each of the at least two terminal devices reassembles received packets into aggregated parameter data.

Aggregated parameter data obtained by different terminal devices in the at least two terminal devices is parameter data at a same location of the same DNN model.

Figure 16:
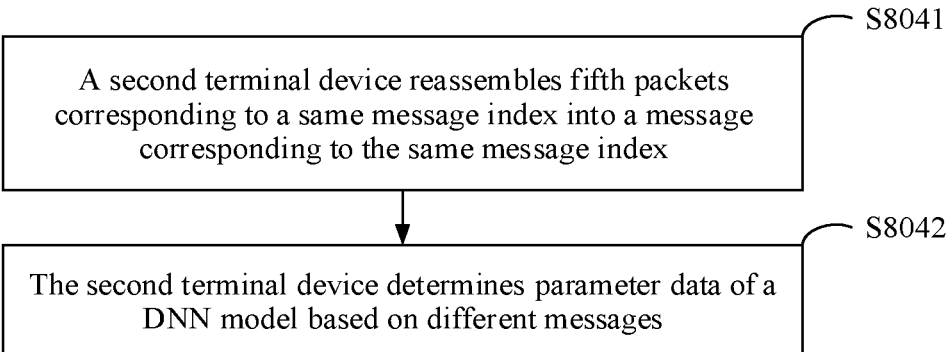
FIG. 16 is a schematic flowchart of another communication method according to an embodiment of the present disclosure.

The following uses one of the at least two terminal devices as an example to describe a specific implementation process of "reassembling received packets into aggregated parameter data". For ease of description, one of the at least two terminal devices is described as "a second terminal device", and a packet received by the second terminal device is described as "a fifth packet". Refer to FIG. 16. The specific implementation process of "reassembling received packets into aggregated parameter data of the DNN model" includes the following steps.

S8041: The second terminal device reassembles fifth packets corresponding to a same message index into a message corresponding to the same message index.

The message corresponding to the same message index includes a preset field and parameter data, as specifically shown in part (a) in FIG. 10 or part (a) in FIG. 11.

For example, each packet received by the second terminal device includes an IP packet header and an IB BTH. The second terminal device may determine, based on IB BTHs in the received packets, message indexes corresponding to the packets. The second terminal device reassembles, based on IB BTHs, fifth packets corresponding to a same message index into a message corresponding to the message index.

S8042: The second terminal device determines parameter data of the DNN model based on different messages.

The preset field in the message includes a message index, and the message index is carried in a second field, as shown in part (a) in FIG. 10. Message indexes in preset fields in different messages are different. When one second terminal device includes one DEV, and transmits parameter data through one connection, the second terminal device reassembles messages with different message indexes into parameter data of the DNN model.

The preset field in the message further includes a channel identifier, and the channel identifier is carried in a fourth field, as shown in part (a) in FIG. 11. Channel identifiers in preset fields in different messages may be the same or different. When one second terminal device includes one DEV, and transmits parameter data through z channels, the second terminal device determines, based on fourth fields in messages, messages transmitted through different channels. Further, in messages transmitted through a same channel, the second terminal device reassembles messages with different message indexes into parameter data of a part of the DNN model. Finally, the second terminal device reassembles parameter data of different parts of the DNN model.

It should be noted that S8041 may be performed by a network adapter of the second terminal device, and S8042 may be performed by a DEV of the second terminal device. The network adapter of the second terminal device may determine, based on a DstQP, a DEV to which a message is to be sent, so that a corresponding DEV performs S8042.

In this way, after the second terminal device receives aggregated packets, the second terminal device may reassemble packets corresponding to a same message index into one message, or reassemble packets corresponding to a same channel identifier and a same message index into one message, and then determine aggregated parameter data of the DNN model based on different messages, to perform next DNN model training. Each of terminal devices other than the second terminal device in the at least two terminal devices performs S8041 and S8042. In this way, different terminal devices in the at least two terminal devices can obtain aggregated data, so that the different terminal devices in the at least two terminal devices perform next DNN model training based on the same aggregated data, thereby shortening DNN model training time.

According to the communication method provided in this embodiment of the present disclosure, a to-be-aggregated packet is identified by using a message index. Parameter data in packets identified by a same message index is parameter data of a same location of the same DNN model. In this embodiment of the present disclosure, an aggregation function implemented by the terminal device in the conventional technology is offloaded to the first network device, and the first network device implements aggregation processing. To be specific, the first network device performs aggregation processing on packets with a same message index by using a high throughput and a caching capability of the first network device, so that different terminal devices obtain aggregated data. In this way, compared with a data amount of parameter data of the DNN model, the terminal device does not need to transmit an extra amount of data, so that a network bandwidth limitation of a communication network is avoided, a communication delay and data redundancy in the communication network are reduced, and DNN model training efficiency is improved without affecting a forwarding function of the first network device for a non-aggregated packet. In addition, because an existing transmission protocol can be used in the communication method in this embodiment of the present disclosure, the communication method in this embodiment of the present disclosure is also applicable to an existing communication network architecture.

Figure 17:
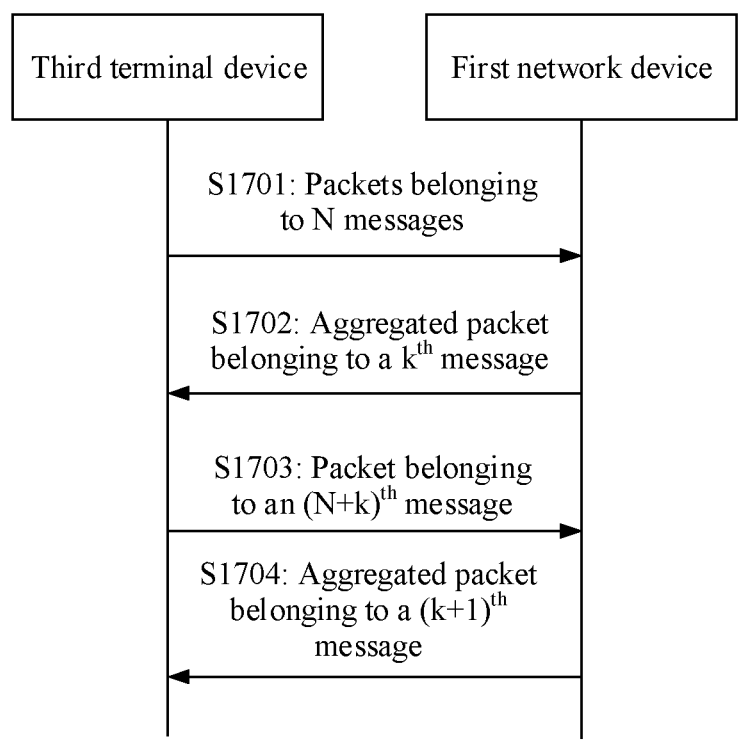
FIG. 17 is a schematic flowchart of another communication method according to an embodiment of the present disclosure.

In some embodiments, to improve operation efficiency of the network device, each terminal device sends messages to the first network device by using a sliding window mechanism. For ease of description, an implementation process of the sliding window mechanism is described by using "an interaction process between one terminal device and the first network device" as an example. Any one of the at least two terminal devices is described as "a third terminal device". Refer to FIG. 17. A specific implementation process of the sliding window mechanism includes the following steps.

S1701: The third terminal device sends packets belonging to N messages to the first network device. Correspondingly, the first network device receives the packets belonging to the N messages from the third terminal device.

N is a positive integer greater than 1. In other words, the third terminal device separately encapsulates the N messages into different packets, and sends, to the first network device, the packets into which the N messages are encapsulated.

S1702: The first network device sends an aggregated packet belonging to a $k^{th}$ message to the third terminal device. Correspondingly, the third terminal device receives the aggregated packet belonging to the $k^{th}$ message from the first network device.

The aggregated packet of the $k^{th}$ message is obtained by aggregating a packet belonging to a message with a $k^{th}$ message index, and the $k^{th}$ message indexed by the kth message index is the $k^{th}$ message sent by the third terminal device, where k is a positive integer.

S1703: The third terminal device sends a packet belonging to an $(N+k)^{th}$ message to the first network device. Correspondingly, the first network device receives the packet belonging to the $(N+k)^{th}$ message from the third terminal device.

S1704: The first network device sends an aggregated packet belonging to a $(k+1)^{th}$ message to the third terminal device. Correspondingly, the third terminal device receives the aggregated packet belonging to the $(k+1)^{th}$ message from the first network device.

The aggregated packet of the $(k+1)^{th}$ message is obtained by aggregating a packet belonging to a message with a $(k+1)^{th}$ message index, and the $(k+1)^{th}$ message indexed by the $(k+1)^{th}$ message index is the $(k+1)^{th}$ message sent by the third terminal device. In this way, the first network device can always cache parameter data of N messages. In addition, a terminal device other than the third terminal device in the at least two terminal devices also performs S1701 to S1704, so that the first network device can continuously perform an aggregation operation, thereby ensuring aggregation operation efficiency.

The foregoing descriptions use a scenario in which "one network device performs aggregation processing" as an example. When there are a huge quantity of terminal devices, or to share an aggregation operation amount of a network device to further improve aggregation operation efficiency, the following describes a scenario in which "a plurality of network devices perform aggregation processing".

Figure 18:
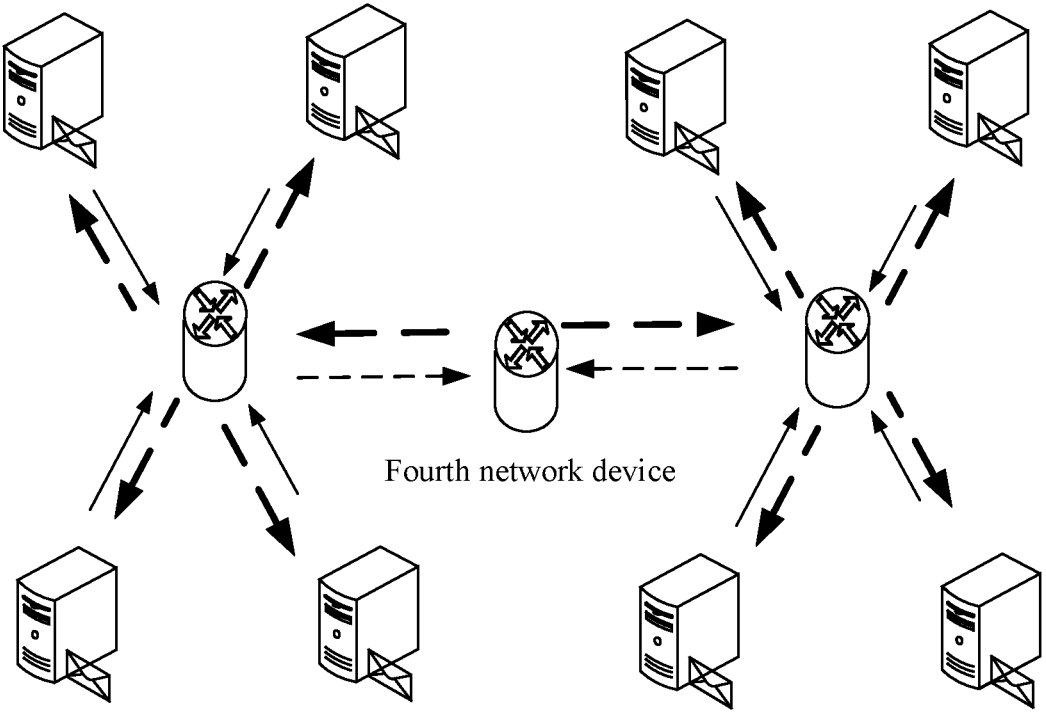
FIG. 18 is a diagram of an architecture of another communication system according to an embodiment of the present disclosure.

First, FIG. 18 shows a system architecture in which a plurality of terminal devices are connected to a plurality of network devices. In FIG. 18, each terminal device in the first group is wired or wirelessly connected to a second network device. Each terminal device in the second group is wired or wirelessly connected to a third network device. Both the second network device and the third network device are connected to a fourth network device. There are at least two terminal devices in each group. FIG. 18 shows an example system architecture in which each group includes four terminal devices. There may be another quantity of terminal devices in each group. This is not limited in this embodiment of the present disclosure. In each group, a plurality of terminal devices constitute one global logical ring network topology by using a network device. In the global logical ring network topology formed by the plurality of terminal devices, the terminal devices may transmit data clockwise or counterclockwise. Data transmission directions in different global logical ring network topologies may be the same or different. In FIG. 18, a solid line with an arrow shows a packet transmission process before a network device (namely, the second network device or the third network device) in a group performs aggregation processing. A thin dashed line with an arrow shows a packet transmission process after a network device (namely, the second network device or the third network device) in a group performs aggregation processing and before the fourth network device performs aggregation processing. A thick dashed line with an arrow shows a packet transmission process after the fourth network device performs aggregation processing.

Herein, the second network device and the third network device may be TOR switches. The fourth network device may be a spine switch.

Figure 19:
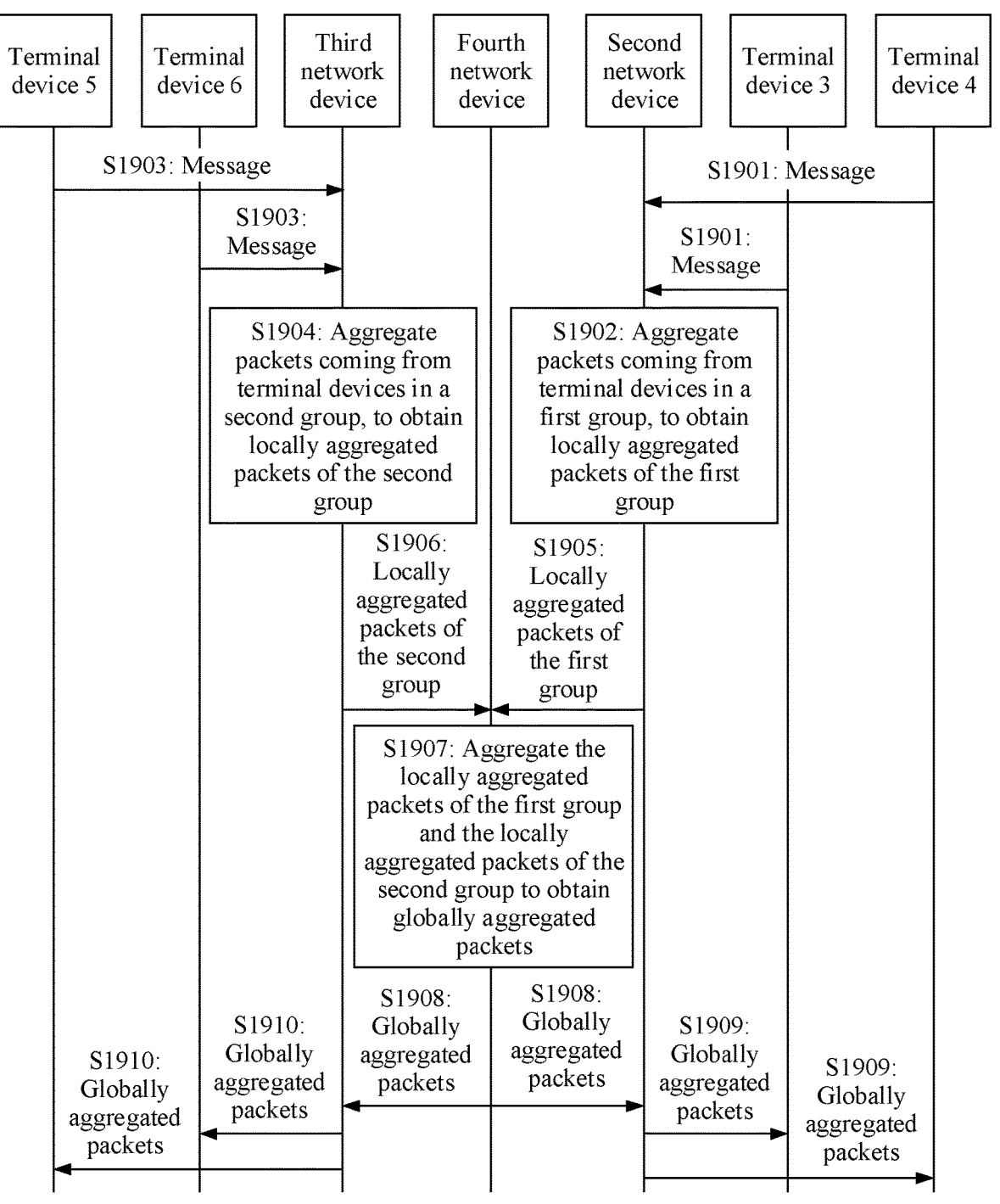
FIG. 19 is a schematic flowchart of another communication method according to an embodiment of the present disclosure.

Then, based on the communication system architecture shown in FIG. 18, as shown in FIG. 19, a specific implementation process of the communication method in embodiments of the present disclosure includes the following steps.

S1901: Each terminal device in the first group sends a packet to the second network device. Correspondingly, the second network device receives the packet from each terminal device in the first group.

Herein, there are at least two terminal devices in the first group. For example, there are two terminal devices in the first group, and the two terminal devices are denoted as a terminal device 3 and a terminal device 4. Each of the at least two terminal devices sends at least one packet. For a specific implementation process of S1901, refer to related descriptions of S801.

S1902: The second network device aggregates packets coming from the terminal devices in the first group to obtain locally aggregated packets of the first group.

The locally aggregated packets of the first group are obtained by aggregating the packets coming from the terminal devices in the first group.

Herein, for a specific implementation process of S1902, refer to related descriptions of S802.

S1903: Each terminal device in the second group sends a packet to the third network device. Correspondingly, the third network device receives the packet from each terminal device in the second group.

Herein, there are at least two terminal devices in the second group. For example, there are two terminal devices in the first group, and the two terminal devices are denoted as a terminal device 5 and a terminal device 6. Each of the at least two terminal devices sends at least one packet. Quantities of terminal devices in different groups may be the same or different. For a specific implementation process of S1903, refer to related descriptions of S801.

S1904: The third network device aggregates packets coming from the terminal devices in the second group to obtain locally aggregated packets of the second group.

The locally aggregated packets of the second group are obtained by aggregating the packets coming from the terminal devices in the second group.

Herein, for a specific implementation process of S1904, refer to related descriptions of S802.

S1905: The second network device sends the locally aggregated packets of the first group to the fourth network device. Correspondingly, the fourth network device receives the locally aggregated packets of the first group from the second network device.

S1906: The third network device sends the locally aggregated packets of the second group to the fourth network device. Correspondingly, the fourth network device receives the locally aggregated packets of the second group from the third network device.

S1907: The fourth network device aggregates the locally aggregated packets of the first group and the locally aggregated packets of the second group to obtain globally aggregated packets.

Herein, for a specific implementation process of S1907, refer to related descriptions of S802.

S1908: The fourth network device sends the globally aggregated packets to the second network device and the third network device. Correspondingly, the second network device receives the globally aggregated packets from the fourth network device, and the third network device receives the globally aggregated packets from the fourth network device.

S1909: The second network device sends the globally aggregated packets to each terminal device in the first group. Correspondingly, each terminal device in the first group receives the globally aggregated packets from the second network device.

For example, the second network device sends the globally aggregated packets to the terminal device 3 and the terminal device 4. Correspondingly, the terminal device 3 receives the globally aggregated packets from the second network device, and the terminal device 4 receives the globally aggregated packets from the second network device.

S1910: The third network device sends the globally aggregated packets to each terminal device in the second group. Correspondingly, each terminal device in the second group receives the globally aggregated packets from the third network device.

For example, the third network device sends the globally aggregated packets to the terminal device 5 and the terminal device 6. Correspondingly, the terminal device 5 receives the globally aggregated packets from the third network device, and the terminal device 6 receives the globally aggregated packets from the third network device.

In this way, when there are a huge quantity of terminal devices, aggregation processing may be implemented by using three network devices to reduce an operation amount of each network device and improve aggregation operation efficiency. In addition, to further improve aggregation operation efficiency in the communication system architecture shown in FIG. 18, there may be more network devices separately connected to terminal devices in more groups to perform aggregation processing on parameter data in terminal devices in the corresponding groups to obtain locally aggregated packets of the corresponding groups. The fourth network device performs aggregation processing on locally aggregated packets of the more groups to obtain globally aggregated packets. In this way, a DNN model training process can be performed on more terminal devices, so that DNN model training efficiency is improved.

The foregoing descriptions use a scenario in which "one terminal device includes one computing device" as an example. In other words, a DNN model training process is performed by using one computing device in one terminal device. To further improve DNN model operation efficiency, one terminal device includes a plurality of computing devices, and different training data is allocated to the computing devices. The computing devices train a same DNN model based on the allocated training data to obtain parameter data of the DNN model. In other words, for one terminal device, a plurality of training processes are performed.

Figure 20:
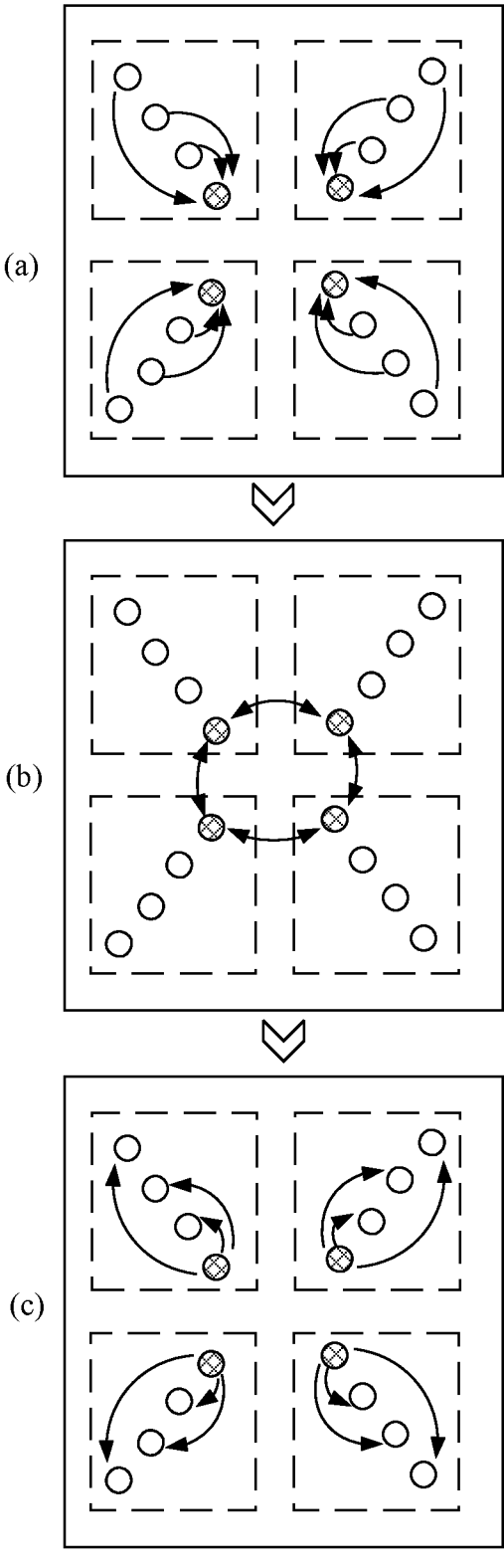
FIG. 20 is a schematic diagram of a process of another distributed DNN training method according to a related technology.

The following describes a scenario in which "one terminal device includes a plurality of computing devices". FIG. 20 shows a DNN training method according to a related technology. In FIG. 20, one dashed-line box indicates one terminal device, and one circle indicates one computing device. Each terminal device has n computing devices, and one of the n computing devices is a master computing device as indicated by a grid-filled circle in FIG. 20.

Refer to part (a) in FIG. 20. In a first stage, in one terminal device, a second computing device sends, to a master computing device through a bus, parameter data that is of a DNN model and that is obtained by the second computing device, and the master computing device aggregates parameter data to obtain a local aggregation result. Computing devices of a second terminal device also perform a same process. Finally, a master computing device of each terminal device obtains a local aggregation result of the corresponding terminal device.

Refer to part (b) in FIG. 20. In a second stage, a master computing device of each terminal device performs a ring-all-reduce operation by using a network device. In this way, the master computing device of each terminal device obtains a global aggregation result.

Refer to part (c) in FIG. 20. In the third stage, in one terminal device, a master computing device transmits a global aggregation result to a second computing device through a bus, so that the second computing device of the terminal device also obtains the global aggregation result. Computing devices of a second terminal device also perform a same process. Finally, each computing device of each terminal device obtains the global aggregation result.

It can be learned that an operation amount of a master computing device of each terminal device is large, and resources of another computing device are not fully used.

Figure 21:
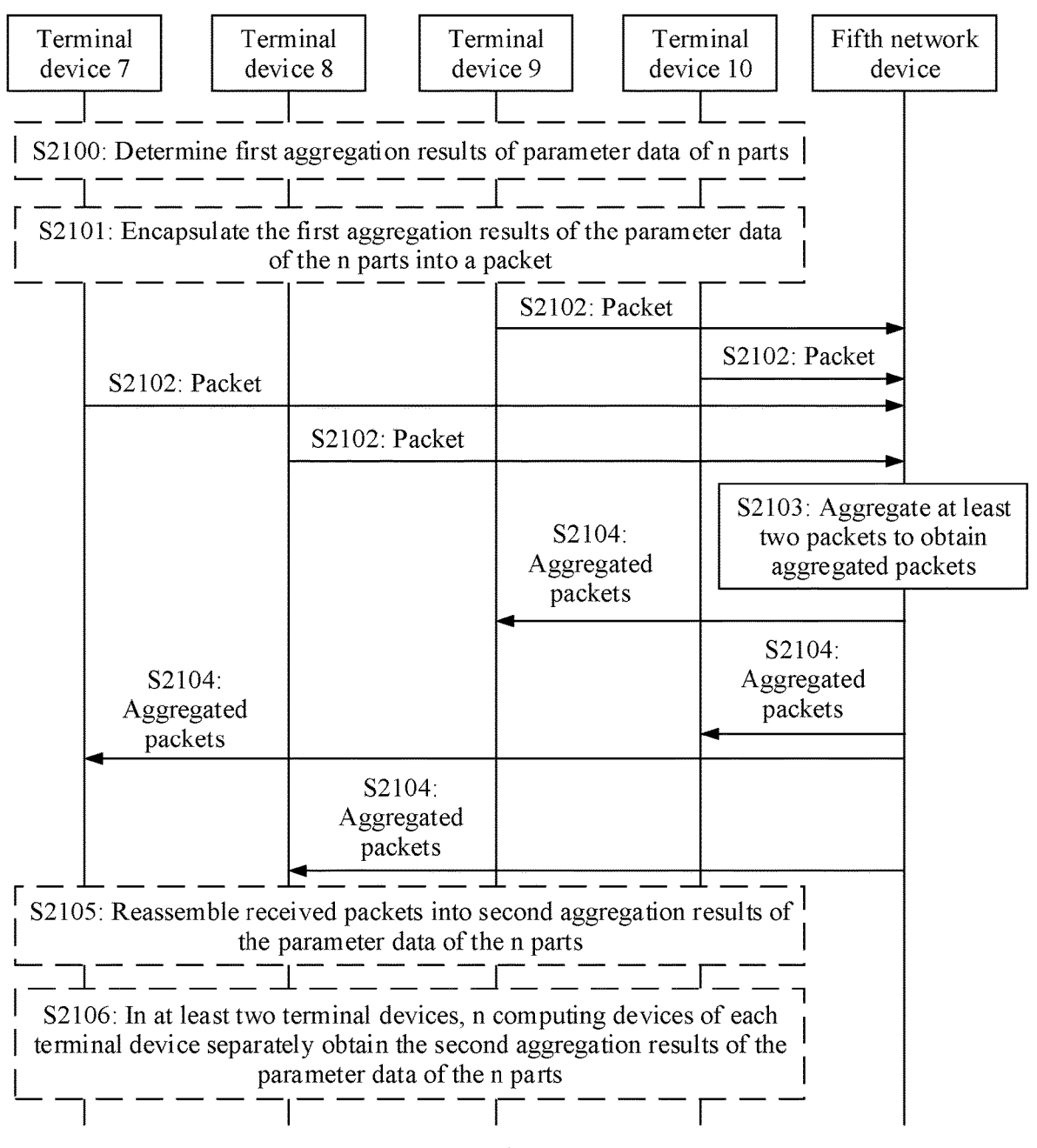
FIG. 21 is a schematic flowchart of another communication method according to an embodiment of the present disclosure.

In view of this, as shown in FIG. 21, a specific implementation process of the communication method in embodiments of the present disclosure includes the following steps.

S2100: Each of at least two terminal devices determines first aggregation results of parameter data of n parts.

Each terminal device has n computing devices. The n computing devices of each terminal device separately perform a DNN model training process, where $n \geq 2$.

Optionally, when each terminal device has n computing device, and packets are transmitted through one channel between computing devices distributed on different terminal devices, on each terminal device, one computing device corresponds to one channel identifier. In addition, computing devices corresponding to a same channel identifier are distributed on all of the at least two terminal devices. Further, to improve data transmission efficiency, when each terminal device has n computing device, and packets are transmitted through z channels between computing devices distributed on different terminal devices, on each terminal device, one computing device corresponds to z different channel identifiers. In addition, computing devices corresponding to a same channel identifier are distributed on all of the at least two terminal devices.

Herein, for example, the at least two terminal devices may be four terminal devices, and the four terminal devices may be a terminal device 7, a terminal device 8, a terminal device 9, and a terminal device 10. One of the at least two terminal devices is used as an example to describe a specific implementation process of "determining a first aggregation result". For ease of description, one of the at least two terminal devices is described as "a fourth terminal device". Refer to FIG. 22. The specific implementation process of "determining a first aggregation result" includes the following steps.

S21001: An $i^{th}$ computing device of the fourth terminal device trains a DNN model to obtain parameter data of n parts.

Herein, i is a positive integer, and $1 \leq i \leq n$. In other words, any computing device of the fourth terminal device trains the same DNN model to obtain parameter data of n parts.

S21002: In a jth iteration of the fourth terminal device, the $i^{th}$ computing device sends, to an $(i+1)^{th}$ computing device, an aggregation processing result that is of parameter data of an $(x+i-j+1)^{th}$ part and that is obtained after $(j-1)$ iterations. The $i^{th}$ computing device receives, from an $(i-1)^{th}$ computing device, an aggregation result that is of parameter data of an $(x+i-j)^{th}$ part and that is obtained after $(j-1)$ iterations, and aggregates the aggregation result and data of the $(x+i-j)^{th}$ part in the $i^{th}$ computing device to obtain an aggregation processing result that is of parameter data of the $(x+i-j)^{th}$ part and that is obtained after j iterations, so that in a $(j+1)^{th}$ iteration, the $i^{th}$ computing device sends, to the $(i+1)^{th}$ computing device, the aggregation processing result that is of the parameter data of the $(x+i-j)^{th}$ part and that is obtained after j iterations, until traversal is performed for j from 1 to $(n-1)$ and a first aggregation result of an $(x+i+1)^{th}$ part is obtained.

All of i, j, and x are positive integers, $1 \leq i \leq n$, and $1 \leq x \leq n$. If $i-1<1$, $(i-1)$ is replaced with $(i-1+n)$; and if $i+1>n$, $(i+1)$ is replaced with $(i+1-n)$. $1 \leq x \leq n$, and $1 \leq j \leq n-1$. If $x+i-j<1$, $(x+i-j)$ is replaced with $(x+i-j+n)$; and if $x+i-j+1>n$, $(x+i-j+1)$ is replaced with $(x+i-j+1-n)$.

Figure 23:
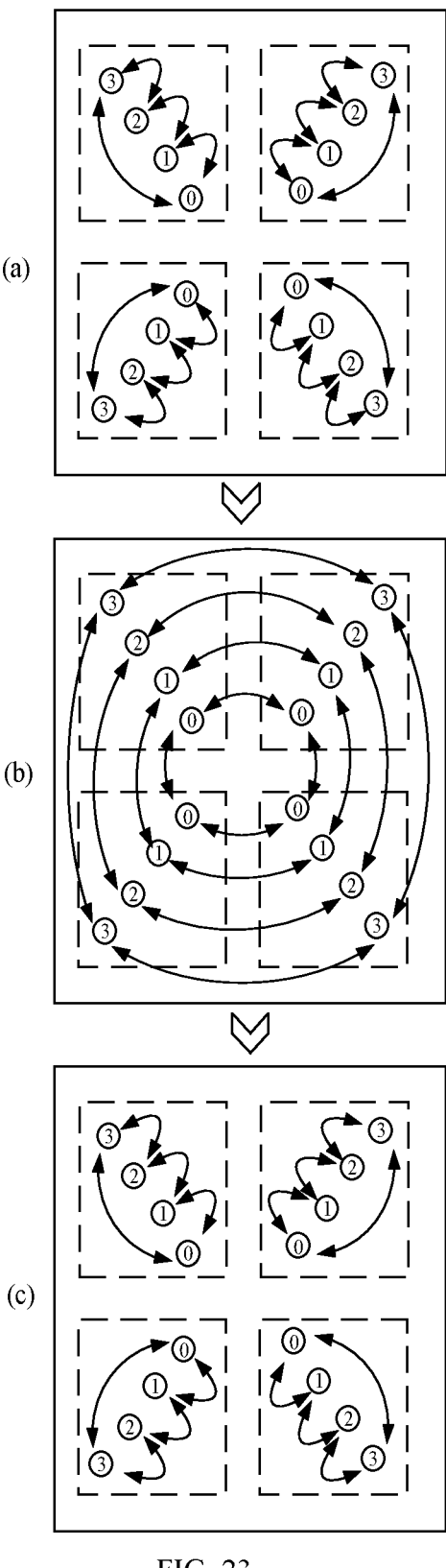
FIG. 23 is a schematic diagram of a process of another communication method according to an embodiment of the present disclosure.

For example, as shown in part (a) in FIG. 23, the fourth terminal device includes four computing devices. In part (a) in FIG. 23, one dashed-line box indicates one terminal device, one circle indicates one computing device, and a circle marked with "0" indicates that the computing device may be denoted as a DEV 0, a circle marked with "1" indicates that the computing device may be denoted as a DEV 1, a circle marked with "2" indicates that the computing device may be denoted as a DEV 2, and a circle marked with "3" indicates that the computing device may be denoted as a DEV 3. A curve indicates a transmission direction of parameter data. In the fourth terminal device, data is transmitted between different computing devices through a bus.

With reference to part (a) in FIG. 4, parameter data of four parts that is obtained by the DEV 0 may be respectively denoted as a0, b0, c0, and d0. Parameter data of four parts that is obtained by the DEV 1 may be respectively denoted as a1, b1, c1, and d1. Parameter data of four parts that is obtained by the DEV 2 may be respectively denoted as a2, b2, c2, and d2. Parameter data of four parts that is obtained by the DEV 3 may be respectively denoted as a3, b3, c3, and d3. In a process in which the fourth terminal device implements the first iteration of a "scatter-reduce stage", the DEV 0 sends parameter data of one part to the DEV 1, where parameter data may be denoted as a0, the DEV 1 sends parameter data of one part to the DEV 2, where the parameter data may be denoted as b1, the DEV 2 sends parameter data of one part to the DEV 3, where the parameter data may be denoted as c2, and the DEV 3 sends parameter data of one part to the DEV 0, where the parameter data may be denoted as d3. In this case, as shown in part (b) in FIG. 4, in the fourth terminal device, current parameter data of four parts of the DEV 0 is respectively denoted as a0, b0, c0, and (d0+d3), where (d0+d3) indicates that a processing result of parameter data of the part is obtained by aggregating the parameter data denoted as "d0" and the parameter data denoted as "d3". Current parameter data of four parts of the DEV 1 is respectively denoted as (a1+a0), b1, c1, and d1, where (a1+a0) indicates that a processing result of parameter data of the part is obtained by aggregating the parameter data denoted as "a1" and the parameter data denoted as "a0". Current parameter data of four parts of the DEV 2 is respectively denoted as a2, (b2+b1), c2, and d2, where (b2+b1) indicates that a processing result of parameter data of the part is obtained by aggregating the parameter data denoted as "b2" and the parameter data denoted as "b1". Current parameter data of four parts of the DEV 3 is respectively denoted as a3, b3, (c3+c2), and d3, where (c3+c2) indicates that a processing result of parameter data of the part is obtained by aggregating the parameter data denoted as "c3" and the parameter data denoted as "c2". Parameter data of different parts may be one data block.

After three iterations of the "scatter-reduce stage", each computing device of the fourth terminal device obtains a local processing result obtained after aggregation processing is performed on one part three times, as specifically shown in a thick-line box in part (d) in FIG. 4.

It should be noted that in this embodiment of the present disclosure, when data is transmitted between different terminal devices through a bus, a logical ring network topology formed by a plurality of terminal devices by using the bus is described as a "local logical ring network topology". When data is transmitted between different terminal devices by using a network device, a logical ring network topology formed by a plurality of terminal devices by using the network device is described as a "global logical ring network topology".

In this way, the $i^{th}$ computing device of the fourth terminal device can obtain a local aggregation result of parameter data of an $x^{th}$ part in the parameter data of the n parts. Another computing device of the fourth terminal device also performs S21001 and S21002, and values of x corresponding to different computing devices are different. In this way, in the fourth terminal device, different computing devices obtain local aggregation results of different parts. Therefore, the fourth terminal device can obtain first aggregation results of the parameter data of the n parts. In addition, a second terminal device in the at least two terminal devices also performs S21001 and S21002, so that the second terminal device also obtains first aggregation results of parameter data of n parts. In the conventional technology, a master computing device of each terminal device performs data aggregation processing. In this embodiment of the present disclosure, different computing devices can perform data aggregation processing, so that resources of different computing devices can be fully used to avoid a problem that an operation amount of a computing device of a terminal device is excessively large, thereby improving aggregation processing operation efficiency.

S2101: Each of the at least two terminal devices encapsulates the first aggregation results of the parameter data of the n parts into a packet.

For a specific implementation process of S2101, refer to related descriptions of S8000 to S8003.

S2102: Each of the at least two terminal devices sends the packet to a fifth network device. Correspondingly, the fifth network device receives the packet from each of the at least two terminal devices.

For a specific implementation process of S2102, refer to related descriptions of S801.

S2103: The fifth network device aggregates at least two packets to obtain aggregated packets.

Parameter data of the aggregated packet is a second aggregation result. The second aggregation result is obtained by aggregating first aggregation results of all of the at least two terminal devices.

For a specific implementation process of S2103, refer to related descriptions of S802. When one terminal device includes a plurality of computing devices, a first preset value is a quantity value of computing devices providing parameter data of a same location of the same DNN model to a first network device. The second preset value is the quantity value of terminal devices providing parameter data of a same location of the same DNN model to the first network device.

For example, as shown in part (b) in FIG. 23, when the fifth network device aggregates parameter data of the first part, all to-be-aggregated packets come from DEVs 0 of different terminal devices, specifically indicated by a curve between DEVs 0 in part (b) in FIG. 23. When the fifth network device aggregates parameter data of the second part, all to-be-aggregated packets come from DEVs 1 of different terminal devices, specifically indicated by a curve between DEVs 1 in part (b) in FIG. 23. When the fifth network device aggregates parameter data of the third part, all to-be-aggregated packets come from DEVs 2 of different terminal devices, specifically indicated by a curve between DEVs 2 in part (b) in FIG. 23. When the fifth network device aggregates parameter data of the fourth part, all to-be-aggregated packets come from DEVs 3 of different terminal devices, specifically indicated by a curve between DEVs 3 in part (b) in FIG. 23.

Figure 24:
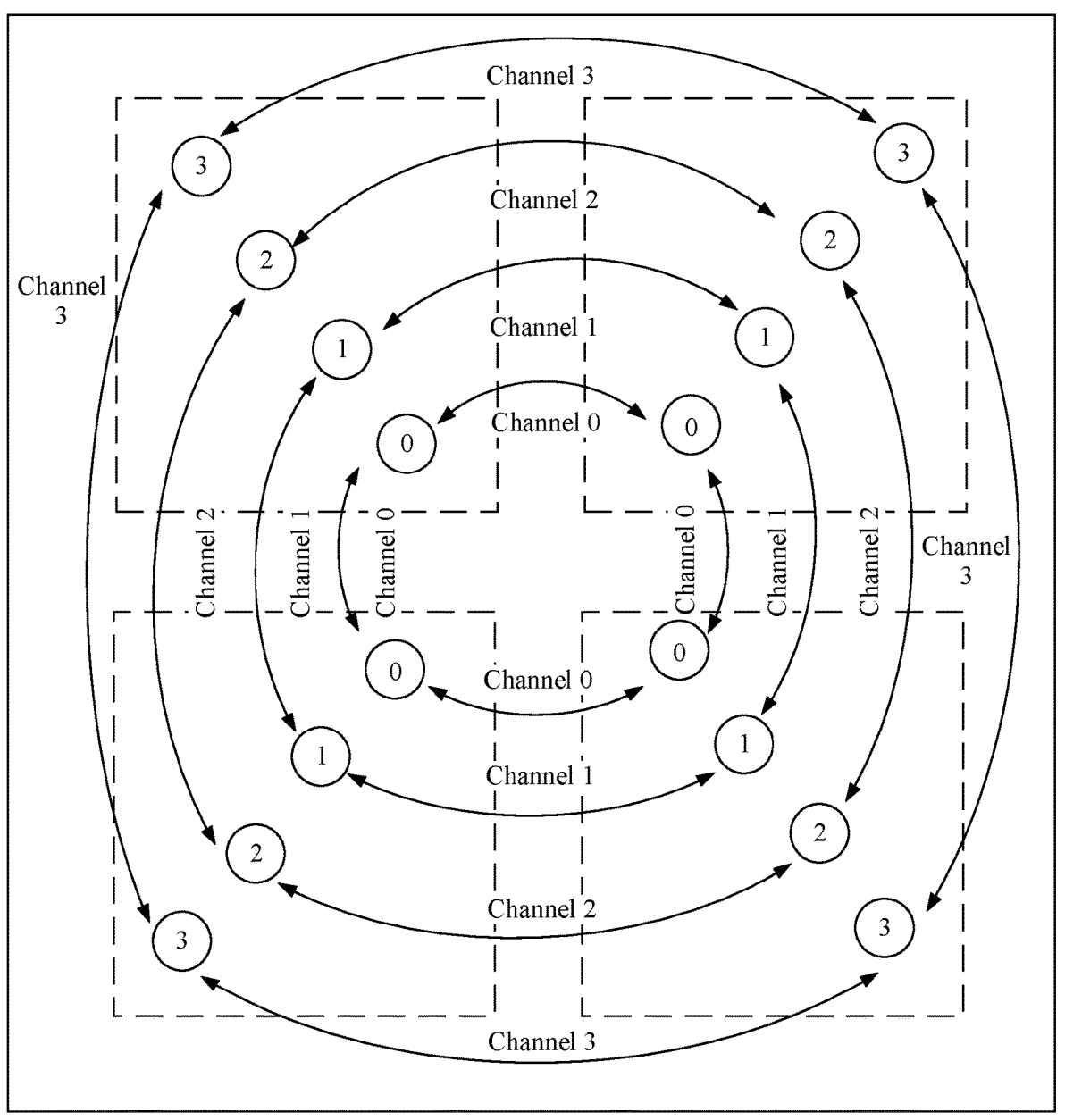
FIG. 24 is a schematic diagram of a process of another communication method according to an embodiment of the present disclosure.

For example, as shown in FIG. 24, in a global logical ring network topology formed by using the fifth network device, packets are transmitted between terminal devices through one channel. In FIG. 24, one curve with arrows indicates one channel between terminal devices. A channel identifier of a channel between every two adjacent DEVs 0 is a channel 0, a channel identifier of a channel between every two adjacent DEVs 1 is a channel 1, a channel identifier of a channel between every two adjacent DEVs 2 is a channel 2, and a channel identifier of a channel between every two adjacent DEVs 3 is a channel 3. In this case, packets aggregated by the fifth network device correspond to a same channel identifier.

Figure 25:
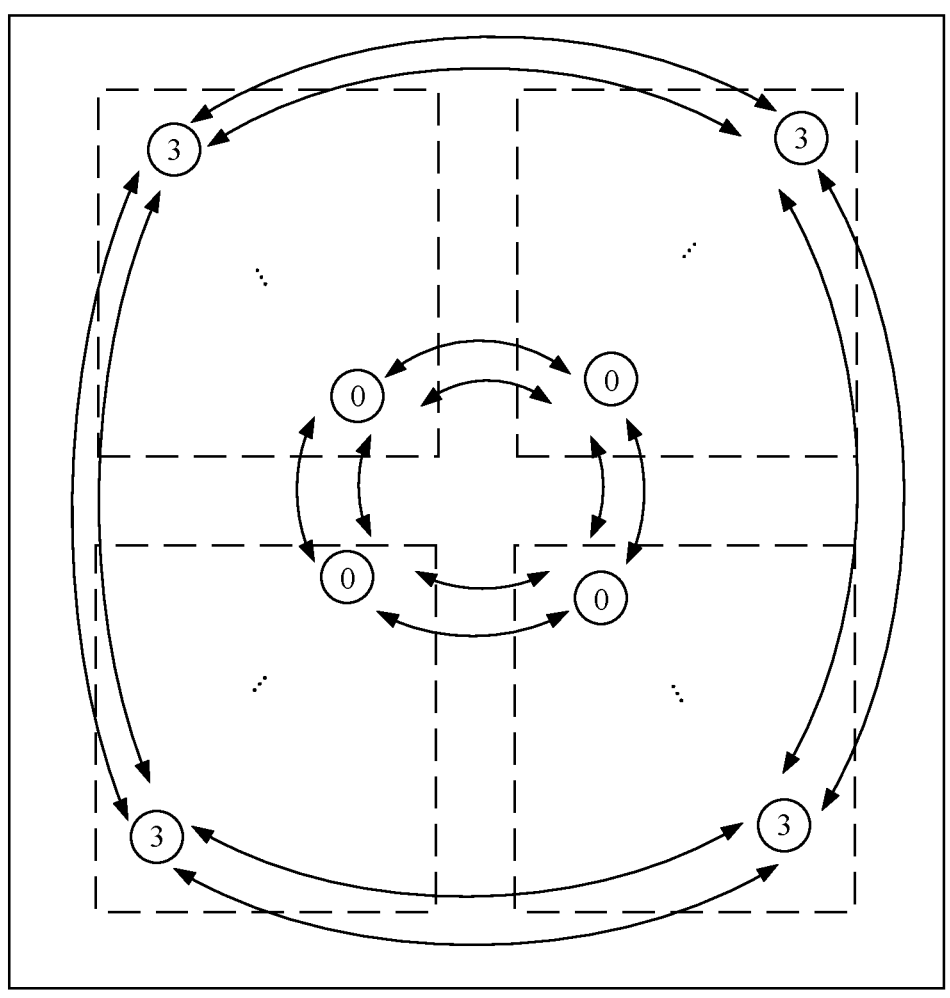
FIG. 25 is a schematic diagram of a process of another communication method according to an embodiment of the present disclosure.

For example, as shown in FIG. 25, in a global logical ring network topology formed by using the fifth network device, packets are transmitted between terminal devices through two channels. In FIG. 25, one curve with arrows indicates one channel between terminal devices. There are two channels between two adjacent DEVs 0, and channel identifiers of the two channels are a channel 0 and a channel 1. There are two channels between two adjacent DEVs 1, and channel identifiers of the two channels are a channel 2 and a channel 3, where the channels are not shown in FIG. 25. There are two channels between two adjacent DEVs 2, and channel identifiers of the two channels are a channel 4 and a channel 5, where the channels are not shown in FIG. 25. There are two channels between two adjacent DEVs 3, and channel identifiers of the two channels are a channel 6 and a channel 7. In this case, packets aggregated by the fifth network device still correspond to a same channel identifier.

S2104: The fifth network device separately sends the aggregated packets to the at least two terminal devices. Correspondingly, each of the at least two terminal devices receives the aggregated packets from the fifth network device.

For a specific implementation process of S2104, refer to related descriptions of S803.

S2105: Each of the at least two terminal devices reassembles the received packets into second aggregation results of the parameter data of the n parts.

Herein, when one second terminal device includes a plurality of DEVs, and each DEV transmits parameter data through one channel, the second terminal device determines, based on a DstQP of an IB BTH in each packet, a DEV to which a message including the packet belongs. In a plurality of messages belonging to a same DEV, the second terminal device reassembles messages with different message indexes into parameter data of the DNN model.

When one second terminal device includes a plurality of DEVs, and each DEV transmits parameter data through z channels, the second terminal device determines, based on a DstQP of an IB BTH in each packet, a DEV to which a message including the packet belongs. In a plurality of messages belonging to a same DEV, the second terminal device determines, based on fourth fields in the messages, messages transmitted through different channels. Further, in messages that correspond to a same DEV and that are transmitted through a same channel, the second terminal device reassembles messages with different message indexes into parameter data of a part of the DNN model. Finally, the second terminal device reassembles parameter data of different parts of the DNN model, so that one DEV obtains parameter data of the DNN model.

In this way, each computing device of each terminal device can obtain a second aggregation result of parameter data of one part. The second aggregation result is an aggregation result obtained by aggregating parameter data of a corresponding part in each computing device of at least two terminal devices.

S2106: In at least two terminal devices, n computing devices of each terminal device separately obtain the second aggregation results of the parameter data of the n parts.

Herein, any one of the at least two terminal devices is described as "a fourth terminal device". Refer to FIG. 26. A process in which n computing devices of the fourth terminal device separately obtain second aggregation results of parameter data of n parts is as follows.

S21061: An $i^{th}$ processor of the fourth terminal device receives a second aggregation result of parameter data of an $(x+i-j+1)^{th}$ part from a network adapter. Herein, different computing devices of the fourth terminal device obtain second aggregation results of parameter data of different parts from the network adapter.

The second aggregation result of the parameter data of the $(x+i-j+1)^{th}$ part is obtained by aggregating a first aggregation result of parameter data of the $(x+i-j+1)^{th}$ part in a first local logical ring network topology and a first aggregation result of parameter data of the $(x+i-j+1)^{th}$ part in another local logical ring network topology, and the first aggregation result of the parameter data of the $(x+i-j+1)^{th}$ part is obtained by aggregating parameter data of the $(x+i-j+1)^{th}$ part in different processors in the first local logical ring network topology.

S21062: In a jth iteration of the fourth terminal device, the $i^{th}$ computing device sends a second aggregation result of parameter data of the $(x+i-j+1)^{th}$ part to an $(i+1)^{th}$ computing device. The $i^{th}$ computing device receives a second aggregation result of parameter data of an $(x+i-j)^{th}$ part from an $(i-1)^{th}$ computing device, and replaces data of the $(x+i-j)^{th}$ part in the $i^{th}$ computing device with the second aggregation result of the parameter data of the $(x+i-j)^{th}$ part, so that in a $(j+1)^{th}$ iteration, the $i^{th}$ computing device sends the second aggregation result of the parameter data of the $(x+i-j)^{th}$ part to the $(i+1)^{th}$ computing device, until traversal is performed for j from 1 to $(n-1)$ and a second aggregation result of an $(x+i+1)^{th}$ part is obtained.

All of i, j, and x are positive integers, $1 \leq i \leq n$, and $1 \leq x \leq n$. All of the $(i-1)^{th}$ computing device, the $i^{th}$ computing device, and the $(i+1)$th computing device are distributed in the first local logical ring network topology, the n computing devices in the first local logical ring network topology are sequentially connected, and the first computing device in the n computing devices is connected to the last computing device in the n computing devices. If $i-1<1$, $(i-1)$ is replaced with $(i-1+n)$; if $i+1>n$, $(i+1)$ is replaced with $(i+1-n)$; if $x+i-j<1$, $(x+i-j)$ is replaced with $(x+i-j+n)$; and if $x+i-j+1>n$, $(x+i-j+1)$ is replaced with $(x+i-j+1-n)$.

For example, as shown in part (c) in FIG. 23, the fourth terminal device includes four computing devices. In part (c) in FIG. 23, one dashed-line box indicates the fourth terminal device, one circle indicates one computing device, and a curve indicates a transmission direction of parameter data. Channel identifiers respectively corresponding to the four computing devices of the fourth terminal device may be respectively denoted as a DEV 0, a DEV 1, a DEV 2, and a DEV 3. In the fourth terminal device, data is transmitted between different computing devices through a bus.

With reference to part (a) in FIG. 5, parameter data of n parts that is obtained by the DEV 0 may be respectively denoted as a0, (b0+b3+b2+b1), (c0+c3+c2), and (d0+d3). Parameter data of n parts that is obtained by the DEV 1 may be respectively denoted as (a1+a0), b1, (c1+c0+c3+c2), and (d1+d0+d3). Parameter data of n parts that is obtained by the DEV 2 may be respectively denoted as (a2+a1+a0), (b2+b1), c2, and (d2+d1+d0+d3). Parameter data of n parts that is obtained by the DEV 3 may be respectively denoted as (a3+a2+a1+a0), (b3+b2+b1), (c3+c2), and d3. In a process in which the fourth terminal device implements one iteration, the DEV 0 sends parameter data of one part to the DEV 1, where the parameter data may be denoted as (b0+b3+b2+b1), the DEV 1 sends parameter data of one part to the DEV 2, where the parameter data may be denoted as (c1+c0+c3+c2), the DEV 2 sends parameter data of one part to the DEV 3, where the parameter data may be denoted as (d2+d1+d0+d3), and the DEV 3 sends parameter data of one part to the DEV 0, where the parameter data may be denoted as (a3+a2+a1+a0). In this case, as shown in part (b) in FIG. 5, in the fourth terminal device, current parameter data of four parts of the DEV 0 is respectively denoted as (a3+a2+a1+a0), (b0+b3+b2+b1), (c0+c3+c2), and (d0+d3). Current parameter data of four parts of the DEV 1 is respectively denoted as (a1+a0), (b0+b3+b2+b1), (c1+c0+c3+c2), and (d1+d0+d3). Current parameter data of four parts of the DEV 2 is respectively denoted as (a2+a1+a0), (b2+b1), (c1+c0+c3+c2), and (d2+d1+d0+d3). Current parameter data of four parts of the DEV 3 is respectively denoted as (a3+a2+a1+a0), (b3+b2+b1), (c3+c2), and (d2+d1+d0+d3). After three iterations, each computing device of the fourth terminal device obtains a second aggregation result of parameter data of each part in the parameter data of the n parts, as specifically shown in part (d) in FIG. 5.

In this way, the $i^{th}$ computing device of the fourth terminal device can obtain second aggregation results of the parameter data of the n parts. Another computing device of the fourth terminal device also performs S2106. In this way, in the fourth terminal device, different computing devices also obtain the second aggregation results of the parameter data of the n parts, so that the different computing devices of the fourth terminal device perform next training.

According to the communication method provided in this embodiment of the present disclosure, when one terminal device includes a plurality of computing devices, data is also transmitted between different computing devices, so that resources of different computing devices are fully used, and aggregation processing operation efficiency is improved. In the conventional technology, a master computing device of each terminal device performs data transmission processing, for example, aggregates parameter data of a DNN model in other computing devices at a local end, or sends a second aggregation result of parameter data of the DNN model to the other computing device at the local end. In this embodiment of the present disclosure, different computing devices can perform data transmission processing, so that resources of the different computing devices can be fully used, and a problem that an operation amount of a computing device of a terminal device is excessively large can be avoided.

It should be noted that when a plurality of computing devices are distributed on a same terminal device, information is exchanged and transmitted between the plurality of computing devices through a bus. When a plurality of computing devices are distributed on different terminal devices, information is exchanged and transmitted between the plurality of computing devices by using a network device. Scenario identification is implemented by exchanging information between different computing devices. In other words, one terminal device includes one computing device or a plurality of computing devices.

The foregoing mainly describes the solutions provided in embodiments of the present disclosure from a perspective of interaction between devices. Consequently, an embodiment of the present disclosure further provides a communication apparatus. The communication apparatus may be the device in the foregoing method embodiment, an apparatus including the device, or a component that can be used for the device. It may be understood that to implement the foregoing functions, the communication apparatus includes a hardware structure and/or a software module for performing a corresponding function. A person skilled in the art should easily be aware that, in combination with units and algorithm steps of the examples described in embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

FIG. 27 is a schematic diagram of a structure of a communication apparatus 2700. The communication apparatus 2700 includes an interface module 2701 and a processing module 2702. The interface module 2701 is an interface circuit of the apparatus, and is configured to receive a signal from another apparatus or send a signal to another apparatus. For example, when the apparatus is implemented in a manner of a chip, the interface module 2701 is an interface circuit that is of the chip and that is configured to receive a signal from another chip or apparatus. Alternatively, the interface module 2701 is an interface circuit that is of the chip and that is configured to send a signal to another chip or apparatus.

For example, the communication apparatus 2700 is the network device in the foregoing method embodiment.

The interface module 2701 is configured to receive at least two packets. Messages to which the at least two packets separately belong have a same message index, and the message index is used to index the messages to which the at least two packets separately belong. The processing module 2702 is configured to aggregate the at least two packets to obtain aggregated packets.

In a possible design, the communication apparatus further includes a storage module 2703. The processing module 2702 is further configured to determine a connection for transmitting a first packet. The processing module 2702 is further configured to determine, based on a sequence number of the first packet and a packet quantity indicated by a third field in the first packet, a first interval of sequence numbers of packets included in a message to which the first packet belongs. A first end value of the first interval is the sequence number of the first packet, and a second end value of the first interval is a value determined based on the sequence number of the first packet and the packet quantity indicated by the third field in the first packet. The storage module 2703 is configured to store a correspondence between the first interval and the connection for transmitting the first packet. The first packet further includes the sequence number. The sequence number is used to indicate a transmission sequence of the first packet in the connection for transmitting the first packet.

In a possible design, the processing module 2702 is further configured to determine the connection for transmitting the first packet. The processing module 2702 is further configured to: if the sequence number of the first packet falls within a first interval corresponding to the connection for transmitting the first packet, determine, as the message to which the first packet belongs, a message corresponding to the first interval within which the sequence number of the first packet falls. The first packet is any one of the at least two packets. The first packet further includes the sequence number. The sequence number is used to indicate a transmission sequence of the first packet in the connection for transmitting the first packet. The first packet is a non-first packet of the message to which the first packet belongs.

In a possible design, the processing module 2702 is further configured to determine a first quantity value of first packets that belong to messages with a same message index and that have a same sequence number in the messages with the same message index. The interface module 2701 is further configured to: if the processing module 2702 determines that the first quantity value is less than a first preset value, wait to receive a first packet that belongs to a message with the same message index and that has the same sequence number in the message with the same message index.

In a possible design, the processing module 2702 is further configured to determine a first quantity value of first packets that belong to messages with a same message index and that have a same sequence number in the messages with the same message index. The processing module 2702 is specifically configured to: if the first quantity value is equal to a first preset value, aggregate the first packets that belong to the messages with the same message index and that have the same sequence number in the messages with the same message index, to obtain the aggregated packets.

In a possible design, the processing module 2702 is further configured to determine a channel identifier corresponding to the first packet. The processing module 2702 is further configured to determine, based on the sequence number of the first packet and the packet quantity indicated by the third field, a second interval of sequence numbers of packets included in the message to which the first packet belongs, where a first end value of the second interval is the sequence number of the first packet, and a second end value of the second interval is a value determined based on the sequence number of the first packet and the packet quantity indicated by the third field in the first packet. The storage module 2703 is further configured to store a correspondence between the second interval and the channel identifier corresponding to the first packet. The first packet further includes the sequence number and the third field. The sequence number is used to indicate a transmission sequence of the first packet in the connection for transmitting the first packet. The third field is used to carry a packet quantity of packets included in the message to which the first packet belongs.

In a possible design, the processing module 2702 is further configured to determine the connection for transmitting the first packet. The processing module 2702 is further configured to use, as a channel identifier corresponding to the first packet, a channel identifier corresponding to the connection for transmitting the first packet. The processing module 2702 is further configured to: if the sequence number of the first packet falls within a second interval corresponding to the channel identifier, determine, as the message to which the first packet belongs, a message corresponding to the second interval within which the sequence number of the first packet falls. The first packet is any one of the at least two packets. The first packet further includes the sequence number. The sequence number is used to indicate a transmission sequence of the first packet in the connection for transmitting the first packet. The first packet is a non-first packet of the message to which the first packet belongs.

In a possible design, the processing module 2702 is further configured to determine a second quantity value of first packets that correspond to a same channel identifier, that belong to messages with a same message index, and that have a same sequence number in the messages with the same message index. The interface module 2701 is further configured to: when the processing module 2702 determines that the second quantity value is less than a second preset value, wait to receive a first packet that corresponds to the same channel identifier, that belongs to a message with the same message index, and that has the same sequence number in the message with the same message index.

In a possible design, the processing module 2702 is further configured to determine a second quantity value of first packets that correspond to a same channel identifier, that belong to messages with a same message index, and that have a same sequence number in the messages with the same message index. The processing module 2702 is specifically configured to: if the second quantity value is equal to a second preset value, aggregate the first packets that correspond to the same channel identifier, that belong to the messages with the same message index, and that have the same sequence number in the messages with the same message index, to obtain the aggregated packets.

In a possible design, the interface module 2701 is further configured to send the aggregated packets to a terminal device; or the interface module 2701 is further configured to send the aggregated packets to a target network device.

For example, the communication apparatus 2700 is the network adapter in the foregoing method embodiment. The interface module 2701 is configured to send first packets. The interface module 2701 is further configured to receive second packets. The second packets are obtained by aggregating packets with a same message index, and the packets with the same message index separately come from a current network adapter and another network adapter. The message index is used to index messages to which the packets with the same message index separately belong.

In a possible design, the interface module 2701 is further configured to obtain a message coming from a computing device. The processing module 2702 is further configured to split the message coming from the computing device into data packets. The processing module 2702 is further configured to encapsulate the data packets obtained after the splitting into the first packets. The message coming from the computing device includes a preset field and parameter data. The initial data packet in the data packets obtained after the splitting includes the preset field, and different data packets obtained after the splitting include parameter data of different parts.

Correspondingly, the processing module 2702 is further configured to reassemble second packets corresponding to a same message index into a message corresponding to the same message index. The interface module 2701 is further configured to send the message corresponding to the same message index to the computing device.

For example, the communication apparatus 2700 is the computing device in the foregoing method embodiment.

The processing module 2702 is configured to train a DNN model to obtain parameter data of n parts. The interface module 2701 is configured to: in a jth iteration, send, to an $(i+1)^{th}$ computing device, an aggregation processing result that is of parameter data of an $(x+i-j+1)^{th}$ part and that is obtained after $(j-1)$ iterations; and is further configured to: in the $j^{th}$ iteration, receive, from an $(i-1)^{th}$ computing device, an aggregation processing result that is of parameter data of an $(x+i-j)^{th}$ part and that is obtained after $(j-1)$ iterations, until traversal is performed for j from 1 to $(n-1)$. After the interface module 2701 receives, in the $j^{th}$ iteration, from the $(i-1)^{th}$ computing device, the aggregation processing result that is of the parameter data of the $(x+i-j)^{th}$ part and that is obtained after the $(j-1)$ iterations, the processing module 2702 is further configured to aggregate the aggregation processing result and data of the $(x+i-j)^{th}$ part in the computing device to obtain an aggregation processing result that is of parameter data of the $(x+i-j)^{th}$ part and that is obtained after j iterations. The processing module 2702 is further configured to, in a $(j+1)^{th}$ iteration, enable the interface module 2701 to send, to the $(i+1)^{th}$ computing device, the aggregation processing result that is of the parameter data of the $(x+i-j)^{th}$ part and that is obtained after j iterations, until traversal is performed for j from 1 to $(n-1)$ and a first aggregation result of an $(x+i+1)^{th}$ part is obtained.

All of i, j, and x are positive integers, $1 \le i \le n$, and $1 \le x \le n$. All of the $(i-1)^{th}$ computing device, the current computing device, and the $(i+1)^{th}$ computing device are distributed in a first local logical ring network topology, n computing devices in the first local logical ring network topology are sequentially connected, and the first computing device in the n computing devices is connected to the last computing device in the n computing devices. If $i-1<1$, $(i-1)$ is replaced with $(i-1+n)$; if $i+1>n$, $(i+1)$ is replaced with $(i+1-n)$; if $x+i-j<1$, $(x+i-j)$ is replaced with $(x+i-j+n)$; and if $x+i-j+1>n$, $(x+i-j+1)$ is replaced with $(x+i-j+1-n)$, where n is a positive integer, and $n \ge 2$.

For example, the communication apparatus 2700 is the computing device in the foregoing method embodiment.

The interface module 2701 is configured to receive a second aggregation result of parameter data of an $(x+i-j+1)^{th}$ part from a network adapter. The second aggregation result of the parameter data of the $(x+i-j+1)^{th}$ part is obtained by aggregating a first aggregation result of parameter data of the $(x+i-j+1)^{th}$ part in a first local logical ring network topology and a first aggregation result of parameter data of the $(x+i-j+1)^{th}$ part in another local logical ring network topology, and the first aggregation result of the parameter data of the $(x+i-j+1)^{th}$ part is obtained by aggregating parameter data of the $(x+i-j+1)^{th}$ part in n computing devices in the first local logical ring network topology. The interface module 2701 is further configured to in a jth iteration, send the second aggregation result of the parameter data of the $(x+i-j+1)^{th}$ part to an $(i+1)^{th}$ computing device. The interface module 2701 is further configured to receive a second aggregation result of parameter data of an $(x+i-j)^{th}$ part from an $(i-1)^{th}$ computing device.

The processing module 2702 is configured to replace data of the $(x+i-j)^{th}$ part in the computing device with the second aggregation result of the parameter data of the $(x+i-j)^{th}$ part. The processing module 2702 is further configured to, in a $(j+1)^{th}$ iteration, enable the interface module 2701 to send the second aggregation result of the parameter data of the $(x+i-j)^{th}$ part to the $(i+1)^{th}$ computing device, until traversal is performed for j from 1 to $(n-1)$ and a second aggregation result of an $(x+i+1)^{th}$ part is obtained.

All of i, j, and x are positive integers, $1 \le i \le n$, and $1 \le x \le n$. All of the $(i-1)^{th}$ computing device, the $i^{th}$ computing device, and the $(i+1)$th computing device are distributed in the first local logical ring network topology, the n computing devices in the first local logical ring network topology are sequentially connected, and the first computing device in the n computing devices is connected to the last computing device in the n computing devices. If $i-1<1$, $(i-1)$ is replaced with $(i-1+n)$; if $i+1>n$, $(i+1)$ is replaced with $(i+1-n)$; if $x+i-j<1$, $(x+i-j)$ is replaced with $(x+i-j+n)$; and if $x+i-j+1>n$, $(x+i-j+1)$ is replaced with $(x+i-j+1-n)$, where n is a positive integer, and $n \ge 2$.

All content related to each step in the foregoing method embodiments may be cited in function descriptions of a corresponding functional module.

In this embodiment, the communication apparatus 2700 is presented in a form of functional modules obtained through integration. Herein, the "module" may be a specific ASIC, a circuit, a processor that executes one or more software or firmware programs and a memory, an integrated logic circuit, and/or another component that can provide the foregoing functions. In a simple embodiment, a person skilled in the art may figure out that the communication apparatus 2700 may be in a form of a communication apparatus 2800 shown in FIG. 28.

Figure 28:
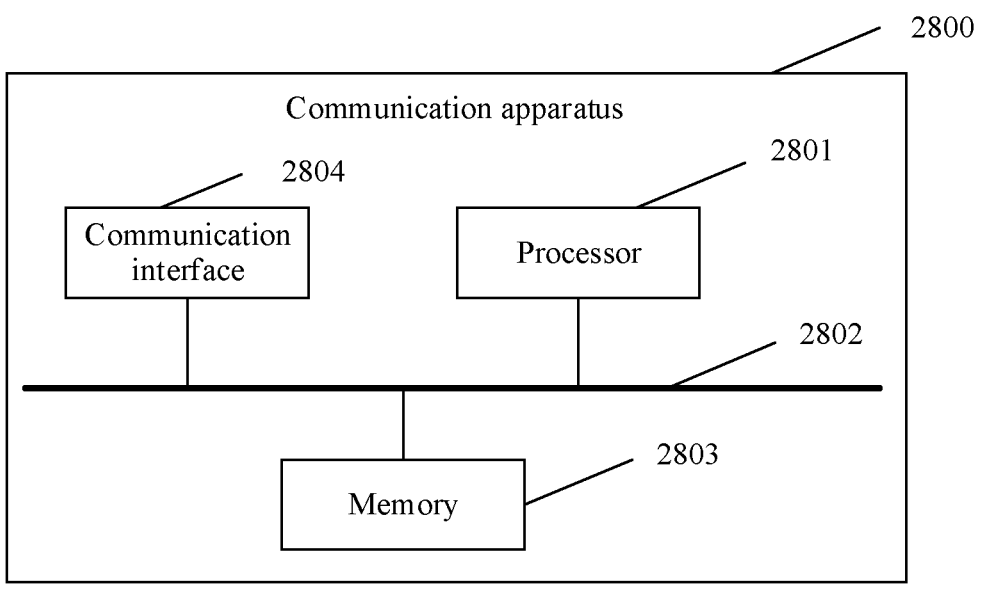
FIG. 28 is a schematic diagram of a hardware structure of a communication apparatus according to an embodiment of the present disclosure.

For example, a processor 2801 in the communication apparatus 2800 shown in FIG. 28 may invoke computer-executable instructions stored in a memory 2803 to enable the communication apparatus 2800 to perform the communication method in the foregoing method embodiments.

Specifically, functions/implementation processes of the interface module 2701 and the processing module 2702 in FIG. 27 may be implemented by the processor 2801 in the communication apparatus 2800 shown in FIG. 28 by invoking the computer-executable instructions stored in the memory 2803. Alternatively, a function/an implementation process of the processing module 2702 in FIG. 27 may be implemented by the processor 2801 in the communication apparatus 2800 shown in FIG. 28 by invoking the computer-executable instructions stored in the memory 2803. A function/an implementation process of the interface module 2701 in FIG. 27 may be implemented by a communication interface 2804 in the communication apparatus 2800 shown in FIG. 28. The processor 2801, the memory 2803, and the communication interface 2804 are connected to each other through a bus 2802.

The communication apparatus 2700 provided in this embodiment can perform the foregoing communication method. Therefore, for a technical effect that can be achieved by the communication apparatus 2700, refer to the foregoing method embodiment.

It should be noted that one or more of the foregoing modules or units may be implemented by using software, hardware, or a combination thereof. When any one of the foregoing modules or units is implemented by using software, the software exists in a form of computer program instructions, and is stored in the memory. The processor may be configured to execute the program instructions to implement the foregoing method procedures. The processor may be built in a system on a chip (SoC) or an ASIC, or may be an independent semiconductor chip. The processor includes a core for executing software instructions to perform operations or processing, and may further include a necessary hardware accelerator, for example, an FPGA, a programmable logic device (PLD), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software, to perform the foregoing method procedures.

Optionally, an embodiment of the present disclosure further provides a communication apparatus (where for example, the communication apparatus may be a chip or a chip system). The communication apparatus includes a processor configured to implement the method according to any one of the foregoing method embodiments. In a possible design, the communication apparatus further includes a memory. The memory is configured to store necessary program instructions and data. The processor may invoke program code stored in the memory to indicate the communication apparatus to perform the method according to any one of the foregoing method embodiments. Certainly, the memory may alternatively not be located in the communication apparatus. When the communication apparatus is a chip system, the communication apparatus may include a chip, or may include a chip and another discrete device. This is not specifically limited in this embodiment of the present disclosure.

All or a part of the foregoing embodiments may be implemented by software, hardware, firmware, or any combination thereof. When a software program is used to implement embodiments, the embodiments may be implemented all or partially in a form of a computer program product. The computer program product includes one or more computer instructions. When the computer program instructions are loaded and executed on a computer, the procedure or functions according to embodiments of the present disclosure are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The term "a plurality of" in the foregoing embodiments of the present disclosure means two or more. The term "and/or" describes an association relationship for describing associated objects and represents that three relationships may exist. For example, A and/or B may represent the following three cases: Only A exists, both A and B exist, and only B exists. In addition, elements (element) of singular forms "a", "an", and "the" do not mean that there is "one or only one" such elements but "one or more" such elements unless specified in the context. For example, "a device" means one or more such devices. Further, "at least one of (at least one of) . . . " means one or any combination of subsequent associated objects. For example, "at least one of A, B, and C" includes A, B, C, AB, AC, BC, or ABC. "Determining Y based on X" does not mean that Y is determined only based on X, and Y may also be determined based on X and other information.

Although the present disclosure is described with reference to embodiments, in a process of implementing the present disclosure that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although the present disclosure is described with reference to specific features and embodiments thereof, it is clear that, various modifications and combinations may be made to the present disclosure without departing from the spirit and scope of the present disclosure. Correspondingly, the specification and accompanying drawings are merely example description of the present disclosure defined by the accompanying claims, and are considered as any of or all modifications, variations, combinations or equivalents that cover the scope of the present disclosure. It is clear that a person skilled in the art can make various modifications and variations to the present disclosure without departing from the spirit and scope of the present disclosure. This application is intended to cover these modifications and variations of the present disclosure provided that they fall within the scope of protection defined by the following claims and their equivalent technologies.

What is claimed is:

1. A communication method, comprising:

receiving a first packet of a first message from a first terminal device;

receiving a second packet of a second message from a second terminal device;

aggregating the first packet and the second packet based on a message index to obtain an aggregated packet, wherein the message index is used to aggregate packets from different messages that have matching message indexes, and wherein the message index of the first message and the second message match; and transmitting the aggregated packet to the first terminal device and the second terminal device;

wherein when the first packet is an initial packet of the first message, the first packet further comprises a first field indicating a quantity of the packets comprised in the first message;

wherein the first packet further comprises a sequence number indicating a transmission sequence of the first packet in a connection for transmitting the first packet, and wherein the method further comprises:

determining the connection for transmitting the first packet;

determining, based on the sequence number and the quantity, a first interval of sequence numbers of packets comprised in the first message, wherein a first end value of the first interval is the sequence number, and wherein a second end value of the first interval is based on the sequence number and the quantity; and storing a correspondence between the first interval and the connection for transmitting the first packet.

2. The communication method according to claim 1, wherein both the first packet and the second packet further comprise a first sequence number.

3. The communication method according to claim 1, wherein when the first packet is an initial packet of the first message, the first packet further comprises a first field indicating whether to perform aggregation processing on parameter data in the first message.

4. The communication method according to claim 1, wherein when the first packet is an initial packet of the first message, the first packet further comprises a first field indicating the message index.

5. The communication method according to claim 1, wherein the first packet further comprises a sequence number indicating a transmission sequence of the first packet in a connection for transmitting the first packet, and wherein the communication method further comprises:

determining, when the first packet is not an initial packet of the first message, the connection for transmitting the first packet.

6. A communication apparatus, comprising:

a memory configured to store instructions; and one or more processors coupled to the memory and configured to execute the instructions to cause the communication apparatus to:

receive a first packet of a first message from a first terminal device and a second packet of a second message from a second terminal device;

aggregate the first packet and the second packet based on a message index to obtain an aggregated packet, wherein the message index is used to aggregate packets from different messages that have matching message indexes, and wherein the message index of the first message and the second message match; and transmit the aggregated packet to the first terminal device and the second terminal device;

wherein when the first packet is an initial packet of the first message, the first packet further comprises a field indicating a quantity of the packets comprised in the first message;

wherein the first packet further comprises a sequence number indicating a transmission sequence of the first packet in a connection for transmitting the first packet; and wherein the one or more processors are further configured to:

determine the connection for transmitting the first packet; and determine, based on the sequence number and the quantity, a first interval of sequence numbers of the packets comprised in the first message, wherein a first end value of the first interval is the sequence number, and wherein a second end value of the first interval is based on the sequence number and the quantity; and store a correspondence between the first interval and the connection for transmitting the first packet.

7. The communication apparatus according to claim 6, wherein the both the first packet and the second packet further comprise a first sequence.

8. The communication apparatus according to claim 6, wherein when the first packet is an initial packet of the first message, the first packet further comprises a field indicating whether to perform aggregation processing on parameter data in the first message.

9. The communication apparatus according to claim 6, wherein when the first packet is an initial packet of the first message, the first packet further comprises a field indicating the message index.

* * * * *